United States Patent
Cronin et al.

(10) Patent No.: US 10,962,378 B2
(45) Date of Patent: Mar. 30, 2021

(54) AUTONOMOUS VEHICLE AND METHOD OF CONTROLLING THE AUTONOMOUS VEHICLE

(71) Applicant: SAMSUNG ELECTRONICS CO., LTD., Suwon-si (KR)

(72) Inventors: John Cronin, Suwon-si (KR); Christopher Michael Huffines, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 342 days.

(21) Appl. No.: 15/744,489

(22) PCT Filed: Jul. 29, 2016

(86) PCT No.: PCT/KR2016/008355
§ 371 (c)(1),
(2) Date: Jan. 12, 2018

(87) PCT Pub. No.: WO2017/018852
PCT Pub. Date: Feb. 2, 2017

(65) Prior Publication Data
US 2018/0266834 A1    Sep. 20, 2018

Related U.S. Application Data

(60) Provisional application No. 62/199,184, filed on Jul. 30, 2015.

(30) Foreign Application Priority Data

May 2, 2016    (KR) .................. 10-2016-0054121
Jul. 29, 2016    (KR) .................. 10-2016-0096766

(51) Int. Cl.
*G01C 21/34*    (2006.01)
*B60H 1/00*    (2006.01)
(Continued)

(52) U.S. Cl.
CPC ..... *G01C 21/3415* (2013.01); *B60H 1/00742* (2013.01); *B60Q 3/80* (2017.02);
(Continued)

(58) Field of Classification Search
CPC .... B60H 1/00742; B60Q 3/80; B60R 16/037; B60W 2040/0872; B60W 2540/26;
(Continued)

(56) References Cited

U.S. PATENT DOCUMENTS

| 8,633,979 B2 | 1/2014 | Szczerba et al. |
| 8,874,301 B1 | 10/2014 | Rao et al. |

(Continued)

FOREIGN PATENT DOCUMENTS

| JP | 2002-236993 A | 8/2002 | |
| JP | 2003151084 A * | 5/2003 | ............... G08G 1/13 |

(Continued)

OTHER PUBLICATIONS

Communication dated Feb. 13, 2019, issued by the European Patent Office in counterpart European Application No. 16830885.6.
(Continued)

*Primary Examiner* — Frederick M Brushaber
(74) *Attorney, Agent, or Firm* — Sughrue Mion, PLLC

(57) ABSTRACT

Disclosed are an autonomous driving method of implementing adaptive autonomous driving for a user based on device information that is obtained from a device of the user, and an autonomous vehicle. In particular, disclosed are an autonomous driving method of implementing autonomous driving appropriate for a situation of the user by controlling a function of an autonomous vehicle that corresponds to device information obtained from a wearable device, and the autonomous vehicle.

14 Claims, 53 Drawing Sheets

(51) Int. Cl.

| | | |
|---|---|---|
| *G08G 1/0968* | (2006.01) | |
| *H04M 1/60* | (2006.01) | |
| *G08G 1/00* | (2006.01) | |
| *B60W 50/08* | (2020.01) | |
| *B60W 50/14* | (2020.01) | |
| *B60R 16/037* | (2006.01) | |
| *G01C 21/36* | (2006.01) | |
| *G08B 21/06* | (2006.01) | |
| *H04M 1/725* | (2006.01) | |
| *G08B 21/04* | (2006.01) | |
| *B60W 50/10* | (2012.01) | |
| *B60Q 3/80* | (2017.01) | |
| *B60W 40/08* | (2012.01) | |

(52) U.S. Cl.
CPC ......... *B60R 16/037* (2013.01); *B60W 50/082* (2013.01); *B60W 50/10* (2013.01); *B60W 50/14* (2013.01); *G01C 21/362* (2013.01); *G01C 21/3664* (2013.01); *G08G 1/096827* (2013.01); *G08G 1/096844* (2013.01); *G08G 1/202* (2013.01); *H04M 1/6091* (2013.01); *B60W 2040/0872* (2013.01); *B60W 2540/26* (2013.01); *B60W 2556/50* (2020.02); *G08B 21/0453* (2013.01); *G08B 21/06* (2013.01); *H04M 1/72566* (2013.01); *H04M 1/72572* (2013.01)

(58) Field of Classification Search
CPC ......... B60W 2550/402; B60W 50/082; B60W 50/10; B60W 50/14; G01C 21/3415; G01C 21/362; G01C 21/3664; G08B 21/0453; G08B 21/06; G08G 1/096827; G08G 1/096844; G08G 1/202; H04M 1/6091; H04M 1/72566; H04M 1/72572
See application file for complete search history.

(56) References Cited

U.S. PATENT DOCUMENTS

| | | | |
|---|---|---|---|
| 8,880,240 B2 | 11/2014 | Grimm et al. | |
| 9,063,543 B2 | 6/2015 | An et al. | |
| 9,399,430 B2* | 7/2016 | Kirsch | B60Q 1/00 |
| 9,834,224 B2* | 12/2017 | Gordon | B60W 30/182 |
| 9,911,030 B1 | 3/2018 | Zhu et al. | |
| 10,099,608 B2* | 10/2018 | Cuddihy | B60Q 9/00 |
| 10,146,221 B2* | 12/2018 | Funakawa | B60W 50/082 |
| 10,198,696 B2* | 2/2019 | Goldman-Shenhar | G06K 9/00355 |
| 10,220,705 B2* | 3/2019 | Ramanujam | G01C 21/26 |
| 10,300,889 B2* | 5/2019 | Greenberg | B60Q 3/80 |
| 2012/0212353 A1 | 8/2012 | Fung et al. | |
| 2013/0151047 A1 | 6/2013 | Choi et al. | |
| 2013/0219294 A1 | 8/2013 | Goldman-Shenhar et al. | |
| 2013/0325241 A1 | 12/2013 | Lombrozo et al. | |
| 2014/0236414 A1 | 8/2014 | Droz et al. | |
| 2014/0297116 A1 | 10/2014 | Anderson et al. | |
| 2015/0081169 A1 | 3/2015 | Pisz | |
| 2015/0097863 A1 | 4/2015 | Alaniz et al. | |
| 2015/0149018 A1 | 5/2015 | Attard et al. | |
| 2015/0220068 A1* | 8/2015 | Goldman-Shenhar | G06K 9/00355 700/29 |
| 2015/0338852 A1* | 11/2015 | Ramanujam | G01C 21/26 701/2 |
| 2016/0152180 A1* | 6/2016 | Kirsch | B60W 40/08 701/36 |
| 2016/0207454 A1* | 7/2016 | Cuddihy | B60Q 9/00 |
| 2016/0378112 A1* | 12/2016 | Ljubuncic | G06K 9/00845 701/45 |
| 2017/0015318 A1* | 1/2017 | Scofield | G08G 1/097 |
| 2017/0057507 A1* | 3/2017 | Gordon | B60W 30/16 |
| 2017/0057510 A1* | 3/2017 | Herbach | B60W 30/181 |
| 2017/0106876 A1* | 4/2017 | Gordon | B60W 50/082 |
| 2018/0203451 A1 | 7/2018 | Cronin et al. | |
| 2018/0203455 A1 | 7/2018 | Cronin et al. | |
| 2018/0211414 A1 | 7/2018 | Cronin et al. | |
| 2019/0077372 A1* | 3/2019 | Greenberg | B60Q 3/80 |

FOREIGN PATENT DOCUMENTS

| | | |
|---|---|---|
| JP | 2008-9913 A | 1/2008 |
| JP | 2014-219723 A | 11/2014 |
| KR | 10-2013-0015739 A | 2/2013 |
| KR | 10-2013-0061901 A | 6/2013 |
| KR | 10-2013-0132790 A | 12/2013 |
| KR | 10-2014-0085139 A | 7/2014 |
| KR | 10-2014-0106939 A | 9/2014 |
| KR | 10-2015-0016381 A | 2/2015 |
| KR | 10-2017-0015213 A | 2/2017 |
| KR | 10-2017-0015214 A | 2/2017 |
| KR | 10-2017-0015238 A | 2/2017 |
| WO | 97/15033 A2 | 4/1997 |
| WO | 2004/090777 A1 | 10/2004 |

OTHER PUBLICATIONS

Notification and Opinion for International Search Report dated Oct. 31, 2016 in International Application No. PCT/KR2016/008355 (11 pages, in Korean).

International Search Report dated Oct. 31, 2016 in International Application No. PCT/KR2016/008355 (5 pages, in Korean with English translation).

Communication dated Jan. 29, 2021 issued by the European Patent Office in counterpart European Application No. 16 830 885.6.

* cited by examiner

FIG. 19

| (17110) | VEHICLE FUNCTION (REGARDING DRIVING) (17100) | | | | | | | | | |
|---|---|---|---|---|---|---|---|---|---|---|
| | BRAKE | ACCELERATOR | STEERING | AVOID OBSTACLES | NAVIGATION DEVICE | DRIVING MODE | ENGINE/ MOTOR | TRANSMISSION | WHEEL | TIRE |
| PULSE RATE | | | | | | | | | | |
| BLOOD PRESSURE | | | | | | | | | | |
| RESPIRATION RATE | | | | | | | | | | |
| BLOOD ALCOHOL CONTENT | | | | | | | | | | |
| GPS | X | X | X | | (X) | A | A | A | X | |
| CAMERA | X | X | X | | | A | A | A | X | |
| INERTIAL SENSOR | X | | | | | A | A | A | X | |
| ACCELERATION SENSOR | | | | | | | | | | |
| GEOMAGNETIC SENSOR | | | | | | | | | | |
| TEMPERATURE SENSOR | | | | | | | | | | |
| HUMIDITY SENSOR | | | | | | | | | | |
| GYROSCOPE SENSOR | X | X | X | | | X | X | X | | |
| AIR PRESSURE SENSOR | | | | | X | | | | | |
| PROXIMITY SENSOR | | | | | | | | | | |
| INFRARED SENSOR | | | | | | | | | | |
| MICROPHONE | | | | | | | | | | |
| VIBRATION | | | | | | | | | | |
| DISPLAY | | | | | | | | | | |
| SPEAKER | | | | | | | | | | |
| VOICE RECOGNITION | | | | | | (A) | | | | |
| VOICE COMMUNICATION | | | | | | | | | | |
| DATA COMMUNICATION | | | | | | | | | | |
| USER SCHEDULE APPOINTMENT | | | | | | | | | | |

DEVICE FUNCTION (17200)

| (18110) | \| | VEHICLE FUNCTION (DRIVING SYSTEM) (17100) | | | | | | | | | |
|---|---|---|---|---|---|---|---|---|---|---|---|
| | GEO-FENCE | LIGHT | WIPER | SPEAKER | TURN SIGNAL | INTERNAL LIGHTING | COMMUNICATION UNIT | HEATER | AIR CONDITIONER | TOUCH SCREEN | MICROPHONE |
| PULSE RATE | | | | | | | | | | | |
| BLOOD PRESSURE | | | | | | | | | | | |
| RESPIRATION RATE | | | | | (X) | | | | | | |
| BLOOD ALCOHOL CONTENT | | | | | | | | | | | |
| GPS | X | X | X | | | A | A | A | A | X | |
| CAMERA | X | X | X | | | A | A | A | A | X | |
| INERTIAL SENSOR | X | | | | | A | A | A | A | X | |
| ACCELERATION SENSOR | | | | | | | | | | | |
| GEOMAGNETIC SENSOR | | | | | | | | | | | |
| TEMPERATURE SENSOR | | | | | | | | | | | |
| HUMIDITY SENSOR | | | | | | | | | | | |
| GYROSCOPE SENSOR | | | | | | | | | | | |
| AIR PRESSURE SENSOR | | | | | | | | | | | |
| PROXIMITY SENSOR | | | | | | | | | | | |
| INFRARED SENSOR | X | X | X | | | X | X | X | X | | |
| MICROPHONE | | | | | X | | | | | | |
| VIBRATION | | | | | | | | | | | |
| DISPLAY | | | | | | | | | | | |
| SPEAKER | | | | | | | | | | | |
| VOICE RECOGNITION | | | | | | | | | | | |
| VOICE COMMUNICATION | | | | | | | | | | | |
| DATA COMMUNICATION | | | | | | | | | | | |
| USER SCHEDULE APPOINTMENT | | | | | | | | | | | |

DEVICE FUNCTION (17200)

| (17210) | VEHICLE FUNCTION (SENSOR) (17100) | | | | | | | | | | | | |
|---|---|---|---|---|---|---|---|---|---|---|---|---|---|
| (19110) | GPS | CAMERA | INERTIAL SENSOR | ACCELERATION SENSOR | GEOMAGNETIC SENSOR | TEMPERATURE SENSOR | HUMIDITY SENSOR | GYROSCOPE SENSOR | AIR PRESSURE SENSOR | POSITION SENSOR | INFRARED SENSOR | TIRE INFLATION PRESSURE SENSOR | SPEED SENSOR |
| PULSE RATE | X | | | | | | | | | | | | |
| BLOOD PRESSURE | | | | | | | | | | | | | |
| RESPIRATION RATE | | X | X | X | | | | | | | | | |
| BLOOD ALCOHOL CONTENT | A | X | X | X | | | A | A | A | A | X | | |
| GPS | | X | | | | | A | A | A | A | X | | |
| CAMERA | | | | | (X) | | | | | | | | |
| INERTIAL SENSOR | | | | | | | | | | | | | |
| ACCELERATION SENSOR | | X | | X | | | | | X | | | | |
| GEOMAGNETIC SENSOR | | | | | | | | | | | | | |
| TEMPERATURE SENSOR | | | | | | X | | | | | | | |
| HUMIDITY SENSOR | | | | | | | X | X | X | X | | | |
| GYROSCOPE SENSOR | | | | | | | | | | | | | |
| AIR PRESSURE SENSOR | | | | | | | | | | | | | |
| PROXIMITY SENSOR | | | | | | | | | | | | | |
| INFRARED SENSOR | | | | | | | | | | | | | |
| MICROPHONE | | | | | | | | | | | | | |
| VIBRATION | | | | | | | | | | | | | |
| DISPLAY | | | | | | | | | | | | | |
| SPEAKER | (A) | | | | | | | | | | | | |
| VOICE RECOGNITION | | | | | | | | | | | | | |
| VOICE COMMUNICATION | | | | | | | | | | | | | |
| DATA COMMUNICATION | | | | | | | | | | | | | |
| USER SCHEDULE APPOINTMENT | | | | | | | | | | | | | |

DEVICE FUNCTION (17200)

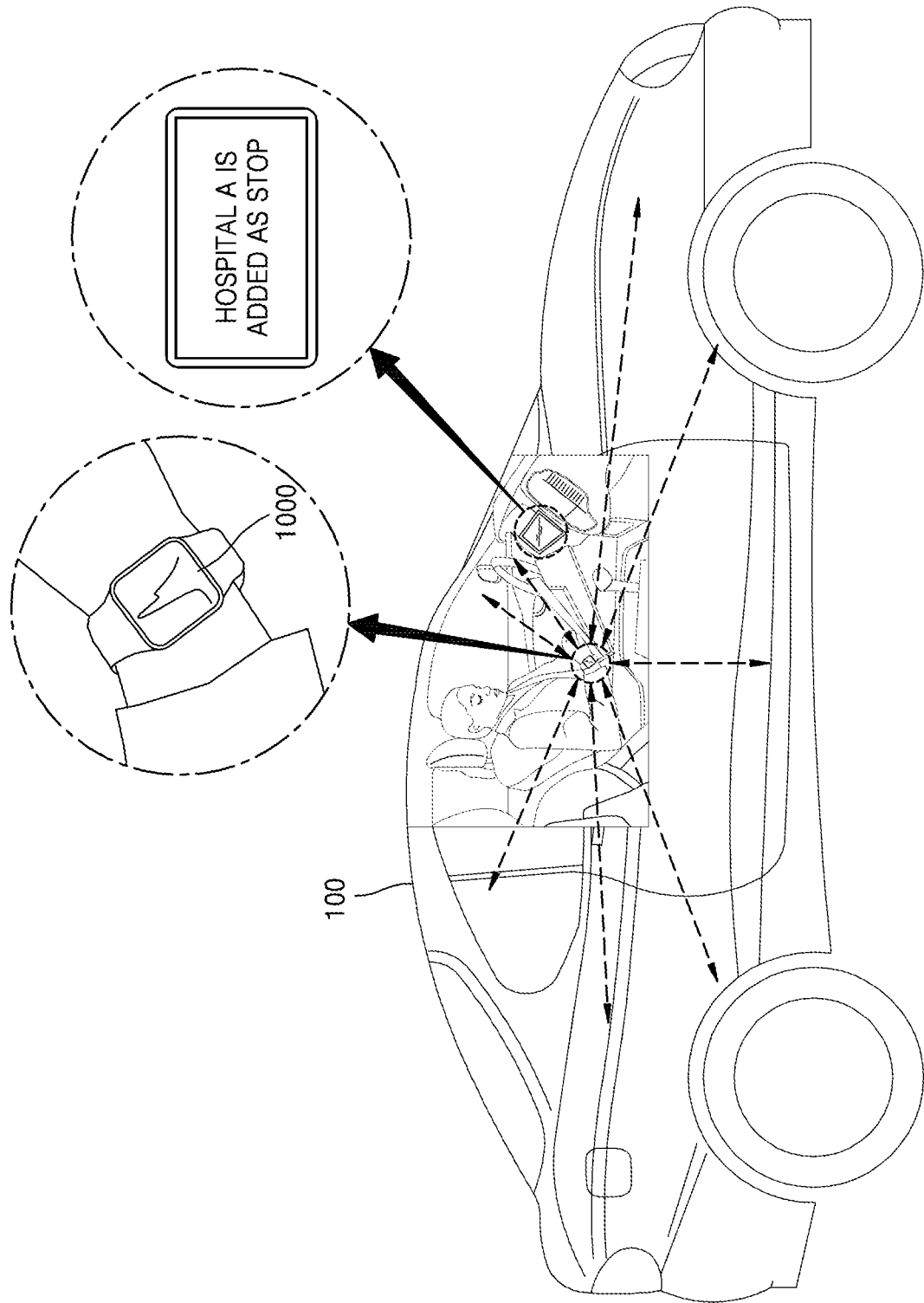

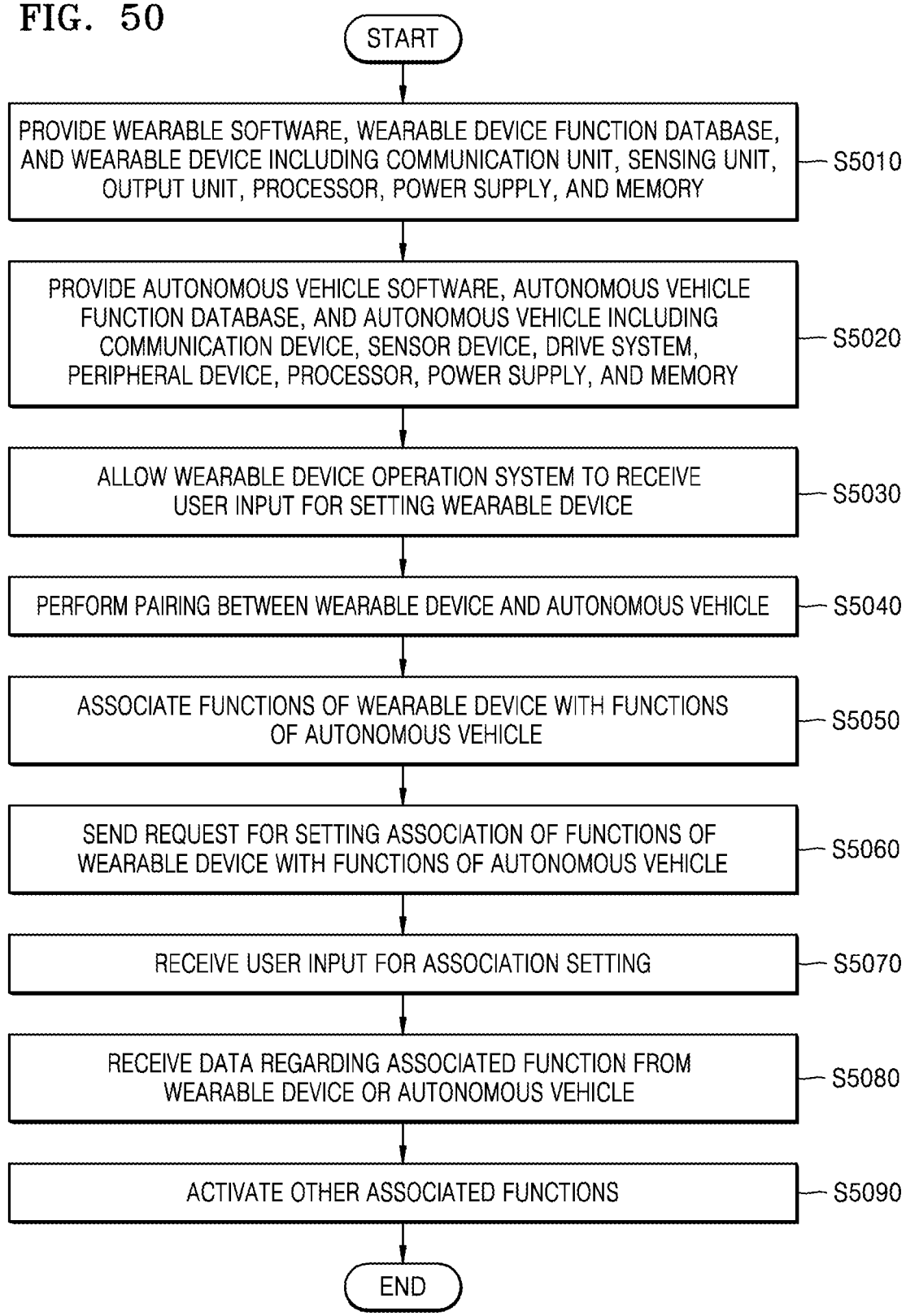

AUTONOMOUS VEHICLE AND METHOD OF CONTROLLING THE AUTONOMOUS VEHICLE

CROSS REFERENCE TO RELATED APPLICATIONS

This application is a U.S. National Stage Application of International Application No. PCT/KR2016/008355, filed on Jul. 29, 2016, which claims the benefit under 35 USC 119(a) and 365(b) of U.S. Provisional Patent Application No. 62/199,184 filed on Jul. 30, 2015; Korean Patent Application No. 10-2016-0054121, filed on May 2, 2016, in the Korean Intellectual Property Office; and Korean Patent Application No. 10-2016-0096766, filed on Jul. 29, 2016, in the Korean Intellectual Property Office.

TECHNICAL FIELD

The present disclosure relates to an autonomous vehicle and a method of controlling the same.

BACKGROUND ART

Recently, interest into autonomous vehicles has increased. In particular, a variety of additional functions regarding autonomous driving have been continuously developed in order to solve traffic congestion caused by the increasing demand for vehicles and to safely avoid obstacles such as people or other vehicles. For example, there are numerous algorithms regarding a lane keeping system.

Also, as Internet connectivity has expanded, the amount of data generated from devices or vehicles rapidly increases, and thus various services using the data have been introduced.

Therefore, a method of providing a user with an autonomous driving experience that is familiar to the user by using various pieces of data, and an autonomous vehicle are required.

DETAILED DESCRIPTION OF THE INVENTION

Technical Problem

The present disclosure provides a method of controlling an autonomous vehicle that communicates with a device and the autonomous vehicle that communicates with the device.

Technical Solution

A method of controlling an autonomous vehicle based on information received from a device is provided.

Advantageous Effects of the Invention

An autonomous vehicle that communicates with a device may be effectively controlled.

DESCRIPTION OF THE DRAWINGS

FIG. 19 shows a correlation between driving-related functions of an autonomous vehicle and functions of a device, according to an embodiment.

FIG. 20 shows a correlation between functions of a peripheral device of an autonomous vehicle and functions of a device, according to an embodiment.

FIG. 21 shows a correlation between sensor-related functions of an autonomous vehicle and functions of a device, according to an embodiment.

FIG. 22 is a diagram showing an example of controlling an autonomous vehicle based on biometric information, according to an embodiment.

FIG. 50 is a flowchart of a method of controlling an autonomous vehicle by using a wearable device that communicates with the autonomous vehicle via pairing, according to an embodiment.

BEST MODE

Figure 1A:
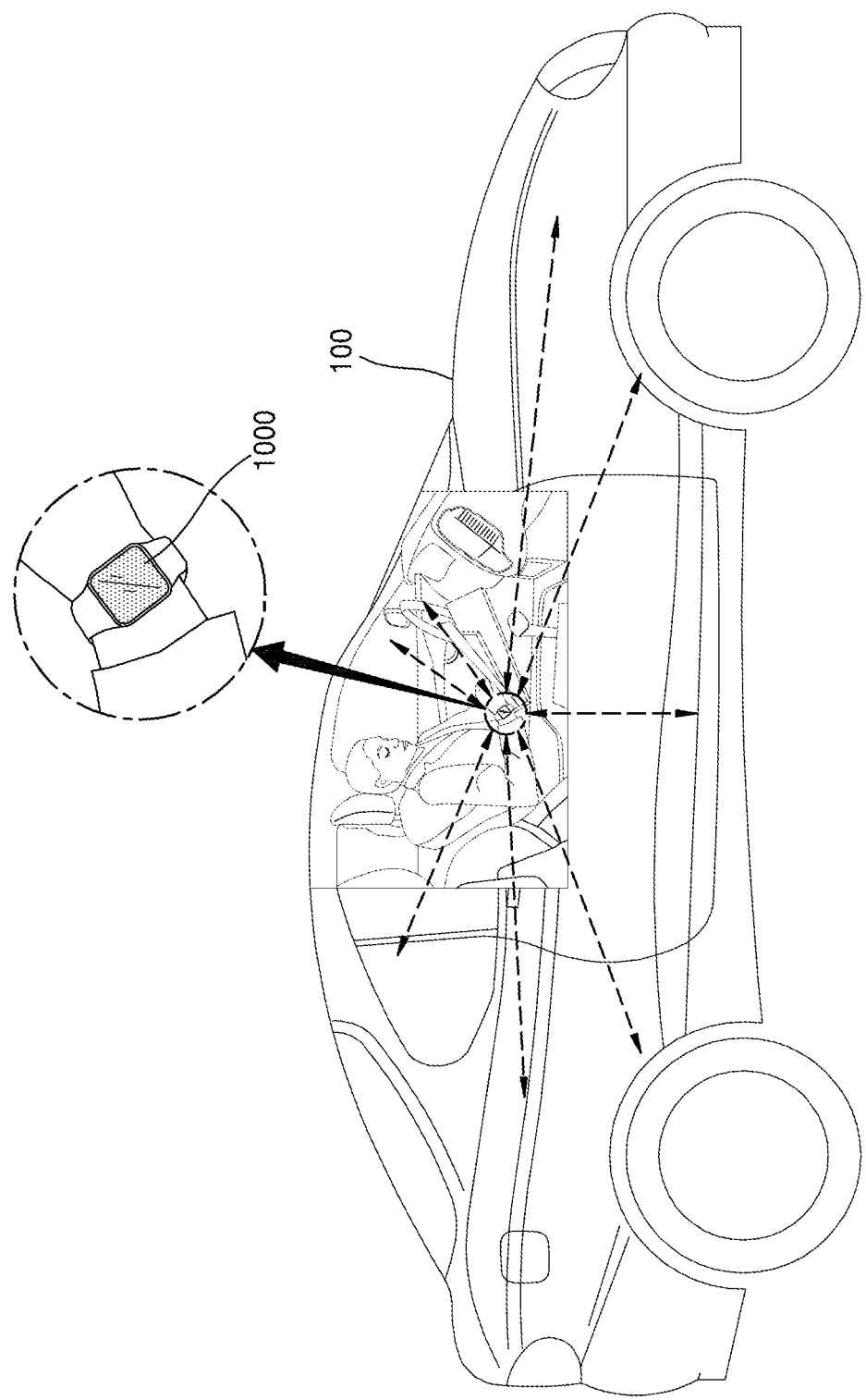
FIG. 1A is a diagram showing an example of controlling an autonomous vehicle through communication with a device.

According to an aspect of the present disclosure, a method of controlling an autonomous vehicle includes: receiving device information obtained from a device configured to communicate with the autonomous vehicle, from the device; based on guidelines for associating the device information obtained from the device with vehicle control information used to control at least one function of the autonomous vehicle, determining the vehicle control information corresponding to the received device information; and controlling the autonomous vehicle based on the determined vehicle control information.

According to another aspect of the present disclosure, an autonomous vehicle includes: a communication device configured to receive device information obtained from a device configured to communicate with the autonomous vehicle, from the device; and a processor configured to, based on guidelines for associating the device information obtained from the device with vehicle control information used to control at least one function of the autonomous vehicle, determine the vehicle control information corresponding to the received device information and control the autonomous vehicle based on the determined vehicle control information.

According to another aspect of the present disclosure, there is provided a non-transitory computer-readable recording medium having recorded thereon a program which, when executed by a computer, performs the method according to the aspect of the present disclosure.

MODE OF THE INVENTION

The present disclosure will now be described more fully with reference to the accompanying drawings, in which exemplary embodiments of the disclosure are shown. One or more embodiments described herein are intended to specify concepts of the present disclosure, but do not limit the present disclosure. It will be understood that matters that may be easily inferred by one of ordinary skill in the art from the detailed description and embodiments of the present disclosure are included in the scope of the present disclosure.

It will be further understood that the terms "comprises" and/or "comprising" used herein specify the presence of stated components or processes, but do not preclude the presence or addition of one or more other components or processes. Some of the components or some of the processes may not be included, or additional components or processes may be further included.

It will be understood that although the terms "first", "second", etc. may be used herein to describe various components, these components should not be limited by these terms. These components are only used to distinguish one component from another.

One or more embodiments of the present disclosure relate to a rendering method and a rendering apparatus, and matters that are well known to one of ordinary skill in the art will not be described.

Also, an autonomous vehicle described herein may include a vehicle capable of autonomously navigating afterwards through additional settings, additional processes, or the like. Thus, the autonomous vehicle may include a vehicle that autonomously navigates at present as well as a normal vehicle that has not autonomously navigated yet. For example, in the present specification, an autonomous vehicle may include a vehicle that is manually driven.

FIG. 1A is a diagram showing an example of controlling an autonomous vehicle 100 through communication with a device 1000.

Referring to FIG. 1A, the autonomous vehicle 100 may have a communication link with the device 1000. For example, the autonomous vehicle 100 may have a short-range communication link or a mobile communication link (e.g., 3rd generation (3G), 4G, 5G, etc.) with the device 1000. Short-range communication may include Bluetooth, Bluetooth Low Energy (BLE), Wi-Fi, Ultra Wideband (UWB), ZigBee, Near Field Communication (NFC), Ant+, or the like, but the short-range communication is not limited thereto.

The device 1000 may be a portable mobile device having a mobile communication function, for example, a smart phone, a tablet device, a personal digital assistant (PDA), etc., or may be a wearable device, a laptop, or the like. However, the device 1000 is not limited thereto. For example, when the device 1000 is a wearable device, the device 1000 may be a smart band, a smart watch, smart glasses, or the like worn by a user who is in the autonomous vehicle 100.

The autonomous vehicle 100 may communicate with the device 1000 based on a distance therebetween. In this case, the autonomous vehicle 100 may send a communication request to the device 1000 that is in a certain range from the autonomous vehicle 100. Also, the autonomous vehicle 100 may receive device information in response to the communication request.

The autonomous vehicle 100 may determine whether the device 1000 is within a certain range from the autonomous vehicle 100. When it is determined that the device 1000 is within the certain range from the autonomous vehicle 100, the autonomous vehicle 100 may send a communication request to the device 1000 and receive device information in response to the communication request.

The device 1000 may obtain device information in various manners. For example, the device 1000 may obtain sensing information by using sensors included in the device 1000, and communication information by receiving data from outside the device 1000 through communication, or may generate new data by using data stored in a storage medium included in the device 1000.

The autonomous vehicle 100 may receive the device information from the device 1000. As described above, the device information may indicate information obtained by the device 1000 as described below in detail with reference to FIG. 2.

The autonomous vehicle 100 may obtain vehicle control information used to control the autonomous vehicle 100. Also, the autonomous vehicle 100 may determine the vehicle control information based on the device information received from the device 1000.

The autonomous vehicle 100 may be controlled according to the vehicle control information. For example, when the vehicle control information indicates driving to an A destination, the autonomous vehicle 100 may be controlled to autonomously navigate to the A destination according to the vehicle control information.

Figure 1B:
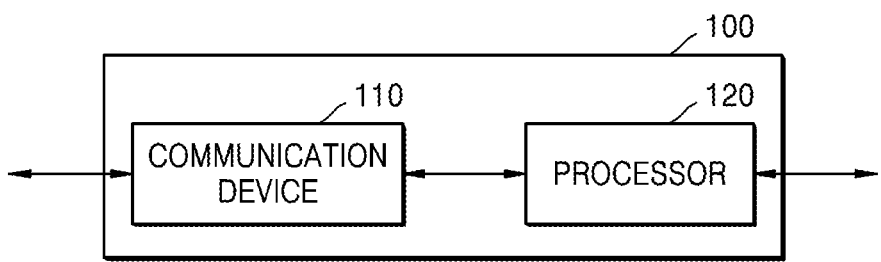
FIG. 1B is a block diagram showing an example of a structure of an autonomous vehicle according to an embodiment.

FIG. 1B is a block diagram showing an example of a structure of the autonomous vehicle 100 according to an embodiment.

As shown in FIG. 1B, the autonomous vehicle 100 may include a communication device 110 and a processor 120. However, one of ordinary skill in the art may easily understand that the autonomous vehicle 100 may further include general-purpose components in addition to the components shown in FIG. 1B.

Hereinafter, the communication device 110 and the processor 120 will be sequentially described.

The communication device 110 may communicate with the outside of the autonomous vehicle 100. For example, the communication device 110 may communicate with the device 1000.

The processor 120 may control the autonomous vehicle 100. For example, the processor 120 may obtain the vehicle control information and may control the autonomous vehicle 100 based on the vehicle control information.

Hereinafter, a method of controlling the autonomous vehicle 100 and the autonomous vehicle 100 will be described in detail.

Figure 2:
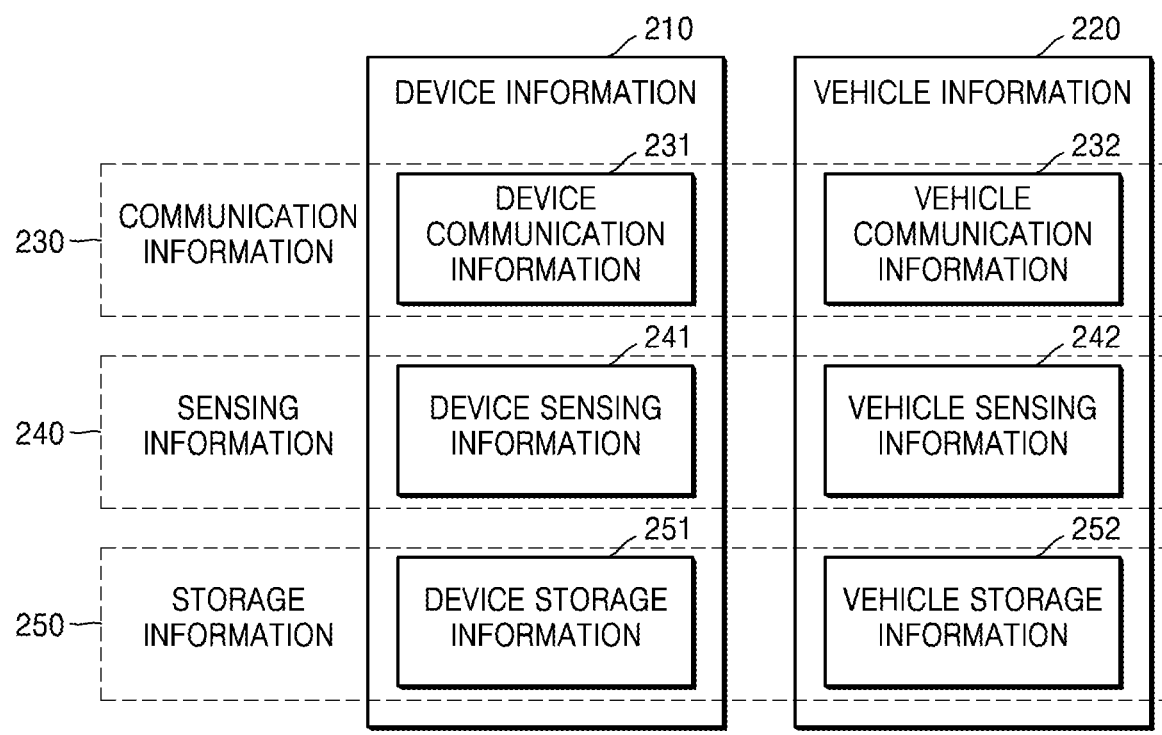
FIG. 2 is a diagram showing an example of information used to control an autonomous vehicle according to an embodiment.

FIG. 2 is a diagram showing an example of information used to control the autonomous vehicle 100 according to an embodiment.

Device information 210 may be information obtained by the device 1000. For example, the device information 210 may include at least one of device communication information 231 obtained by the device 1000 through communication, device sensing information 241 that is sensed by sensors included in the device 1000, device storage information 251 stored in a storage medium of the device 1000, and device generation information (not shown) generated by the device 1000.

The device communication information 231 may include information obtained by the device 1000 from a server through communication with the server. For example, the device communication information 231 may include weather information, schedule information, driving environment information (e.g., road situation information, surrounding area information, map information, topographic information, traffic accident information, crackdown information, caution area information, etc.), facility information (e.g., gas station information, repair shop information, parking lot information, etc.), news information (e.g., information about nearby performances, etc.), or the like, all of which are obtained from the server through the communication with the server. However, the device communication information 231 is not limited thereto. Since one of ordinary skill in the art may intuitively infer the meaning of each piece of information from its name, detailed descriptions regarding the information will be omitted.

The device sensing information 241 may include information obtained by at least one sensor included in the device 1000. The device 1000 may include one or more sensors. for example, the device 1000 may include a pulse rate sensor, a blood pressure sensor, a blood sugar sensor, a respiration rate sensor, a blood alcohol content sensor, a global positioning system (GPS) sensor, a camera, an inertial sensor, an acceleration sensor, a geomagnetic sensor, a temperature sensor, a humidity sensor, a gyroscope sensor, an air pressure sensor, a proximity sensor, an infrared sensor, a microphone, a voice recognition sensor, a pupil recognition sensor, a biometric signature sensor, a state recognition sensor, a fatigue recognition sensor, a vibration sensor, or the like. However, the present disclosure is not limited thereto. Since one of ordinary skill in the art may intuitively infer the meaning of each sensor from its name, detailed descriptions regarding the aforementioned sensors will be omitted.

The device storage information 251 may include at least one of information that is stored in advance in a storage medium included in the device 1000 and information that is received from outside the device 1000 and stored in the storage medium included in the device 1000. The device generation information may indicate information generated by the device 1000 based on at least one of the device communication information 231, the device sensing information 241, and the device storage information 251. For example, the device generation information may include information that is obtained by processing the device storage information 251 and the device sensing information 241. For example, the device generation information may include map information that is the device storage information 251 and stop information that is determined based on biometric information that is the device sensing information 241.

Vehicle information 220 may be information obtained by the autonomous vehicle 100. For example, the vehicle information 220 may include at least one of vehicle communication information 232 that is obtained by the autonomous vehicle 100 through communication, vehicle sensing information 242 that is sensed by sensors included in the autonomous vehicle 100, vehicle storage information 252 that is stored in a storage medium of the autonomous vehicle 100, and vehicle generation information (not shown) generated by the autonomous vehicle 100.

The vehicle communication information 232 may include information obtained by the autonomous vehicle 100 from the server through communication with the server. For example, the vehicle communication information 232 may include weather information, schedule information, driving environment information (e.g., road situation information, surrounding area information, map information, topographic information, traffic accident information, crackdown information, caution area information, etc.), facility information (e.g., gas station information, repair shop information, parking lot information, etc.), news information (e.g., information about nearby performances), or the like, all of which are obtained by the autonomous vehicle 100 from the server through the communication. However, the present disclosure is not limited thereto. Since one of ordinary skill in the art may intuitively infer the meaning of each piece of information from its name, detailed descriptions regarding the information will be omitted.

The vehicle sensing information 242 may include information obtained from at least one sensor included in the autonomous vehicle 100. The autonomous vehicle 100 may include one or more sensors. For example, the autonomous vehicle 100 may include a pulse rate sensor, a blood pressure sensor, a blood sugar sensor, a respiration rate sensor, a blood alcohol content sensor, a GPS, a camera, an inertial sensor, an acceleration sensor, a geomagnetic sensor, a temperature sensor, a humidity sensor, a gyroscope sensor, an air pressure sensor, a proximity sensor, an infrared sensor, a microphone, a voice recognition sensor, a pupil recognition sensor, a biometric signature sensor, a state recognition sensor, a fatigue recognition sensor, a vibration sensor, a vehicle sensor (e.g., an air inflow sensor, an air temperature sensor, a barometric pressure sensor, a water temperature sensor, a throttle position sensor, a motor position sensor, an oxygen sensor, a knock sensor, an oil sensor, a fuel sensor, a tire sensor, a brake sensor, a speed sensor, an outside temperature detection sensor, an outside illumination detection sensor, a surrounding recognition sensor, etc.), or the like. However, the sensors included in the autonomous vehicle 100 are not limited thereto. Since one of ordinary skill in the art may intuitively infer the meaning of each sensor from its name, detailed descriptions regarding the aforementioned sensors will be omitted. The vehicle sensor may include a device for detecting internal or external environments of a vehicle or detecting actions of a driver.

The vehicle storage information 252 may include information that is stored in advance in the storage medium included in the autonomous vehicle 100 and/or information that is received from outside the autonomous vehicle 100 and stored in the storage medium included in the autonomous vehicle 100.

The vehicle generation information may be information generated by the autonomous vehicle 100 based on at least one of the vehicle communication information 232, the vehicle sensing information 242, and the vehicle storage information 252. For example, the vehicle generation information may include information that is obtained by processing the vehicle storage information 252 and the vehicle sensing information 242. For example, the vehicle generation information may include setting temperature information determined based on indoor temperature information that is the vehicle sensing information 242 and outside temperature information that is the vehicle sensing information 242.

Communication information 230 may include at least one of the device communication information 231 and the vehicle communication information 232, and sensing information 240 may include at least one of the device sensing information 241 and the vehicle sensing information 242. The storage information 250 may include at least one of the device storage information 251 and the vehicle storage information 252.

Figure 3:
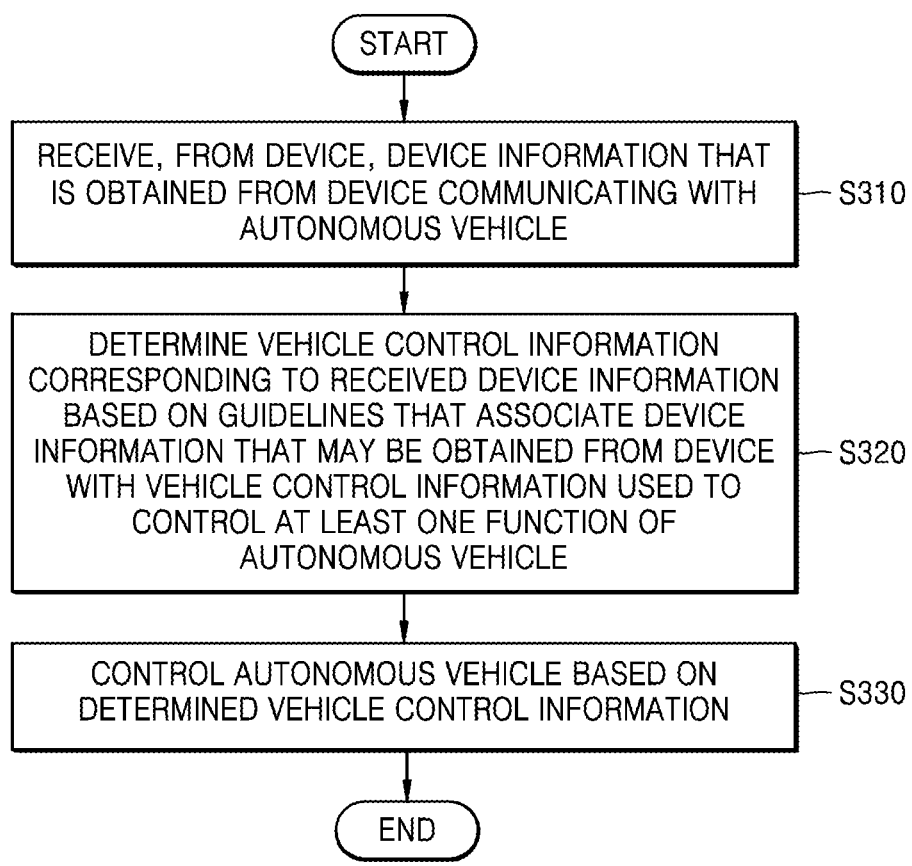
FIG. 3 is a flowchart of a method of controlling an autonomous vehicle based on device information, according to an embodiment.

FIG. 3 is a flowchart of a method of controlling the autonomous vehicle 100 based on the device information 210, according to an embodiment.

In operation S310, the autonomous vehicle 100 may receive, from the device 1000, the device information 210 obtained from the device 1000 communicating with the autonomous vehicle 100. For example, the autonomous vehicle 100 may receive at least one of the device communication information 231, the device sensing information 241, the device storage information 251, and the device generation information.

The device information 210 indicates information that may be obtained from the device 1000. For example, the device information 210 may include at least one of the device communication information 231, the device sensing information 241, the device storage information 251, and the device generation information (not shown). That is, the device information 210 may include biometric information, schedule information, surrounding situation information, weather information, and the like.

In operation S320, based on guidelines that associate the device information 210, which may be obtained from the device 1000, with the vehicle control information used to control at least one function of the autonomous vehicle 100, the autonomous vehicle 100 may determine the vehicle control information corresponding to the received device information 210.

The guidelines may indicate a situation manual in which the device information 210 and/or the vehicle information 220 are associated with the vehicle control information. In addition, based on the guidelines, the device information 210 including biometric signals indicating emergencies may be associated with the vehicle control information used to control the autonomous vehicle 100 to add a hospital as a stop. According to guidelines included in a functional matrix, a navigation function corresponding to the schedule information included in the device information 210 may be determined.

The guidelines may be set when the autonomous vehicle 100 is released or set based on a user input. Also, the guidelines that are set when the autonomous vehicle 100 is released may be renewed based on a user input.

The functional matrix may indicate a correlation between the functions of the autonomous vehicle 100 and the functions of the device 1000, which are associated with each other, according to at least one guideline.

The vehicle control information may be information used to control at least one function of the autonomous vehicle 100. For example, according to the vehicle control information, a navigation device, an accelerator, a brake, a steering wheel, an air conditioning device, a heating device, windows, a ventilation device, an audio/video device, turn signals, internal lighting, external lighting, a drive system, etc. of the autonomous vehicle 100 may be controlled. However, the present disclosure is not limited thereto. As another example, the vehicle control information may include at least one of control information of the accelerator that is used to control an amount of air flowing into an engine, control information of the navigation device that is used to add a stop, control information used to set a driving route of the navigation device, and control information used to control the air conditioning device, the heating device, the ventilation device, etc. for controlling the indoor temperature of the autonomous vehicle 100.

According to an embodiment, based on the guidelines, the autonomous vehicle 100 may set at least one of control parameters for controlling respective devices that activate functions of the autonomous vehicle 100 in accordance with the received device information 210. For example, the autonomous vehicle 100 may determine the control parameters of the air conditioning device, the heating device, the ventilation device, etc. included in the autonomous vehicle 100 in accordance with device information including information about a user's temperature. Also, the autonomous vehicle 100 may determine the driving route of the navigation device of the autonomous vehicle 100 in accordance with device information including location information regarding a schedule of the user. Furthermore, the autonomous vehicle 100 may determine a setting temperature of the air conditioning device of the autonomous vehicle 100 in accordance with device information including information regarding an indoor temperature of the autonomous vehicle 100.

Detailed examples of determining, by the autonomous vehicle 100, the vehicle control information based on the guidelines will be provided with reference to FIGS. 17A to 50.

In operation S330, the autonomous vehicle 100 may be controlled according to the vehicle control information determined in operation S320. The processor 120 may control the autonomous vehicle 100 based on the vehicle control information determined in operation S320.

For example, the autonomous vehicle 100 may set a driving route and/or average driving speed of the autonomous vehicle 100 based on the vehicle control information determined in operation S320. Also, the autonomous vehicle 100 may add a stop to the driving route of the autonomous vehicle 100 based on the vehicle control information determined in operation S320. In addition, the autonomous vehicle 100 may determine internal brightness, a setting temperature, content to be reproduced, a driving mode, or the like of the autonomous vehicle 100 based on the vehicle control information determined in operation S320. Also, the autonomous vehicle 100 may change the driving route of the autonomous vehicle 100 to a detour route based on the vehicle control information determined in operation S320. Furthermore, the autonomous vehicle 100 may stop autonomous driving based on the vehicle control information determined in operation S320.

In one or more embodiments described herein, the driving mode may indicate a state in which a vehicle is controlled according to a surrounding situation of the vehicle or a situation of a passenger. For example, the driving mode may include a standard mode in which the vehicle is controlled according to a driving method that is appropriate for general driving, an eco-friendly mode in which the vehicle is controlled according to a driving method that is eco-friendly and economical, a sports mode in which the vehicle is controlled according to sporty driving method, an antiskid mode in which the vehicle is controlled according to a driving method that is appropriate for slippery roads, a sleeping mode in which the vehicle is controlled when a passenger is sleeping, a reading mode in which the vehicle is controlled when a passenger reads a book, an emergency mode in which the vehicle is controlled in case of an emergency, etc., a low-speed mode in which the vehicle is controlled to be driven at a low speed that is lower than or equal to a preset speed according to a special condition, a safety mode in which the vehicle is controlled by focusing on surroundings of the vehicle and/or safety of passengers, a speed mode in which the vehicle is controlled according to a driving method that is appropriate for a quick arrival to a destination, or the like. However, the driving mode is not limited thereto. Since one of ordinary skill in the art may intuitively infer the meaning of each driving mode from its name and description, detailed descriptions regarding the driving modes will be omitted.

Detailed examples of controlling the autonomous vehicle 100 based on the vehicle control information will be provided with reference to FIGS. 17A to 50.

Figure 4:
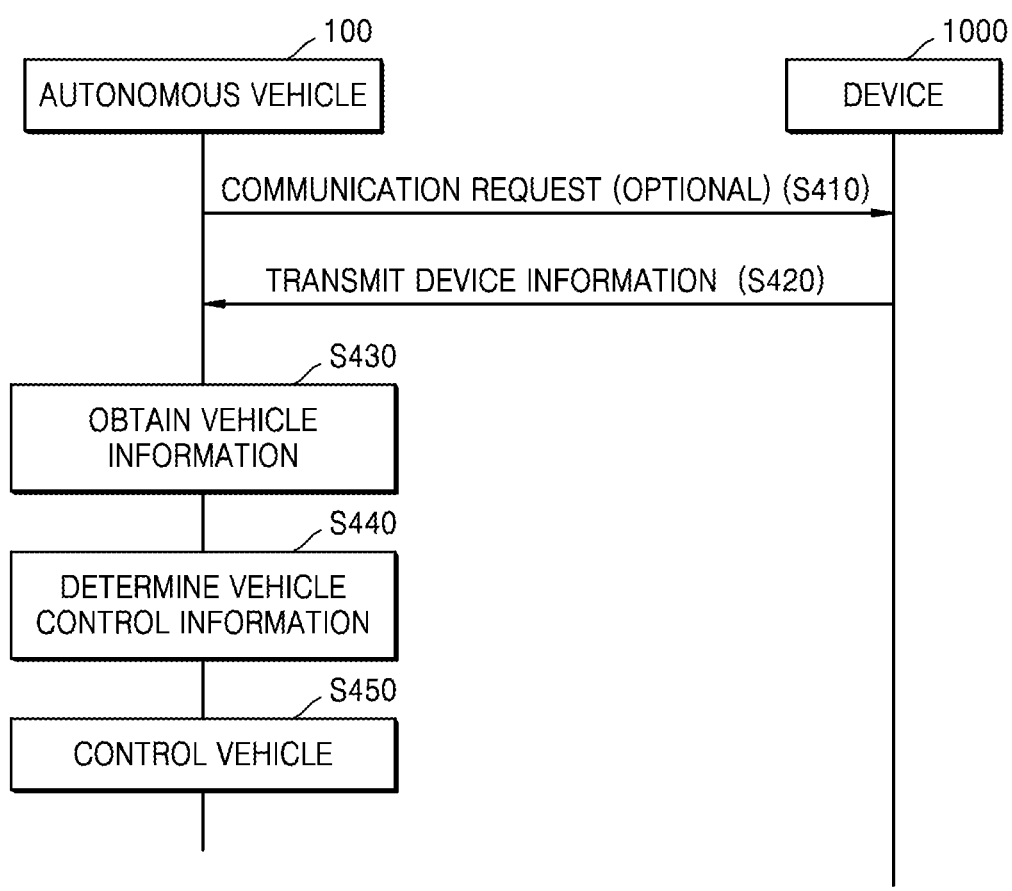
FIG. 4 is a flowchart of a method of controlling an autonomous vehicle based on device information and vehicle information, according to an embodiment.

FIG. 4 is a flowchart of a method of controlling the autonomous vehicle 100 based on the device information 210 and the vehicle information 220, according to an embodiment.

In operation S410, the autonomous vehicle 100 sends a communication request to the device 1000. Operation S410 may be or may not be performed.

The autonomous vehicle 100 may determine whether the device 1000 is in a certain distance from the autonomous vehicle 100 and may send the communication request to the device 1000 when the device 1000 is in the certain distance from the autonomous vehicle 100. According to the communication request from the autonomous vehicle 100, a communication link between the autonomous vehicle 100 and the device 1000 may be formed. For example, the autonomous vehicle 100 may form a short-range communication link or a mobile communication link (e.g., 3G, 4G, 5G, etc.) with the device 1000.

In operation S420, the autonomous vehicle 100 may receive the device information 210 from the device 1000.

The autonomous vehicle 100 may receive the device information 210 from the device 1000 through the communication link formed in operation S410. The device 1000 may transmit the device information 210 to the autonomous vehicle 100 in response to the communication request from the autonomous vehicle 100.

Meanwhile, when operation S410 is not performed, the device 1000 may transmit the device information 210 to the autonomous vehicle 100 without a communication request from the autonomous vehicle 100. That is, the device 1000 may recognize the autonomous vehicle 100 and may transmit at least one of the device communication information 231, the device sensing information 241, the device storage information 251, and the device generation information to the autonomous vehicle 100, without a communication request from the autonomous vehicle 100.

In operation S430, the autonomous vehicle 100 may obtain the vehicle information 220. Operation S430 may be or may not be performed.

The autonomous vehicle 100 may obtain at least one of the vehicle communication information 232, the vehicle sensing information 242, the vehicle storage information 252, and the vehicle generation information (not shown).

For example, the autonomous vehicle 100 may receive, through communication with the server, icy road caution information, steep slope caution information, steep corner caution information, traffic jam information, weather information, schedule information, surrounding situation information, surrounding area information, map information, topographic information, traffic accident information, crackdown information, gas station information, repair shop information, parking information, news information, information about nearby performances, or the like. However, information received by the autonomous vehicle 100 is not limited thereto.

The autonomous vehicle 100 may obtain information sensed by sensors included in the autonomous vehicle 100, for example, a pulse rate sensor, a blood pressure sensor, a blood sugar sensor, a respiration rate sensor, a blood alcohol content sensor, a GPS, a camera, an inertial sensor, an acceleration sensor, a geomagnetic sensor, a temperature sensor, a humidity sensor, a gyroscope sensor, an air pressure sensor, a proximity sensor, an infrared sensor, a microphone, a voice recognition sensor, a pupil recognition sensor, a biometric signature sensor, a state recognition sensor, a fatigue recognition sensor, a vibration sensor, a vehicle sensor (e.g., an air flow sensor, an air temperature sensor, a barometric pressure sensor, a water temperature sensor, a throttle position sensor, a motor position sensor, an oil sensor, a fuel sensor, a tire sensor, a brake sensor, a speed sensor, an outside temperature detection sensor, an outside illumination detection sensor, a surrounding recognition sensor, etc.). However, the sensors included in the autonomous vehicle 100 are not limited thereto.

The autonomous vehicle 100 may obtain the information that is stored in advance in the storage medium included in the autonomous vehicle 100 and/or the information that is received from outside the autonomous vehicle 100 and stored in the storage medium included in the autonomous vehicle 100.

The autonomous vehicle 100 may generate the vehicle generation information based on at least one of the vehicle communication information 232, the vehicle sensing information 242, and the vehicle storage information 252 and may obtain the generated vehicle generation information.

In operation S440, the autonomous vehicle 100 may determine the vehicle control information. The autonomous vehicle 100 may determine the vehicle control information corresponding to the received device information 210 and/or the obtained vehicle information 220, based on the guidelines.

The guidelines may indicate a situation manual in which the device information 210 and/or the vehicle information 220 are associated with the vehicle control information. Also, based on the guidelines, the device information 210, which includes biometric signals indicating that the user is sleeping, and the vehicle information 220 including information regarding a remaining amount of gas may be associated with the vehicle control information used to control the autonomous vehicle 100 so as to add a gas station as a stop.

The autonomous vehicle 100 may set at least one of the control parameters for respectively controlling devices that activate the functions of the autonomous vehicle 100, in accordance with the received device information 210, based on the guidelines.

For example, the autonomous vehicle 100 may determine the control parameters of the air conditioning device, the heating device, the ventilation device, etc. of the autonomous vehicle 100 in accordance with device information including information about a user's temperature and the vehicle information 220 including information about the outside temperature of the autonomous vehicle 100. If the outside temperature is low and the user feels hot, the autonomous vehicle 100 may obtain the vehicle control information used to control the autonomous vehicle 100 to open windows. However, if the outside temperature is high and the user feels hot, the autonomous vehicle 100 may obtain the vehicle control information used to control the autonomous vehicle 100 to turn on the air conditioner.

The autonomous vehicle 100 may determine control parameters of internal lighting included in the autonomous vehicle 100 in accordance with the device information 210 including biometric signals indicating that the user reads a book and the vehicle information 220 including external illumination information of the autonomous vehicle 100.

The autonomous vehicle 100 may set the average driving speed by determining control parameters of the drive system of the autonomous vehicle 100 in accordance with the device information 210 including the schedule information indicating a schedule appointment time of the user and the vehicle information 220 including information regarding tire inflation pressure.

In operation S450, the autonomous vehicle 100 may be controlled based on the vehicle control information determined in operation S440. For example, the processor 120 may control the autonomous vehicle 100 based on the vehicle control information determined in operation S440. Regarding descriptions of operation S450, the descriptions of operation S330 may be referred to.

Also, the autonomous vehicle 100 may be controlled under control conditions received from the user. Hereinafter, a method of controlling the autonomous vehicle 100 under the control conditions received from the user will be described.

The autonomous vehicle 100 may provide the user with mapping information regarding the functions of the device 1000 communicating with the autonomous vehicle 100 and the functions of the autonomous vehicle 100.

The mapping information may indicate whether the functions of the autonomous vehicle 100 and the functions of the device 1000 are associated with each other. Alternatively, the mapping information may include information used to set association conditions for the functions of the autonomous vehicle 100 and the functions of the device 1000. For example, the mapping information may include information regarding guidelines to be described below.

Also, the autonomous vehicle 100 may provide the mapping information to the user. For example, the autonomous vehicle 100 may display the mapping information on a display of the autonomous vehicle 100. As another example, the autonomous vehicle 100 may output the mapping information as a voice, etc. through a speaker of the autonomous vehicle 100. As another example, the autonomous vehicle 100 may transmit the mapping information to the device 1000 in order to display the mapping information on a display of the device 1000.

The autonomous vehicle 100 may receive, from the user, an input regarding a control condition of a first function among the functions of the autonomous vehicle 100.

The control condition may indicate whether the functions of the autonomous vehicle 100 are associated with the functions of the device 1000. Also, the control condition may particularly include a control method that is the method of controlling the autonomous vehicle 100. The control method according to an embodiment may indicate a method of associating the functions of the autonomous vehicle 100 with the functions of the device 1000.

Based on a user input, the autonomous vehicle 100 may receive information indicating the control condition of the first function among the functions of the autonomous vehicle 100. For example, the autonomous vehicle 100 may receive information indicating a control condition of a navigation function of the autonomous vehicle 100. For example, the autonomous vehicle 100 may receive the biometric information or the schedule information of the user used as the control condition of the navigation function, based on the user input.

The user input may include an input, for example, a voice, a gesture, a screen touch, a button touch, or the like. The autonomous vehicle 100 may obtain the user input by using a method such as voice recognition, gesture recognition, or touch recognition.

Also, the user input obtained by the autonomous vehicle 100 may be shared with the device 1000.

Also, the control condition may be related to a second function of the device 1000 which corresponds to the first function, based on the mapping information. For example, the autonomous vehicle 100 may obtain the control condition for controlling the autonomous vehicle 100 based on the user input in such a manner that the navigation device of the autonomous vehicle 100 is activated according to a schedule management function or a biometric information obtaining function of the device 1000.

The autonomous vehicle 100 may receive, from the user, an input regarding the control method of the first function according to the control condition.

As described above, the control method according to an embodiment may indicate the method of associating the functions of the autonomous vehicle 100 with the functions of the device 1000.

For example, the control method may indicate a method of associating the schedule management function of the device 1000 with a driving mode determination function of the autonomous vehicle 100. As another example, the control method may indicate a method of associating the biometric information obtaining function of the device 1000 with the navigation function of the autonomous vehicle 100.

As another example, according to a health state of the user that is obtained by the device 1000 by using the biometric information obtaining function, the navigation function of the autonomous vehicle 100 is controlled, and thus the autonomous vehicle 100 may obtain a control method indicating that a destination of the autonomous vehicle 100 is set to a hospital based on a user input. As another example, according to a schedule of the user that is obtained by the device 1000 by using the schedule management function, the navigation function of the autonomous vehicle 100 is controlled, and thus the autonomous vehicle 100 may obtain a control method indicating that the destination of the autonomous vehicle 100 is set to a location corresponding to the schedule appointment, based on the user input.

The autonomous vehicle 100 may control the first function of the autonomous vehicle 100 when information received from the device 1000 satisfies the control condition.

For example, the autonomous vehicle 100 may receive the information from the device 1000 and may activate the first function of the autonomous vehicle 100 according to the control condition when the received information satisfies the control condition. For example, according to the control condition, when the biometric information obtaining function of the device 1000 is associated with the navigation function of the autonomous vehicle 100 and the autonomous vehicle 100 receives the biometric information from the device 1000, the autonomous vehicle 100 may activate the navigation function or control a specific operation. As another example, when the schedule information received from the device 1000 satisfies the control condition, the autonomous vehicle 100 may control a destination setting function of the navigation device of the autonomous vehicle 100.

The autonomous vehicle 100 may control the first function according to the input control method.

For example, the autonomous vehicle 100 may receive the information from the device 1000 and may control a corresponding function of the autonomous vehicle 100 according to the control method indicated by the received information. For example, when the autonomous vehicle 100 receives, from the device 1000, information indicating that the user has a health problem, the destination of the autonomous vehicle 100 may be set to a hospital by controlling the navigation device. As another example, when the autonomous vehicle 100 receives, from the device 1000, information indicating that the user has a live broadcasting schedule appointment in 20 minutes in building A, the destination of the autonomous vehicle 100 may be set to building A by controlling the navigation device.

The device 1000 may provide the user with the mapping information regarding the functions of the autonomous vehicle 100 communicating with the device 1000 and the functions of the device 1000.

The mapping information may indicate whether the functions of the autonomous vehicle 100 are associated with the functions of the device 1000. Alternatively, the mapping information may include information used to set association conditions for the functions of the autonomous vehicle 100 and the functions of the device 1000. For example, the mapping information may include information regarding guidelines to be described below.

Also, the device 1000 may provide the mapping information to the user. For example, the device 1000 may display the mapping information on the display included in the device 1000. As another example, the device 1000 may output the mapping information as voices, etc. through the speaker included in the device 1000. As another example, the device 1000 may transmit the mapping information to the autonomous vehicle 100 in order to output the mapping information through the display or the speaker of the autonomous vehicle 100.

The device 1000 may receive a user input regarding a control condition of a third function of the autonomous vehicle 100 which corresponds to a fourth function of the device 1000, according to the mapping information.

The control condition may indicate whether the functions of the autonomous vehicle 100 are associated with the functions of the device 1000. Also, the control condition may include the control method that is the method of controlling the autonomous vehicle 100. The control method according to an embodiment may indicate the method of associating the functions of the autonomous vehicle 100 with the functions of the device 1000.

Based on the user input, the device 1000 may receive information indicating the control condition of the third function of the autonomous vehicle 100 which corresponds to the fourth function among the functions of the device 1000. For example, based on the user input, the device 1000 may obtain information indicating the control condition of the navigation function of the autonomous vehicle 100 which corresponds to the biometric information obtaining function among the functions of the device 1000. In this case, based on the user input, the device 1000 may obtain a control condition for activating the navigation function based on the biometric information obtained from the device 1000. As another example, based on the user input, the device 1000 may obtain information indicating the control condition of the navigation function of the autonomous vehicle 100 which corresponds to the schedule management function of the device 1000. In this case, based on the user input, the device 1000 may obtain the control condition for activating the navigation function, or the like based on the schedule information obtained from the device 1000.

The device 1000 may receive, from the user, an input regarding the control method of the third condition according to the control condition.

As described above, the control method may indicate the method of associating the functions of the autonomous vehicle 100 with the functions of the device 1000.

For example, the control method may indicate the method of associating the schedule management function of the device 1000 with the driving mode determination function of the autonomous vehicle 100. As another example, the control method may indicate the method of associating the biometric information obtaining function of the device 1000 with the navigation function of the autonomous vehicle 100.

As another example, according to a health state of the user that is obtained by the device 1000 by using the biometric information obtaining function, the navigation function of the autonomous vehicle 100 is controlled, and thus the device 1000 may obtain the control method of setting the destination of the autonomous vehicle 100 to a hospital, based on the user input. As another example, according to a schedule appointment of the user that is obtained by the device 1000 by using the schedule management function, the navigation function of the autonomous vehicle 100 is controlled, and thus the device 1000 may obtain the control method of setting the destination to a location corresponding to the schedule appointment, based on the user input.

The user input may include an input, for example, a voice, a gesture, a touch screen, a button touch, or the like. The device 1000 may obtain a user input by using a method such as voice recognition, gesture recognition, or touch recognition.

Also, the user input obtained by the device 1000 may be shared with the autonomous vehicle 100.

The device 1000 may transmit the input control condition and/or the control method to the autonomous vehicle 100.

As described above, the device 1000 may obtain the control condition and/or the control method based on the user input. For example, the device 1000 may generate or receive information indicating the control condition and/or the control method based on the user input.

Also, the device 1000 may transmit the obtained control condition and/or control method to the autonomous vehicle 100. For example, the device 1000 may transmit, to the autonomous vehicle 100, the information indicating the control condition and/or the control method obtained through wireless communication with the autonomous vehicle 100. For example, the device 1000 may transmit the control condition as well as the control method to the autonomous vehicle 100.

The device 1000 may transmit, to the autonomous vehicle 100, information generated as the fourth function is activated.

The device 1000 may activate the fourth function among the functions activatable in the device 1000 according to the user input. Also, the device 1000 may transmit, to the autonomous vehicle 100, the information obtained as the fourth function is activated. For example, the device 1000 may transmit, to the autonomous vehicle 100, the user input and the information indicating the control condition and/or the control method regarding the third function of the autonomous vehicle 100 that are obtained with regard to the fourth function. The information indicating the control condition and/or the control method regarding the third function may include information regarding a control request for the third function of the autonomous vehicle 100. For example, the device 1000 may transmit, to the autonomous vehicle 100, information used to send a request for setting the destination of the navigation device to the hospital, the information generated as the biometric information obtaining function of the device 1000 is activated according to the user input.

The method of controlling the autonomous vehicle 100 has not been described in detail with reference to FIG. 4. However, the method will be described in detail with reference to FIGS. 17A to 50.

Figure 5:
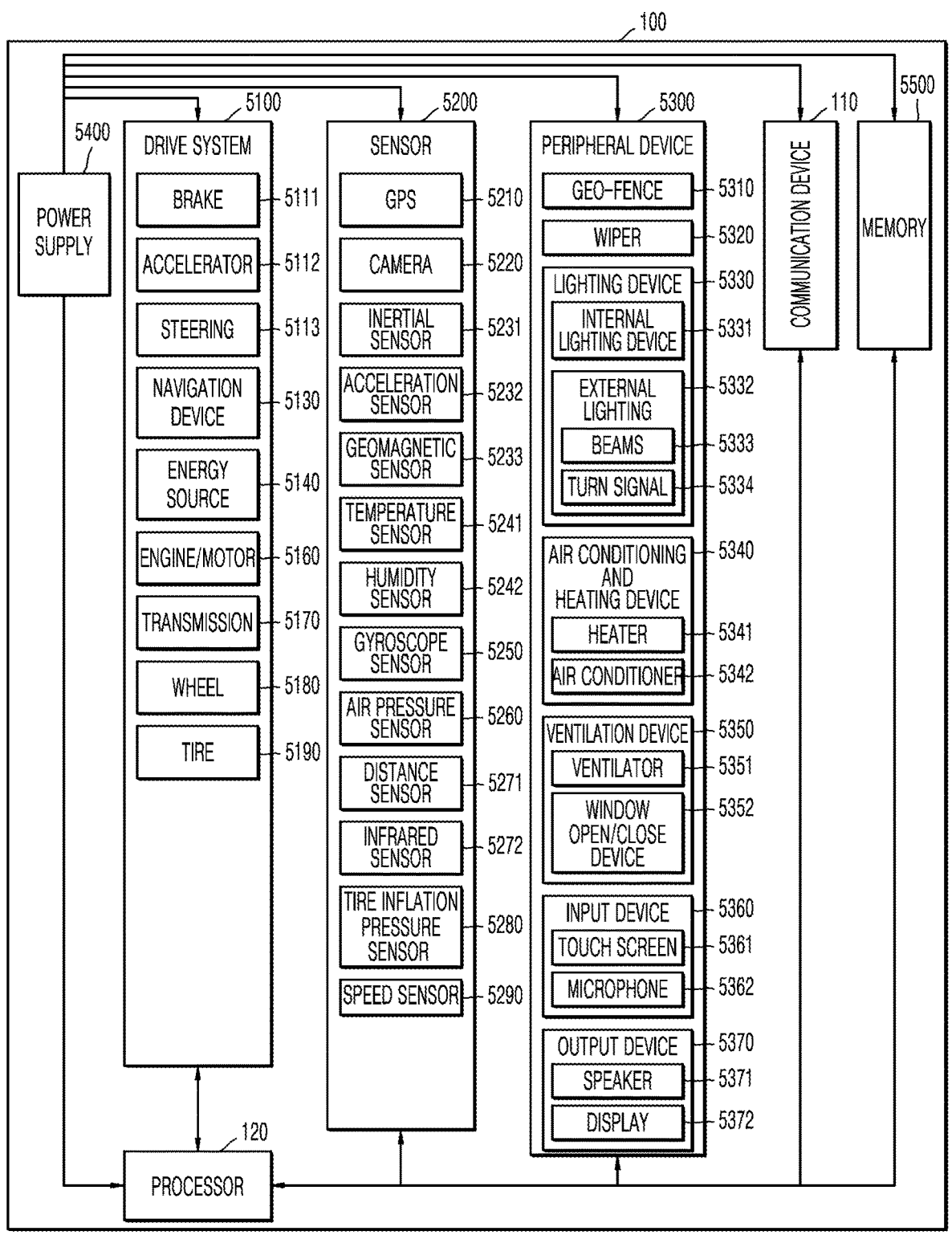
FIG. 5 is a block diagram of a device for activating functions of an autonomous vehicle, according to an embodiment.

FIG. 5 is a block diagram of an apparatus for activating the functions of the autonomous vehicle 100, according to an embodiment.

The autonomous vehicle 100 may include a power supply 5400, a drive system 5100, a sensor device 5200, a peripheral device 5300, the processor 120, and a memory 5500. FIG. 5 only shows that the autonomous vehicle 100 includes components related to the present embodiment. Therefore, one of ordinary skill in the art would understand that the autonomous vehicle 100 may further include general-purpose components in addition to the components shown in FIG. 5.

The drive system 5100 may include a brake 5111, an accelerator 5112, a steering 5113, a navigation device 5130, an energy source 5140, an engine/motor 5160, a transmission 5170, wheels 5180, and tires 5190.

The brake 5111 may be a combination of mechanisms for decelerating the autonomous vehicle 100. For example, the brake 5111 may use friction to decelerate the wheels 5180 and/or the tires 5190.

The accelerator 5112 may be a combination of mechanisms for controlling the speed of the autonomous vehicle 100 by controlling the operation speed of the engine/motor 5160. Also, the accelerator 5112 may adjust an amount of a mixture gas of fuel air flowing into the engine/motor 5160 and may control power and thrust by adjusting an opening ratio of a throttle.

The steering 5113 may be a device used to adjust a direction of the autonomous vehicle 100.

The navigation device 5130 may be a system for determining a driving route of the autonomous vehicle 100. The navigation device 5130 may actively renew the driving route while the autonomous vehicle 100 navigates. According to an embodiment, the navigation device 5130 may use a GPS 5210 and data from maps in order to determine the driving route of the autonomous vehicle 100.

The energy source 5140 may be an energy supply source used to entirely or partially provide power to the engine/motor 5160. That is, the engine/motor 5160 may convert the energy source 5140 into mechanical energy. The energy source 5140 may be, for example, gasoline, diesel, propane, fuels based on other compressed gases, ethanol, a solar panel, a battery, other electric power sources, or the like. According to another embodiment, the energy source 5140 may be, for example, a gas tank, a battery, a capacitor, a flywheel, or the like. According to an embodiment, the energy source 5140 may supply energy to a system and a device to the autonomous vehicle 100.

The engine/motor 5160 may be an arbitrary combination of an internal combustion engine, an electric motor, a steam engine, and a Stirling engine. According to another embodiment, when the autonomous vehicle 100 is a gas-electric hybrid car, the engine/motor 5160 may be a gasoline engine and an electric motor.

The transmission 5170 may transmit mechanical power from the engine/motor 5160 to the wheels 5180 and/or the tires 5190. According to an embodiment, the transmission 5170 may include a gear box, a clutch, a differential device, a driving shaft, and the like. In an embodiment in which the transmission 5170 includes driving shafts, the driving shafts may include at least one axle configured to be combined with the wheels 5180 and/or the tires 5190.

The wheels 5180 and/or the tires 5190 may be in various forms including unicycles, cycles/motor cycles, tricycles, or a four-wheeled vehicle such as a vehicle/a truck. For example, the wheels 5180 and/or the tires 5190 may be in other forms such as a form including at least 6 wheels. The wheels 5180 and/or the tires 5190 may include at least one wheel fixed to the transmission 5170 and at least one tire coupled to a rim of a wheel that may contact a driving surface.

The sensor device 5200 may include multiple sensors for detecting information regarding an environment where the autonomous vehicle 100 is located and actuators for modifying locations and/or orientations of the sensors. The sensor device 5200 may include the GPS 5210, a camera 5220, an inertial sensor 5231, an acceleration sensor 5232, a geomagnetic sensor 5233, a temperature sensor 5241, a humidity sensor 5242, a gyroscope sensor 5250, an air pressure sensor 5260, a distance sensor 5271, an infrared sensor 5272, a tire inflation sensor 5280, a speed sensor 5290, an Inertial Measurement Unit (IMU) (not shown), a RADAR unit (not shown), a LIDAR unit (not shown), a Red-Green-Blue (RGB) sensor (an illuminance sensor) (not shown), or the like. However, the present disclosure is not limited thereto. One of ordinary skill in the art may intuitively infer functions of the aforementioned sensors from their names, and thus detailed descriptions regarding the sensors will be omitted.

The GPS 5210 may be a sensor for estimating a geographical location of the autonomous vehicle 100. That is, the GPS 5210 may include a transmitter/receiver for estimating the location of the autonomous vehicle 100 with respect to the globe.

The IMU may be a combination of sensors for detecting changes in the location and orientation of the autonomous vehicle 100 based on inertial acceleration. For example, the combination of the sensors may include accelerators and gyroscopes.

The RADAR unit may be a sensor for detecting objects in an environment in which the autonomous vehicle 100 is located, by using wireless signals. According to an embodiment, in addition to the detection of the objects, the RADAR unit may detect speed and/or directions of the objects.

The LIDAR unit may be a sensor for detecting the objects in the environment in which the autonomous vehicle 100 is located, by using laser beams. In particular, the LIDAR unit may include a laser light source and/or a laser scanner for emitting laser beams and a detector for detecting reflection of the laser beams. The LIDAR unit may operate in a coherent detection mode (e.g., a mode using heterodyne detection) or an incoherent detection mode.

The camera 5220 may be a still camera or a video camera for recording 3-dimensional (3D) images within the autonomous vehicle 100. According to an embodiment, the camera 5220 may include multiple cameras, and the multiple cameras may be located inside or outside the autonomous vehicle 100.

The peripheral device 5300 may include a geo-fence 5310, wipers 5320, a lighting device 5330, an air conditioning/heating device 5340, a ventilation device 5350, an input device 5360, an output device 5370, and the memory 5500.

The lighting device 5330 may include an internal lighting device 5331 and an external lighting device 5332.

The external lighting device 5332 may include beams 5333 and turn signals 5334.

The air conditioning/heating device 5340 may include a heater 5341 and an air conditioner 5342.

The ventilation device 5350 may include a ventilator 5351 and a window open/close device 5352.

The input device 5360 may be a medium for inputting data used to control the autonomous vehicle 100. For example, the input device 5360 may be a key pad, a dome switch, a touch screen 5361 (e.g., a touch pad of a touch capacitive type, a pressure resistive type, an infrared beam sensing type, a surface acoustic wave type, an integral strain gauge type, a Piezo effect type, or the like), a jog wheel, a jog switch, or the like. However, the input device 5360 is not limited thereto. Also, the input device 5360 may include a microphone 5362, and the microphone 5362 may receive an audio (e.g., a voice instruction) from a passenger in the autonomous vehicle 100.

The output device 5370 may output an audio signal or a video signal and may include a speaker 5371 and a display 5372.

The display 5372 may include at least one of a liquid crystal display (LCD), a thin film transistor-liquid crystal display (TFT LCD), an organic light-emitting diode display, a flexible display, a 3D display, and an electrophoretic display. According to an implementation type, the output device 5370 may include two or more displays 5372.

The speaker 5371 may output audio data received from the autonomous vehicle 100 or stored in the memory 5500.

The input device 5360 and the output device 5370 may include network interfaces and may be embodied as touch screens.

In general, the processor 120 controls all operations of the autonomous vehicle 100. For example, the processor 120 executes programs stored in the memory 5500 and thus may control the drive system 5100, the sensor device 5200, the peripheral device 5300, the communication device 110, and the like overall.

The communication device 110 may include at least one antenna for communicating with other devices in a wireless manner. For example, the communication device 110 may be used for communication with a cellular network or other wireless protocols and systems in a wireless manner through Wi-Fi or Bluetooth. The communication device 110 controlled by the processor 120 may receive/transmit wireless signals. For example, the processor 120 may execute programs included in the memory 5500 in order to receive/transmit the wireless signals from/to the cellular network.

The power supply 5400 may supply power to some or all components of the autonomous vehicle 100. For example, the power supply 5400 may include a rechargeable lithium ion battery or a lead-acid battery.

The memory 5500 may include a magnetic disc drive, an optical disc drive, and a flash memory. According to an embodiment, the memory 5500 may be a universal serial bus (USB) data storage device. The memory 5500 may store therein system software used to perform one or more embodiments related to the present disclosure. The system software used to perform the one or more embodiments related to the present disclosure may be stored in a portable storage medium.

Figure 6:
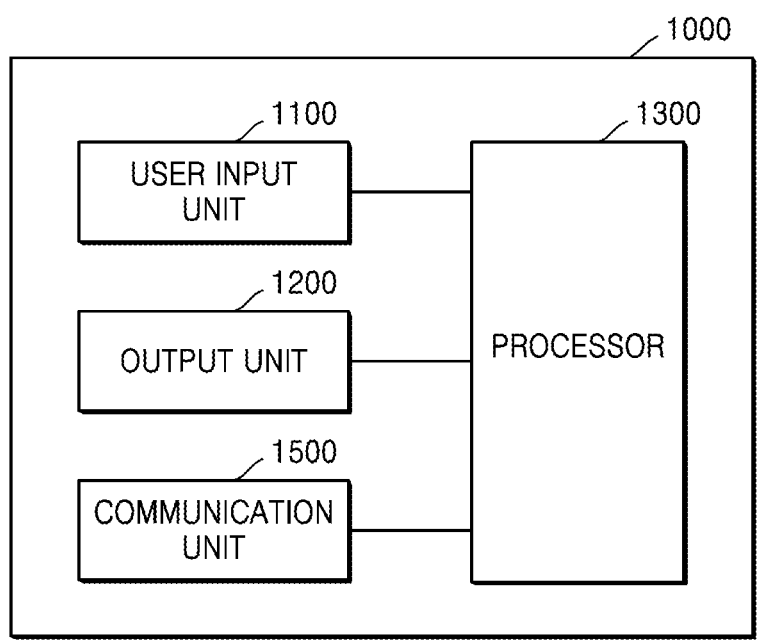
FIGS. 6 and 7 are block diagrams of a device according to an embodiment.
Figure 7:
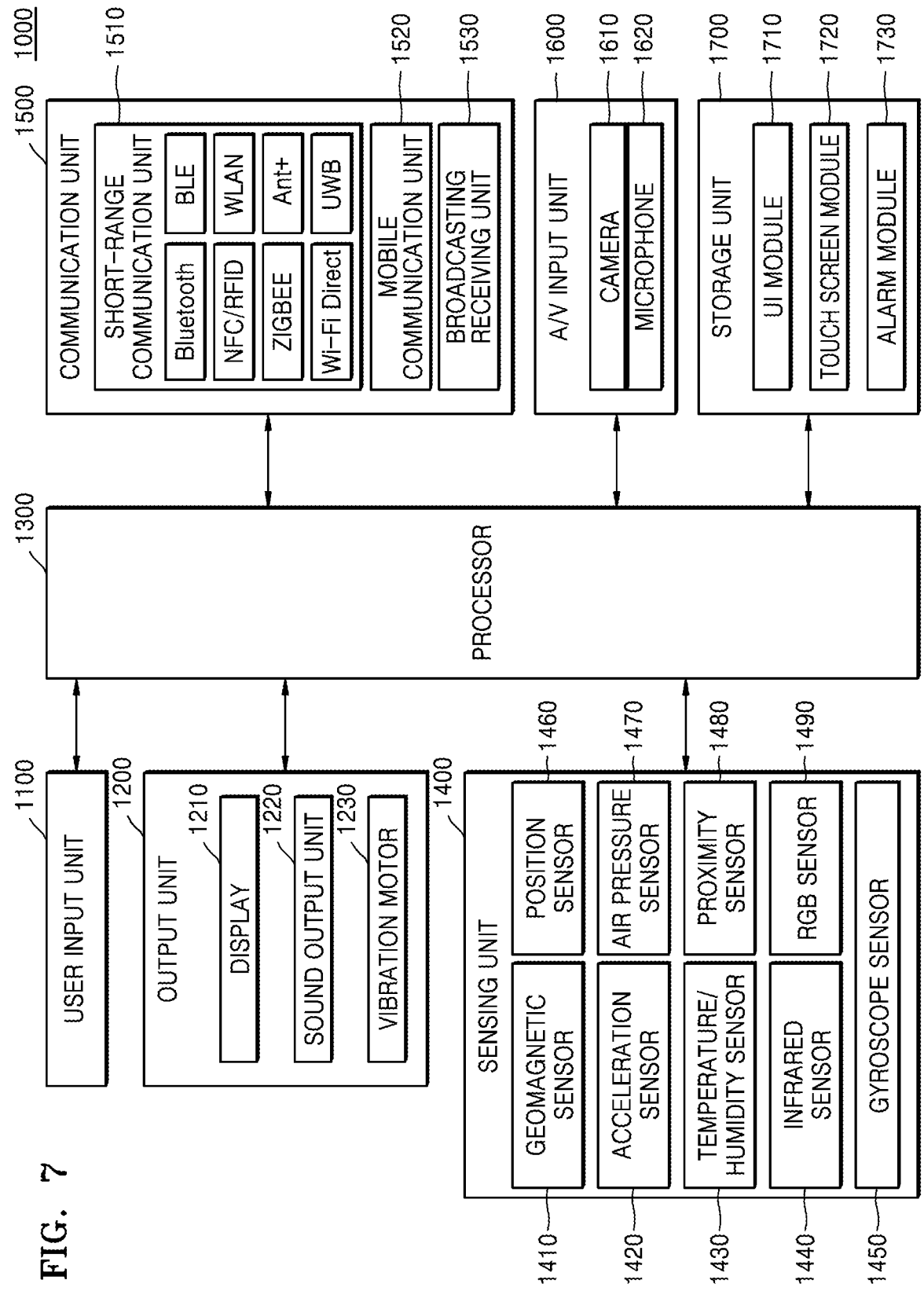

FIGS. 6 and 7 are each block diagrams of the device 1000 according to an embodiment.

As shown in FIG. 6, the device 1000 may include a user input unit 1100, an output unit 1200, a processor 1300, and a communication unit 1500. However, the device 1000 may be embodied by more or less components than the components shown in FIG. 6.

For example, as shown in FIG. 7, the device 1000 may further include a sensing unit 1400, an audio/video (A/V) input unit 1600, and a memory 1700 in addition to the user input unit 1100, the output unit 1200, the processor 1300, and the communication unit 1500.

The user input unit 1100 is a unit used by the user to input data for controlling the device 1000. For example, the user input unit 1100 may be a key pad, a dome switch, a touch pad (e.g., a touch pad of a touch capacitive type, a pressure resistive type, an infrared beam sensing type, a surface acoustic wave type, an integral strain gauge type, a Piezo effect type, or the like), a jog wheel, a jog switch, or the like. However, the user input unit 1100 is not limited thereto.

The user input unit 1100 may receive a user input with regard to control of the autonomous vehicle 100. Also, the user input unit 1100 may receive a user input (e.g., a schedule input) with regard to the general use of the device 1000.

The output unit 1200 may output an audio signal, a video signal, or a vibration signal and may include a display 1210, a sound output unit 1220, and a vibration motor 1230.

The display 1210 displays and outputs information processed by the device 1000. For example, the display 1210 may display a user interface with regard to the control of the autonomous vehicle 100 and a user interface with regard to the general use of the device 1000.

When the display 1210 and the touch pad form a layer structure and are thereby embodied as a touch screen, the display 1210 may be used as an output device as well as the input device. The display 1210 may include at least one of an LCD, a TFT LCD, an OLED display, a flexible display, a 3D display, and an electrophoretic display. According to an embodied type of the device 1000, the device 1000 may include two or more displays 1210. In this case, the two or more displays 1210 may face each other by using a hinge.

The sound output unit 1220 may output audio data received from the communication unit 1500 or stored in the memory 1700. Also, the sound output unit 1220 outputs sound signals with regard to functions (e.g., a call signal receiving sound, a message receiving sound, an alarm sound, etc.) performed by the device 1000. The sound output unit 1220 may include a speaker, a buzzer, or the like.

The vibration motor 1230 may output a vibration signal. For example, the vibration motor 1230 may output a vibration signal corresponding to an output of audio data or video data (e.g., a call signal receiving sound, a message receiving sound, etc.). Also, the vibration motor 1230 may output the vibration signal when the touch screen receives a touch input.

In general, the processor 1300 controls all operations of the device 1000. For example, the processor 1300 may execute programs stored in the memory 1700 so as to control the user input unit 1100, the output unit 1200, the sensing unit 1400, the communication unit 1500, the A/V input unit 1600, and the like, overall.

In particular, the processor 1300 may obtain the device information 210 used when the autonomous vehicle 100 obtains the vehicle information. The method of obtaining the device information 210 has been described with reference to FIGS. 1A to 4.

The sensing unit 1400 may detect a state or a surrounding state of the device 1000 and may transmit information regarding the state or the surrounding state to the processor 1300.

The sensing unit 1400 may include a geomagnetic sensor 1410, an acceleration sensor 1420, a temperature/humidity sensor 1430, an infrared sensor 1440, a gyroscope sensor 1450, a position sensor (e.g., a GPS) 1460, an air pressure sensor 1470, a proximity sensor 1480, an RGB sensor (an illuminance sensor) 1490, and the like. However, the sensors included in the sensing unit 1400 are not limited thereto. One of ordinary skill in the art may intuitively infer functions of respectively sensors from their names, and thus detailed descriptions regarding the sensors will be omitted.

The communication unit 1500 may include at least one component that enables communication between the device 1000 and the autonomous vehicle 100 or communication between the device 1000 and the server. For example, the communication unit 1500 may include a short-range wireless communication unit 1510, a mobile communication unit 1520, and a broadcast receiving unit 1530.

The short-range wireless communication unit 1510 may include a Bluetooth communication unit, a Bluetooth Low Energy (BLE) communication unit, a near field communication unit, a WLAN (Wi-Fi) communication unit, a ZigBee communication unit, an Infrared Data Association (IrDA) communication unit, a Wi-Fi Direct (WFD) communication unit, an Ultra Wideband (UWB) communication unit, an Ant+ communication unit, or the like. However, the present disclosure is not limited thereto.

The mobile communication unit 1520 may receive/transmit wireless signals from/to at least one of a station, an external terminal, and a server via a mobile communication network. The wireless signals may include various types of data regarding reception/transmission of a voice call signal, a video-call call signal, or a text message/multimedia message.

The broadcast receiving unit 1530 receives a broadcast signal and/or information relevant to broadcasts from an external device through broadcast channels. The broadcast channel may include a satellite channel and a terrestrial channel. According to an embodiment, the device 1000 may not include the broadcast receiving unit 1530.

Also, the communication unit 1530 may receive/transmit information, which is necessary to obtain the device information 210, from/to an HMD device, a server, and a peripheral device.

The A/V input unit 1600 receives an audio signal input or a video signal input and may include a camera 1610, a microphone 1620, and the like. The camera 1610 may obtain image frames of a still image, a moving image, etc. through an image sensor in a video call mode or a photographing mode. Images captured by the image sensor may be processed by the processor 1300 or an additional image processor (not shown).

The image frames processed by the camera 1610 may be stored in the memory 1700 or transmitted to the outside through the communication unit 1500. There may be at least two cameras 1610, depending on a terminal type.

The microphone 1620 receives an external sound signal and transforms the received external sound signal into electrical voice data. For example, the microphone 1620 may receive a sound signal from an external device or a speaker.

The microphone 1620 may use various noise removal algorithms to remove noise generated while receiving external sound signals.

The memory 1700 may store programs for processing and controlling the processor 1300 or may store data input to or output by the device 1000.

The memory 1700 may include a storage medium of various types, for example, a flash memory type, a hard disk type, a multimedia card micro type, a memory card type (e.g., an SD or XD memory, etc.), random access memory (RAM), static RAM (SRAM), read-only memory (ROM), electrically erasable programmable ROM (EEPROM), programmable ROM (PROM), a magnetic memory type, a magnetic disk type, an optical disk type, etc.

The programs stored in the memory 1700 may be classified into modules, depending on their functions. For example, the programs may be classified into a UI module 1710, a touch screen module 1720, an alarm module 1730, and the like.

The UI module 1710 may provide a specialized UI, a specialized GUI, and the like which interwork with the device 1000, depending on applications. The touch screen module 1720 may detect touch gestures of the user on the touch screen and may transmit information regarding the touch gestures to the processor 1300. The touch screen module 1720 according to some embodiments may recognize and analyze touch codes. The touch screen module 1720 may be separate hardware including a controller.

The touch screen may include various sensors inside or close to the touch screen in order to detect touches or proximity touches on the touch screen. An example of the sensor to detect the touch on the touch screen may be a tactile sensor. The tactile sensor detects a contact of a specific object by at least as much as a person can detect. The tactile sensor may detect various types of information such as the roughness of a contact surface, the hardness of a contact object, the temperature of a contact point, or the like.

In addition, the touch screen may include a proximity sensor for detecting touches on the touch screen.

The proximity sensor denotes a sensor for detecting existence of an object that approaches or exists around a certain detection surface by using power of an electromagnetic field or infrared rays without mechanical contact. Examples of the proximity sensor may be a transmission type photoelectric sensor, a direct reflection type photoelectric sensor, a mirror reflection type photoelectric sensor, a high-frequency oscillation type proximity sensor, a capacitive type proximity sensor, a magnetic type proximity sensor, an infrared proximity sensor, or the like. The touch gesture of the user may include a tap gesture, a touch & hold gesture, a double tap gesture, a drag gesture, a panning gesture, a flick gesture, a drag & drop gesture, a swipe gesture, or the like.

The alarm module 1730 may generate a signal for notifying generation of events of the device 1000. Examples of the events generated in the device 1000 may be receiving of a call signal and a message, a key signal input, a schedule appointment alarm, or the like. The alarm module 1730 may output an alarm signal as a video signal through the display 1210, as an audio signal through the sound output unit 1220, and as a vibration signal through the vibration motor 1230.

FIGS. 8 to 16 show a method of controlling the autonomous vehicle 100 communicating with a wearable device 1001 when the device 1000 is the wearable device 1001, and the autonomous vehicle 100 controlled based on the device information 210 obtained from the wearable device 1001, according to an embodiment.

Figure 8:
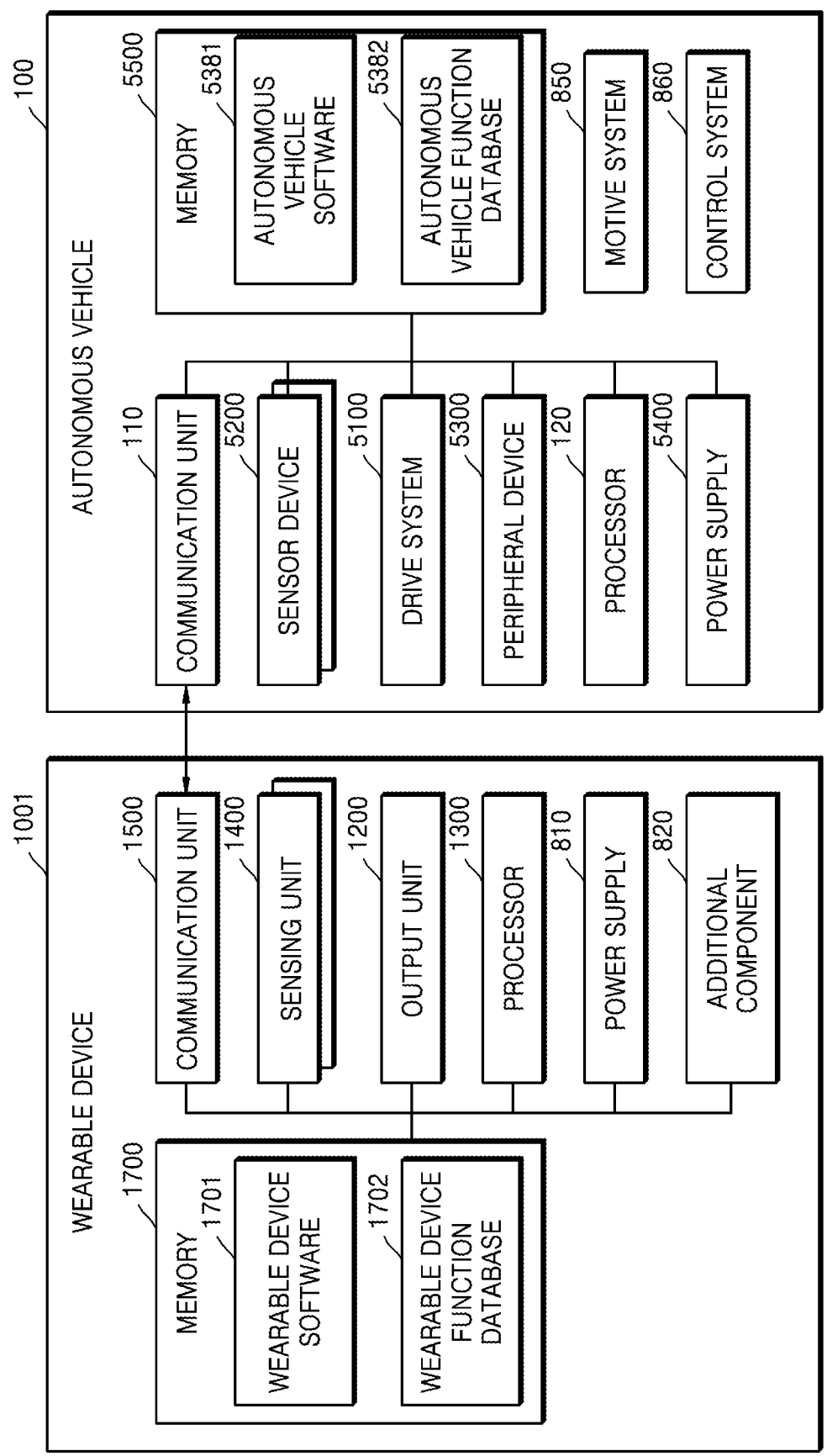
FIG. 8 is a block diagram of an autonomous vehicle and a wearable device that communicates with the autonomous vehicle, according to an embodiment.

FIG. 8 is a block diagram of the autonomous vehicle 100 and the wearable device 1001 that communicates with the autonomous vehicle 100, according to an embodiment.

As shown in FIG. 8, the wearable device 1001 may include the communication unit 1500, the sensing unit 1400, an output unit 1200, the processor 1300, a power supply 810, an additional component 820, and the memory 1700. Also, the autonomous vehicle 100 may include the communication device 110, the sensor device 5200, the drive system 5100, the peripheral device 5300, the processor 120, the power supply 5400, the memory 5500, a motive system 850, and a control system 860.

However, the wearable device 1001 or the autonomous vehicle 100 may be embodied by more or less components than the components of FIG. 8.

The sensor device 5200 may include the GPS 5210. A location determination system of the autonomous vehicle 100 may include, for example, a dead reckoning system, a Galileo system, a Bedou system, a GLOSNASS system, and a long range navigation (LORAM) system in addition to the GPS 5210.

The motive system 850 may directly control devices such as the engine/motor 5160, a power train, the wheels 5180, and the steering 5113 of the autonomous vehicle 100.

The control system 860 may control movements of the autonomous vehicle 100. The control system 860 may be included in the processor 120 and may generate signals for controlling the movements of the autonomous vehicle 100. The autonomous vehicle 100 may include software used to determine a current location and a driving route of the autonomous vehicle 100. The control system 860 may transmit instructions to the motive system 850 and/or the memory 5500.

The memory 5500 may store autonomous vehicle software 5381 for driving the autonomous vehicle 100. The autonomous vehicle software 5381 may control the operations of the autonomous vehicle 100.

An autonomous vehicle function database 5382 may store data used to identify the functions of the autonomous vehicle 100 and may store information used to associate the functions of the autonomous vehicle 100 with those of the wearable device 1001.

The guidelines indicating the method of associating the functions of the autonomous vehicle 100 with the functions of the wearable device 1001 may be pre-loaded to the autonomous vehicle function database 5382.

The functions of the autonomous vehicle 100 and those of the wearable device 1001 may be pre-loaded. The wearable device 1001 may include a smart band, a smart watch, smart glasses, a mobile computing device (e.g., a smart phone), or the like. However, the present disclosure is not limited thereto.

The additional component 820 may include the display 1210. The display 1210 may provide the user with information. When the display 1210 is a touch screen, the display 1210 may receive a user input.

The sensing unit 1400 may include the GPS. The location determination system of the wearable device 1001 may include the dead reckoning system, the Galileo system, the Bedou system, the GLOSNASS system, and the LORAN system in addition to the GPS.

The wearable device 1001 may include a speaker, a vibration device, voice recognition software, or the like. However, the present disclosure is not limited thereto.

The processor 1300 of the wearable device 1001 may receive instructions from the memory and may execute the software in order to perform the functions described herein.

The memory 1700 may include a wearable device function database 1702. The wearable device function database 1702 may store the functions of the wearable device 1001. The wearable device function database 1702 may store data used to identify the functions of the wearable device 1001 and may store the guidelines including information used to associate the functions of the wearable device 1001 with the functions of the autonomous vehicle 100.

The guidelines indicating the method of associating the functions of the autonomous vehicle 100 with the functions of the wearable device 1001 may be pre-loaded to the wearable device function database 1702.

Figure 9:
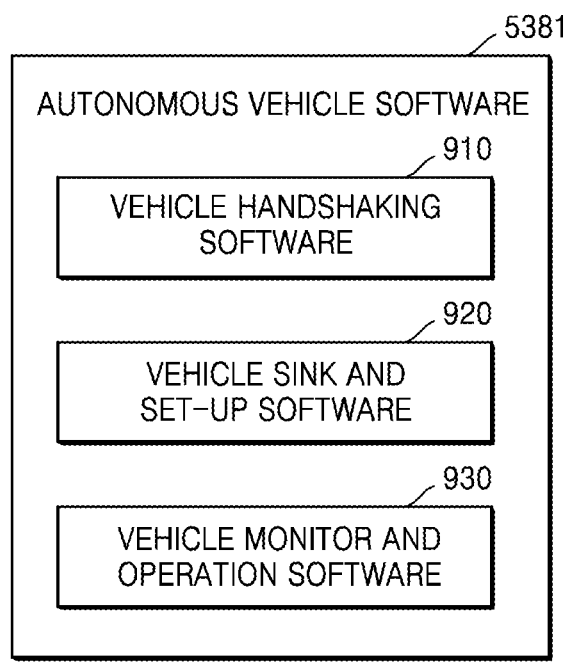
FIG. 9 is a block diagram of vehicle software used to control an autonomous vehicle, according to an embodiment.

FIG. 9 is a block diagram of autonomous vehicle software 5381 used to control the autonomous vehicle 100, according to an embodiment.

The autonomous vehicle software 900 may include vehicle handshaking software 910, vehicle sink and set-up software 920, and vehicle monitor and operation software 930. However, the present disclosure is not limited thereto.

The vehicle handshaking software 910 may include software that enables handshaking or pairing between the autonomous vehicle 100 and the wearable device 1001.

The vehicle sink and set-up software 920 may be software used to associate the functions of the autonomous vehicle 100 with the functions of the wearable device 1001 and synchronize the functions of the autonomous vehicle 100 with the functions of the wearable device 1001.

The vehicle monitor and operation software 930 may control the autonomous vehicle 100 in order to monitor data of the autonomous vehicle 100 and data received from the wearable device 1001 and trigger the functions of the autonomous vehicle 100 and the wearable device 1001, which are associated with each other, in the autonomous vehicle 100.

Figure 10:
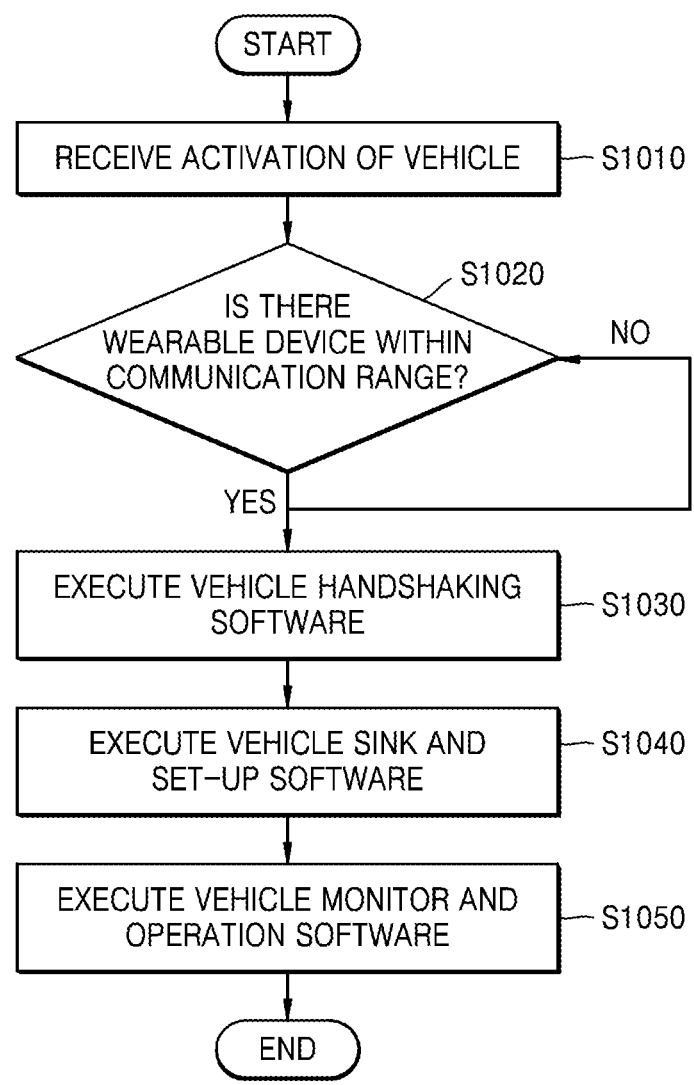
FIG. 10 is a flowchart of a method of controlling an autonomous vehicle through communication of the autonomous vehicle with a device, according to an embodiment.

FIG. 10 is a flowchart of a method of controlling the autonomous vehicle 100 through communication of the autonomous vehicle 100 with the wearable device 1001, according to an embodiment.

In operation S1010, the autonomous vehicle 100 receives activation of the autonomous vehicle 100. In this case, autonomous vehicle software may be activated in the autonomous vehicle 100.

In operation S1020, the autonomous vehicle 100 determines whether the wearable device 1001 is within a communication range.

When data is received from the wearable device 1001 within the communication range, the autonomous vehicle 100 may determine that the wearable device 1001 is within the communication range. In this case, the communication range may be the inside of the autonomous vehicle 100 or within a certain distance from the autonomous vehicle 100. If no data is received from the wearable device 1001, the autonomous vehicle 100 may determine that there is no wearable device 1001 within a current communication range and may look for signals from the wearable device 1001.

In operation S1030, the autonomous vehicle 100 executes vehicle handshaking software.

The autonomous vehicle 100 may execute the vehicle handshaking software to perform pairing between the autonomous vehicle 100 and the wearable vehicle 1001.

In operation S1040, the autonomous vehicle 100 may execute vehicle sink and set-up software.

The autonomous vehicle 100 may execute the vehicle sink and set-up software when at least one function of the autonomous vehicle 100 is synchronized with the wearable device 1001.

In operation S1050, the autonomous vehicle 100 may execute the vehicle monitor and operation software.

The vehicle monitor and operation software may control the autonomous vehicle 100 to monitor the data of the autonomous vehicle 100 and data received from the wearable device 1001 and trigger the functions of the autonomous vehicle 100 and the wearable device 1001, which are associated with each other, in the autonomous vehicle 100.

Figure 11:
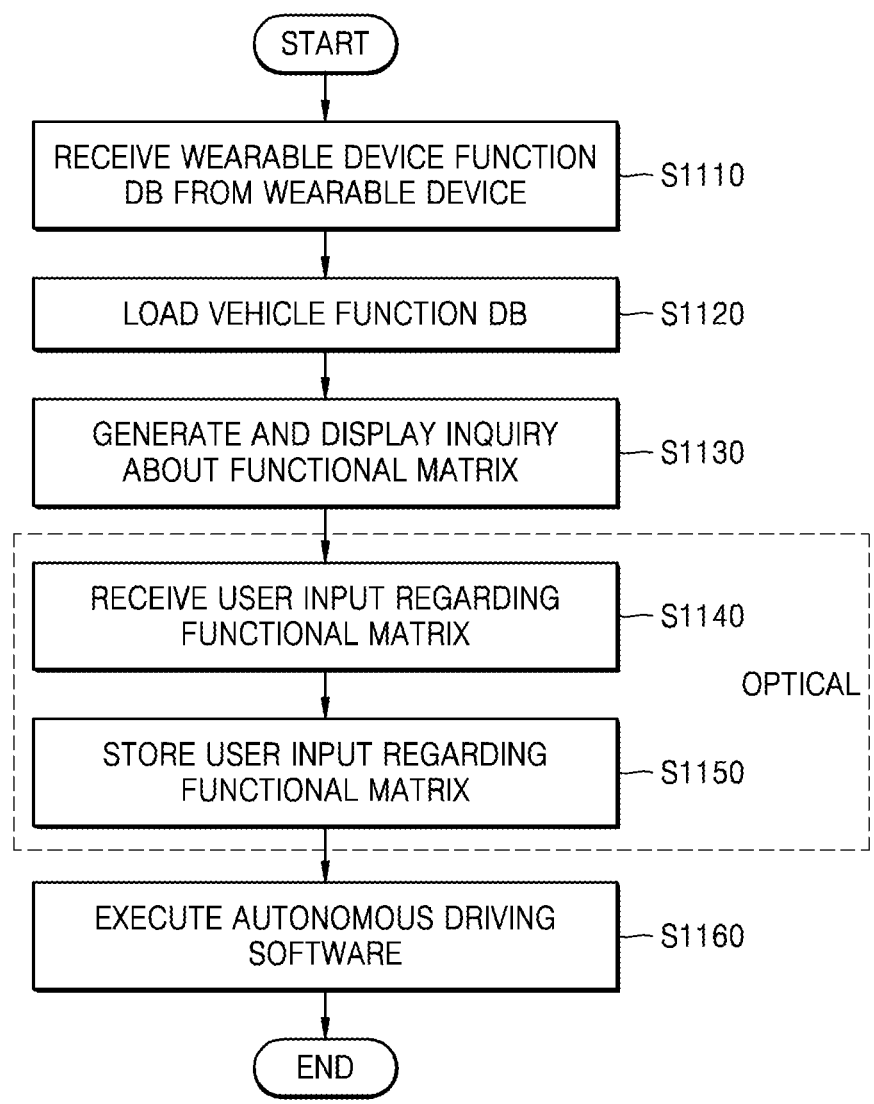
FIG. 11 is a flowchart of a method of controlling an autonomous vehicle by using a functional matrix, according to an embodiment.

FIG. 11 is a flowchart of a method of controlling the autonomous vehicle 100 by using a functional matrix, according to an embodiment.

In operation S1110, the autonomous vehicle 100 receives information of the wearable device function database 1702 of the wearable device 1001 from the wearable device 1001. The autonomous vehicle 100 may receive function information from the wearable device function database 1702 through the vehicle sink and set-up software 920.

In operation S1120, the autonomous vehicle 100 may store the received information in an autonomous vehicle function database 5382.

In operation S1130, the autonomous vehicle 100 may display at least one inquiry on the display 5372 of the autonomous vehicle 100.

In operation S1140, the autonomous vehicle 100 receives a user input regarding the functional matrix. The autonomous vehicle 100 may receive a user input corresponding to the at least one inquiry that is displayed in operation S1130.

In operation S1150, the autonomous vehicle 100 stores the user input regarding the functional matrix.

In operation S1160, the autonomous vehicle 100 executes vehicle software. The autonomous vehicle 100 may execute the vehicle software for activating the functions of the autonomous vehicle 100 according to the user input regarding the functional matrix.

Figure 12:
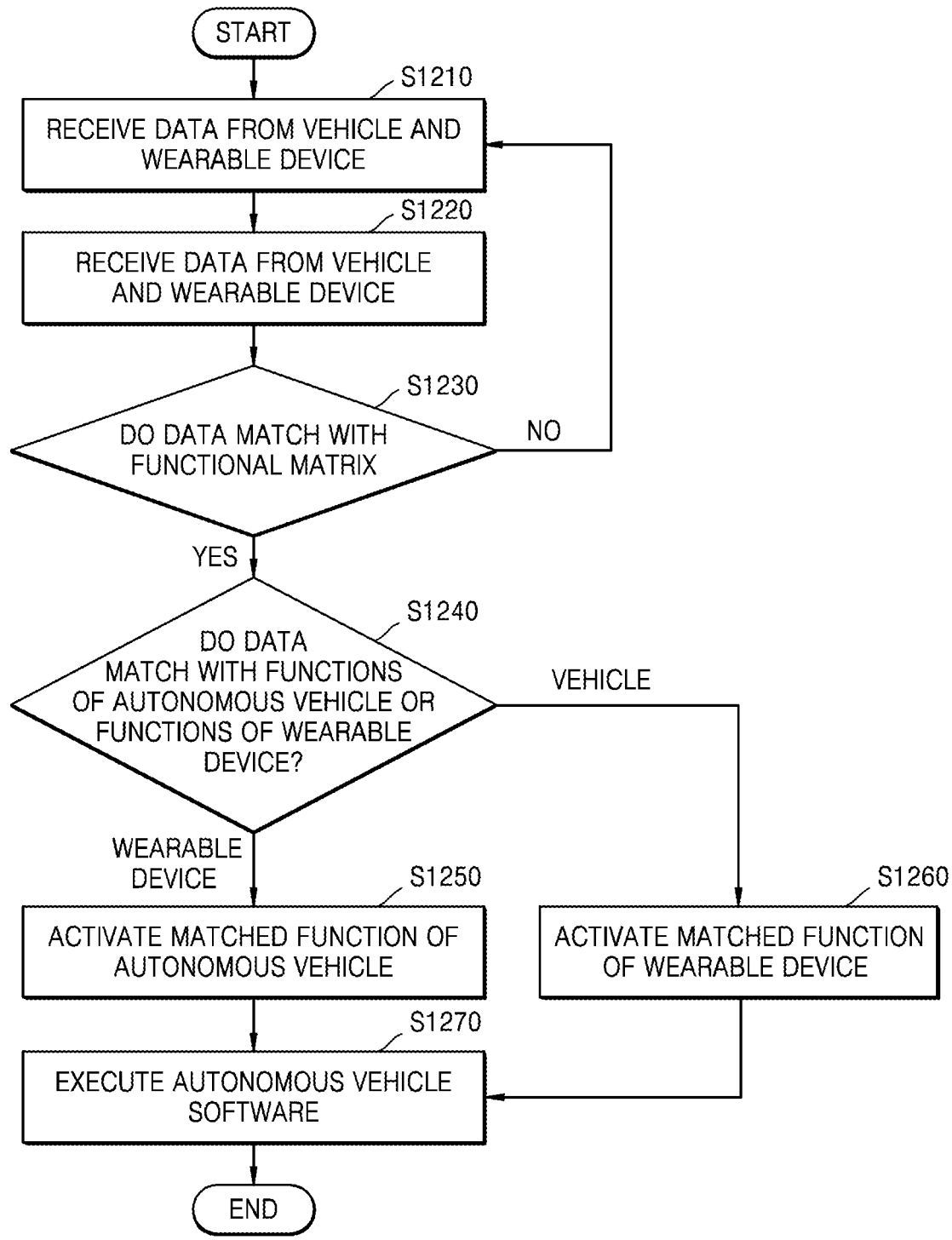
FIG. 12 is a flowchart of a method of controlling an autonomous vehicle according to a function matching with received data, according to an embodiment.

FIG. 12 is a flowchart of a method of controlling the autonomous vehicle 100 according to a function matching with received data, according to an embodiment.

In operation S1210, the processor 120 receives data from the autonomous vehicle 100 and the wearable device 1001. For example, the data received from the autonomous vehicle 100 may include information regarding an accelerator or a brake, and the data received from the wearable device 1101 may include information regarding a pulse rate or a respiration rate.

In operation S1220, the processor 120 compares the functional matrix, which has been stored, with the data received in operation S1210.

In operation S1230, the processor 120 may determine whether the data received from the autonomous vehicle 100 and the data received from the wearable device 1001 match with functions based on the functional matrix, according to a comparison result output in operation S1220. If the data received from the autonomous vehicle 100 and the data received from the wearable device 1001 match with the functions, operation S1240 is performed. If not, operation S1210 is performed.

In operation S1240, the processor 120 may determine whether the matched functions are the functions of the autonomous vehicle 100 or the functions of the wearable device 1001.

In operation S1250, the processor 120 may activate the functions of the autonomous vehicle 100 when the matched functions are the functions of the autonomous vehicle 100 according to a determination result obtained in operation S1240.

In operation S1260, the processor 120 may activate the functions of the wearable device 1001 when the matched functions are the functions of the wearable device 1001 according to the determination result obtained in operation S1240.

In operation S1270, the processor 120 may execute software of the autonomous vehicle 100 with regard to the matching of the data of the autonomous vehicle 100 or the wearable device 1001 with the functions.

Figure 13:
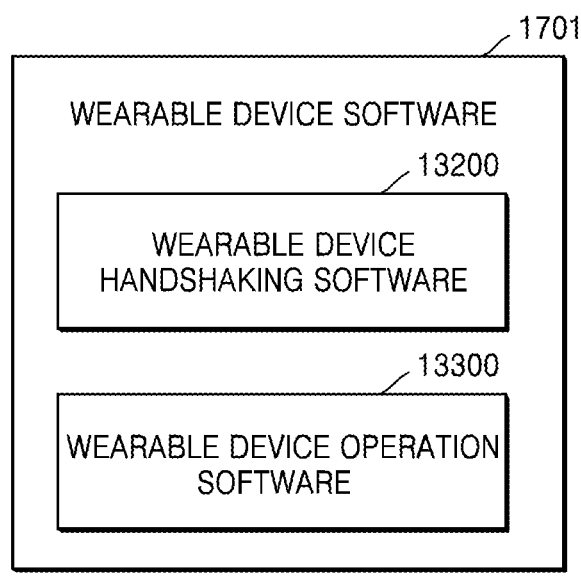
FIG. 13 is a block diagram of wearable device software used to control an autonomous vehicle, according to an embodiment.

FIG. 13 is a block diagram of wearable device software 1701 used to control the autonomous vehicle 100, according to an embodiment.

The wearable device software 1701 may include wearable device handshaking software 13200 and wearable device execution software 1330. However, the present disclosure is not limited thereto.

The wearable device handshaking software 13200 may include software used to perform handshaking or pairing between the wearable device 1001 and the autonomous vehicle 100.

The wearable device execution software 13300 may execute operations associated with the wearable device 1001.

Figure 14:
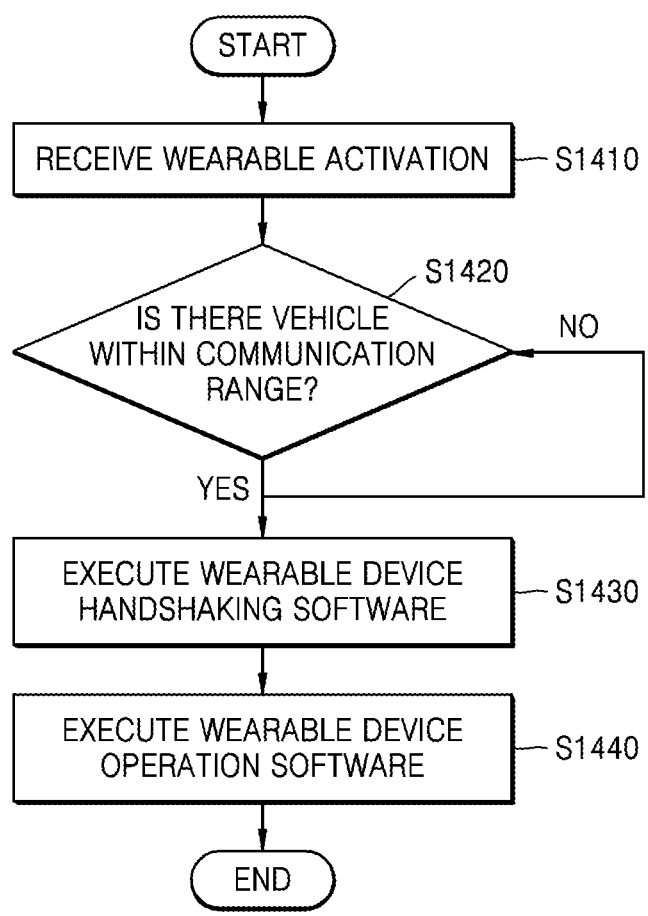
FIG. 14 is a flowchart of a method of controlling an autonomous vehicle through communication with a wearable device within a communication range, according to an embodiment.

FIG. 14 is a flowchart of a method of controlling the autonomous vehicle 100 through communication with the wearable device 1001 within a communication range, according to an embodiment.

In operation S1410, the wearable device 1001 receives activation of a vehicle. In this case, the wearable device software 1701 may be activated in the wearable device 1001.

In operation S1420, the wearable device 1001 may determine whether the autonomous vehicle 100 is within the communication range.

The wearable device 1001 may determine that the autonomous vehicle 100 is within the communication range if data is received from the autonomous vehicle 100 within the communication range. However, when no data is received from the autonomous vehicle 100, the wearable device 1001 may determine that there is no autonomous vehicle 100 within a current communication range and may look for signals from the autonomous vehicle 100.

In operation S1430, the wearable device 1001 may execute the vehicle handshaking software.

The wearable device 1001 may execute the vehicle handshaking software to perform the pairing between the autonomous vehicle 100 and the wearable device 1001.

In operation S1440, the wearable device 1001 may execute the wearable device execution software 13300.

Figure 15:
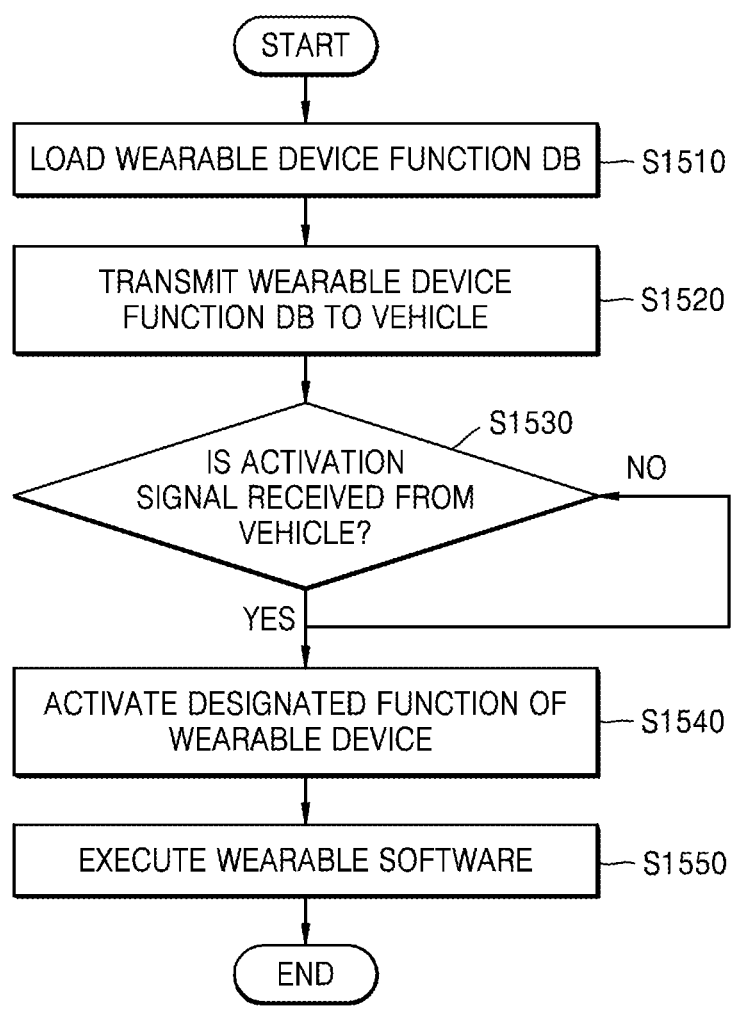
FIG. 15 is a flowchart of a method of controlling a wearable device that communicates with an autonomous vehicle, according to an embodiment.

FIG. 15 is a flowchart of a method of controlling the wearable device 1001 that communicates with the autonomous vehicle 100, according to an embodiment.

In operation S1510, the wearable device 1001 loads information stored in the wearable device function database 1702 to the wearable device 1001.

In operation S1520, the wearable device 1001 transmits the loaded information stored in the wearable device function database 1702 to the autonomous vehicle 100.

In operation S1530, the wearable device 1001 determines whether activation signals are received from the autonomous vehicle 100.

In this case, when no activation signal is received from the autonomous vehicle 100, the wearable device 1001 may keep looking for signals from the autonomous vehicle 100.

When the wearable device 1001 receives the activation signal from the autonomous vehicle 100, operation S1540 may be performed.

In operation S1540, the wearable device 1001 activates the functions of the wearable device 1001 when the activation signal is received from the autonomous vehicle 100.

In operation S1550, the wearable device 1001 executes the wearable device software 1701. The wearable device 1001 may activate a designated function of the wearable device 1001 by executing the wearable device software 1701.

Figure 16:
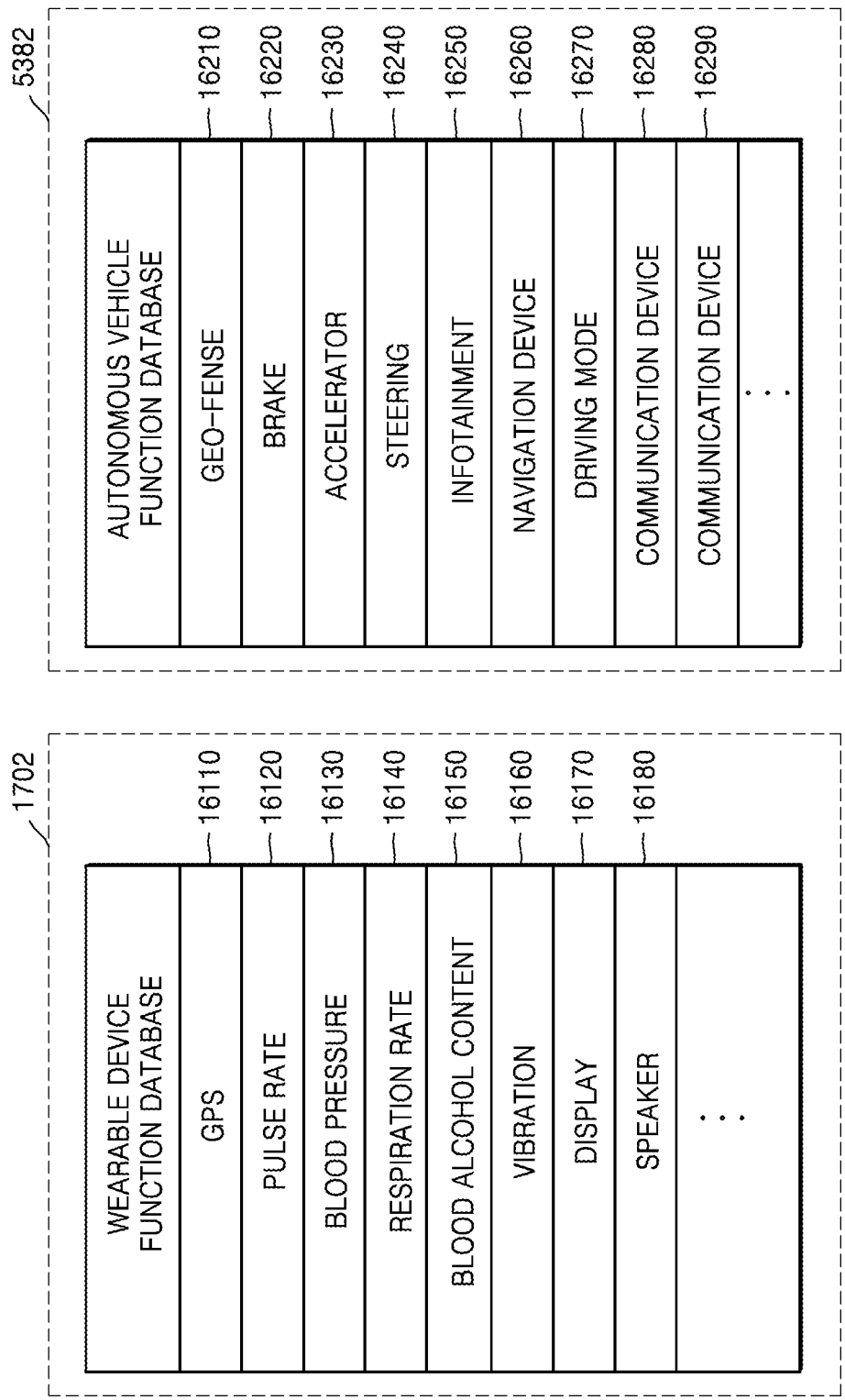
FIG. 16 shows databases respectively included in an autonomous vehicle and a wearable device, according to an embodiment.

FIG. 16 shows databases respectively included in the autonomous vehicle 100 and the wearable device 1001, according to an embodiment.

The wearable device function database 1702 may include GPS-related information 16110, pulse rate-related information 16120, blood pressure-related information 16130, respiration rate-related information 16140, blood alcohol content-related information 16150, vibration-related information 16160, display-related information 16170, and speaker-related information 16180.

The autonomous vehicle function database 5382 may include geo fence-related information 16210, brake-related information 16220, accelerator-related information 16230, steering-related information 16240, convenience facility-related information 16250, navigation-related information 16260, driving mode-related information 16270, communication device-related information 16280, and atmosphere control-related information 16290.

The autonomous vehicle 100 may associate one or more functions of the wearable device 1001 with functions of the autonomous vehicle 100 based on the guidelines. For example, the autonomous vehicle 100 may associate an accelerator function or a brake function with a function of monitoring a pulse rate, based on the guidelines. Therefore, when a brake operates, the autonomous vehicle 100 may transmit a signal for sending a request to monitor the pulse rate to the wearable device 1001.

Figure 17A:
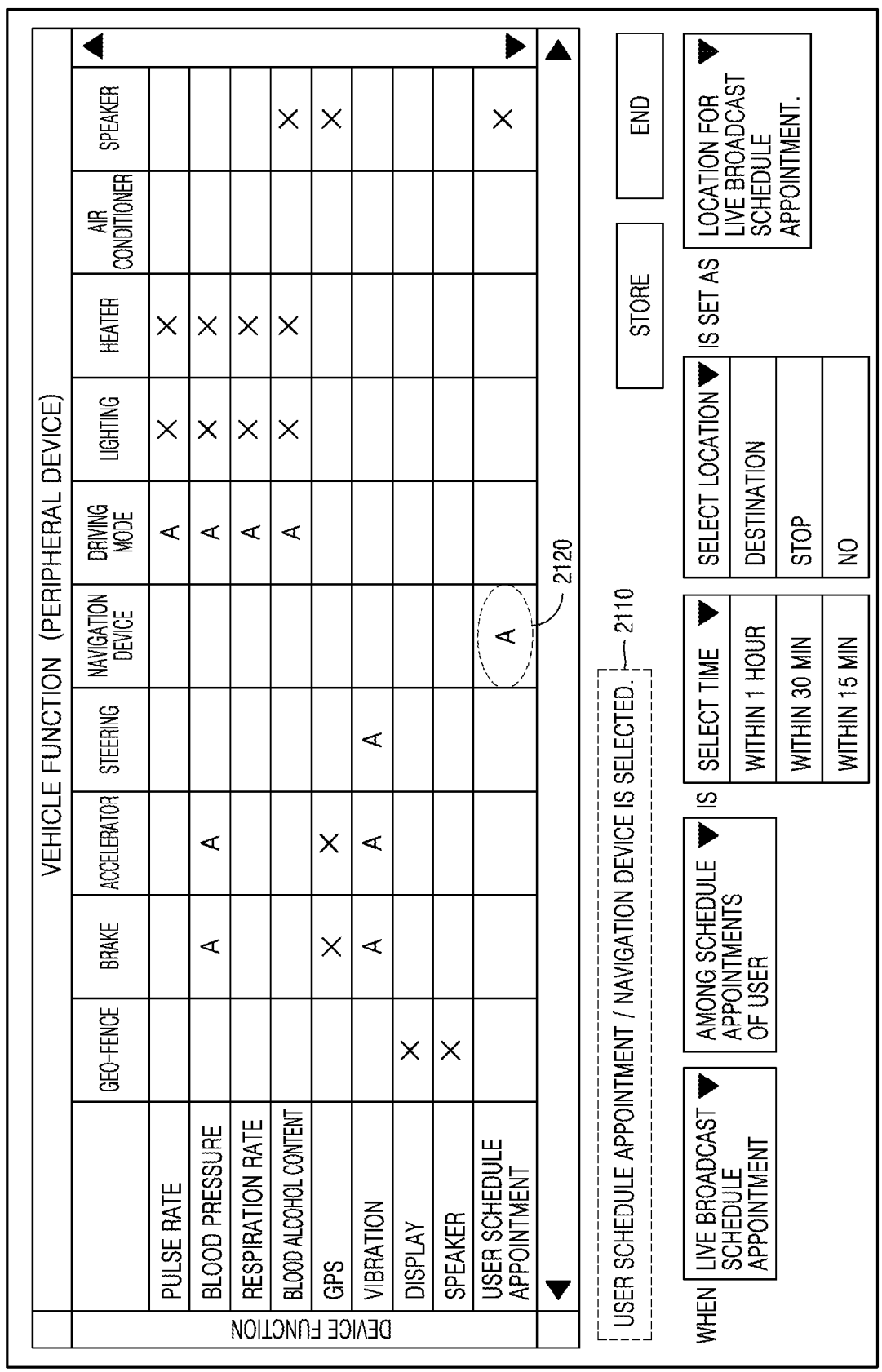
FIGS. 17A to 17C are diagrams showing screens for setting guidelines that associate functions of an autonomous vehicle with functions of a device, according to an embodiment.
Figure 17B:
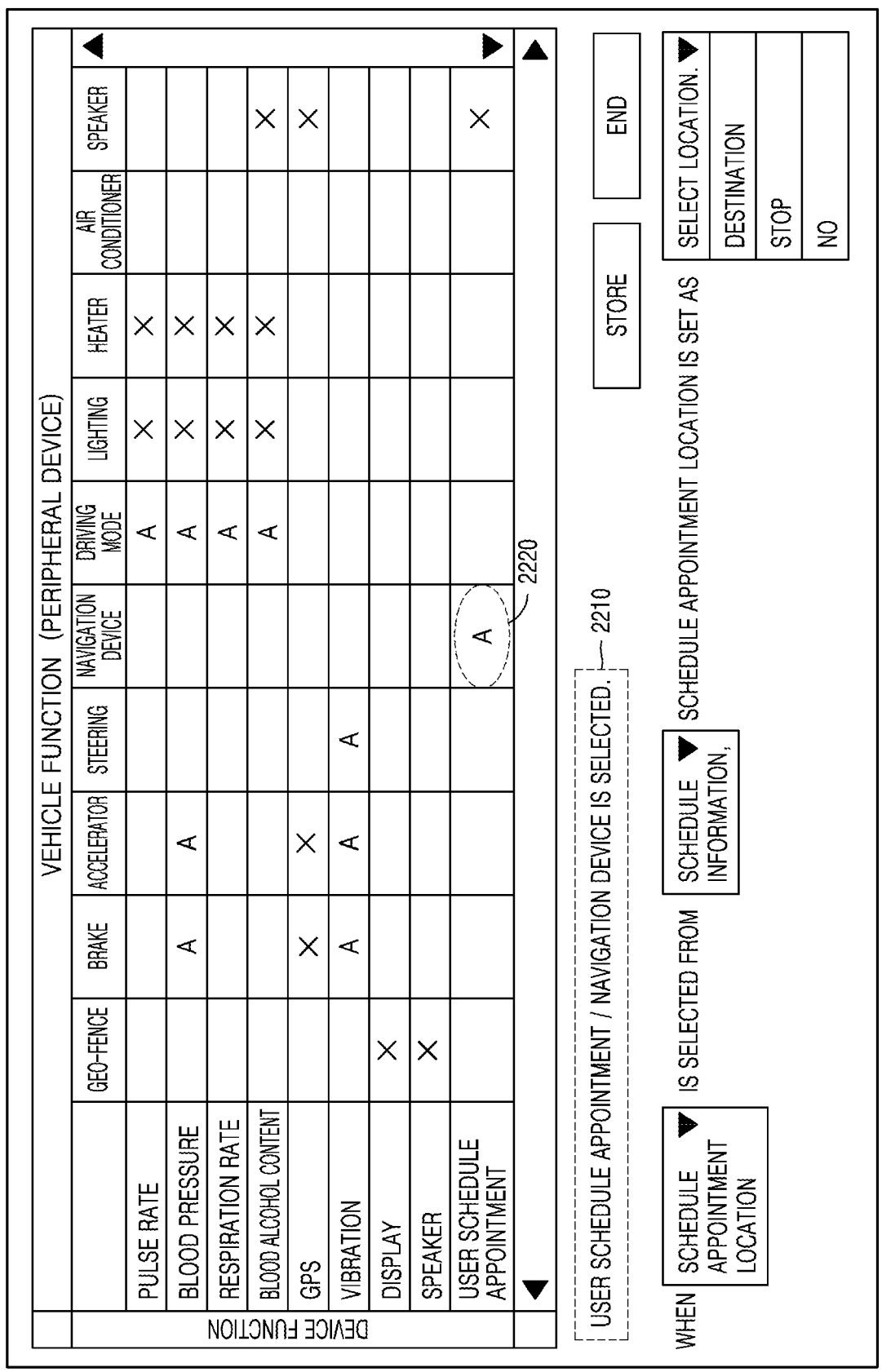
Figure 17C:
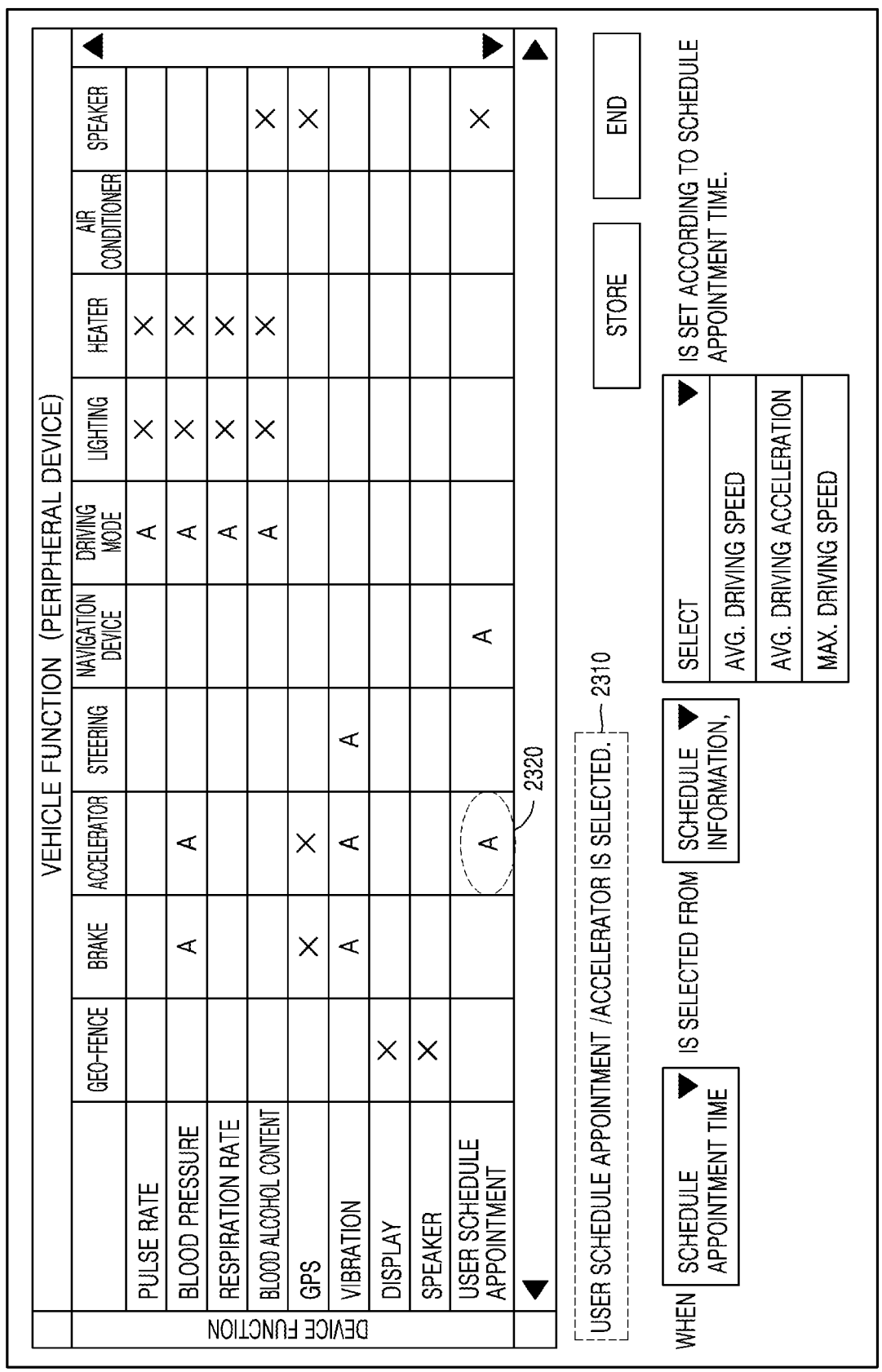

FIGS. 17A to 17C are diagrams showing screens for setting the guidelines that associate functions of the autonomous vehicle 100 with functions of the device 1000, according to an embodiment. FIGS. 17A to 17C show a case where the device information 210 is schedule information.

The autonomous vehicle 100 may renew the guidelines indicating the correlation between the functions of the autonomous vehicle 100 and the functions of the device 1000 by receiving a user input. The autonomous vehicle 100 may renew guidelines indicating a correlation between functions of the autonomous vehicle 100 and functions of the device 1000, which have had no preset correlation, by receiving a user input.

"X" indicated in the inside of diagrams of FIGS. 17A to 17C may indicate a case where a correlation between the functions of the autonomous vehicle 100 and the functions of the device 1000 is preset, and "A" indicated in the inside of the diagrams may indicate a case where a correlation between the functions of the autonomous vehicle 100 and the functions of the device 1000 is set by the user.

The guidelines may be determined based on a user input. Hereinafter, an example of determining the guidelines based on a user input will be described with reference to FIG. 17A.

For example, a case 2120 where a function of the device 1000 is a user's schedule function, and a function of the autonomous vehicle 100 is a navigation function is described. The navigation function may be activated by a relevant device included in the autonomous vehicle 100. For example, the navigation function may be activated by the navigation device 5130 included in the autonomous vehicle 100.

A correlation between the navigation function of the autonomous vehicle 100 and the user's schedule function of the device 1000 may not be preset. By receiving a user input, the autonomous vehicle 100 may set a correlation between the navigation function of the autonomous vehicle 100 and the user's schedule function of the device 1000, which have not had any preset correlation.

A setting that has never been preset may be determined according to the user input. According to the user input, the navigation function of the autonomous vehicle 100 and the user's schedule function of the device 1000 may be selected to set the correlation. Also, the selected functions of the autonomous vehicle 100 and the device 1000 may be displayed on a certain region 2110 of the display of the device 1000 and/or the autonomous vehicle 100.

A correlation between the selected functions of the device 1000 and the autonomous vehicle 100 may be determined based on the user input. For example, based on the user input, when there is a live broadcast schedule appointment among a user's schedule appointments within an hour, the autonomous vehicle 100 may determine the correlation between the navigation function of the autonomous vehicle 100 and the user's schedule function of the device 1000 in order to determine a place of the live broadcast schedule appointment as a destination. As another example, based on the user input, the autonomous vehicle 100 may determine a stop as the place of the live broadcast schedule appointment when there is a live broadcast schedule appointment among the user's schedule appointments within 30 minutes.

Hereinafter, another example of determining the guidelines based on a user input will be described with reference to FIG. 17B.

For example, a case 2220 where a function of the device 1000 is the user's schedule function (a place of a schedule appointment) and a function of the autonomous vehicle 100 is the navigation function will be described. The navigation function may be activated by a relevant device included in the autonomous vehicle 100. For example, the navigation function may be activated by the navigation device 5130 included in the autonomous vehicle 100. Regarding descriptions of FIG. 17B, the descriptions of FIG. 17A may be referred to.

Also, the selected functions of the device 1000 and the autonomous vehicle 100 may be displayed on a certain region 2210 of the display of the device 1000 and/or the autonomous vehicle 100.

A correlation between the selected functions of the device 1000 and the autonomous vehicle 100 may be determined based on the user input. For example, based on the user input, when a place of the schedule appointment is building XXX, the autonomous vehicle 100 may determine the correlation between the navigation function of the autonomous vehicle 100 and the schedule function of the device 1000 in order to determine the building XXX as a destination. As another example, based on the user input, the autonomous vehicle 100 may determine the correlation between the navigation function of the autonomous vehicle 100 and the schedule function of the device 1000 in order to add, as a stop, the building XXX that is the place for the schedule appointment.

Hereinafter, another example of determining the guidelines based on a user input will be described with reference to FIG. 17C.

For example, a case 2320 where the function of the device 1000 is the user's schedule function (a schedule appointment time) and the function of the autonomous vehicle 100 is an accelerator function will be described. The navigation function may be activated by a relevant device included in the autonomous vehicle 100. For example, the navigation function may be activated by the navigation device 5130 included in the autonomous vehicle 100. With regard to descriptions of FIG. 17C, the descriptions FIG. 17A may be referred to.

Also, the selected functions of the device 1000 and the autonomous vehicle 100 may be displayed on a certain region 2310 of the display of the device 1000 and/or the autonomous vehicle 100.

A correlation between the selected functions of the device 1000 and the autonomous vehicle 100 may be determined based on the user input. For example, based on the user input, the autonomous vehicle 100 may determine a correlation between the accelerator function of the autonomous vehicle 100 and the schedule function of the device 1000 in order to determine average driving speed, average driving acceleration, or maximum driving speed according to a time of a user's schedule appointment.

Figure 18:
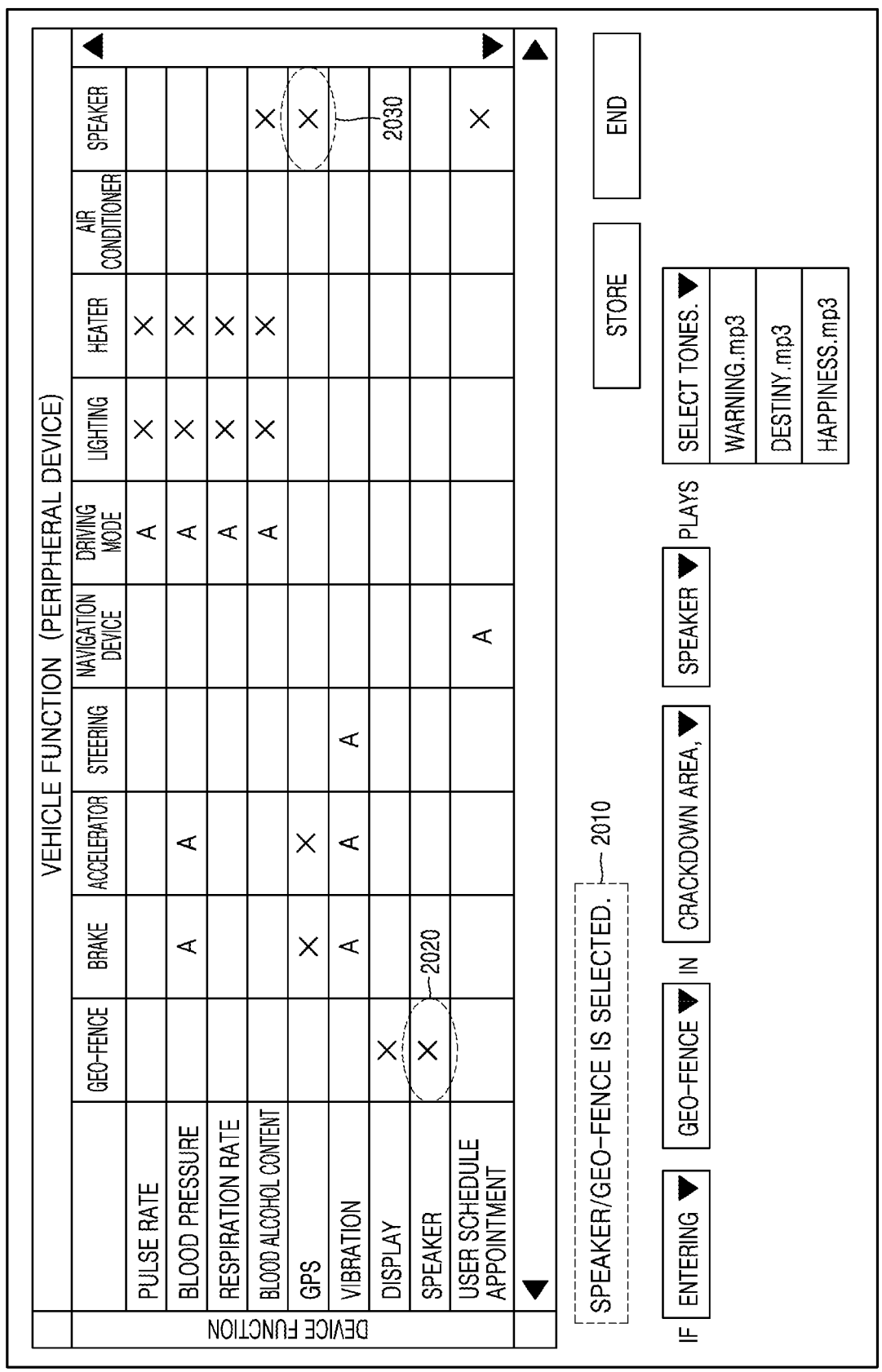
FIG. 18 shows an example of renewing guidelines indicating a correlation between functions of an autonomous vehicle and functions of a device, according to an embodiment.

FIG. 18 shows an example of renewing the guidelines indicating the correlation between the functions of the autonomous vehicle and the functions of the device, according to an embodiment.

The autonomous vehicle 100 may set the correlation between the functions of the autonomous vehicle 100 and the device 1000 by receiving the user input.

According to the guidelines, a blood pressure sensor function of the device 1000 may be associated with the navigation function of the autonomous vehicle 100. If a blood pressure obtained from the blood pressure sensor of the device 1000 is equal to or greater than a certain criteria, the autonomous vehicle 100 may add a hospital to a driving route by activating the navigation function according to the guidelines.

Alternatively, according to the guidelines, a microphone function of the device 1000 may be associated with an air-conditioning function of the autonomous vehicle 100. If an audio input received from a microphone of the device 1000 corresponds to an applause sound, the autonomous vehicle 100 may decrease an indoor temperature of the autonomous vehicle 100 by activating the air-conditioning function, according to the guidelines.

According to the guidelines, a temperature sensor function of the device 1000 may be associated with a window open/close function of the autonomous vehicle 100. For example, a temperature value received from the temperature sensor of the device 1000 is equal to or greater than a certain criteria, the autonomous vehicle 100 may decrease the indoor temperature of the autonomous vehicle 100 by activating the window open/close function, according to the guidelines.

That is, the guidelines may be determined based on the user input. Hereinafter, an example of determining the guidelines based on a user input will be described with reference to FIG. 18.

For example, a case 2020 where a function of the device 1000 is a speaker and a function of the autonomous vehicle 100 is a geo-fence 5310.

A correlation between the speaker function of the device 1000 and the geo-fence function of the autonomous vehicle 100 may be set. The geo-fence function may include a function of recognizing a geological position or a virtual boundary with regard to a certain area.

The correlation between the speaker function of the device 1000 and the geo-fence function of the autonomous vehicle 100 may be preset. For example, when the autonomous vehicle 100 enters a geological position corresponding to a speed limit area, the correlation between the speaker function of the device 1000 and the geo-fence function of the autonomous vehicle 100 may be preset to allow the speaker included in the device 1000 to reproduce a warning sound notifying danger.

As shown in FIG. 18, preset settings may change according to a user input. In detail, based on the user input, the speaker function of the device 1000 and the geo-fence function of the autonomous vehicle 100 may be selected to set their correlation. As a result, the selected functions of the device 1000 and the autonomous vehicle 100 may be displayed on a certain region 2010 of the display of the device 1000 and/or the autonomous vehicle 100.

Next, the correlation between the selected functions of the device 1000 and the autonomous vehicle 100 may be determined based on the user input. For example, when the autonomous vehicle 100 enters a geological position corresponding to a speed limit area, the autonomous vehicle 100 may change content reproduced by the speaker included in the device 1000 based on the user input. As a specific example, when the geo-fence function of the autonomous vehicle 100 recognizes that the autonomous vehicle 100 enters the geological position corresponding to the speed limit area, the autonomous vehicle 100 may allow the speaker of the device 1000 to reproduce content that is selected from among warning.mp3, destiny.mp3, and happiness.mp3 according to the user input.

A case 2030 where a function of the device 1000 is a GPS function and a function of the autonomous vehicle 100 is the speaker will be described.

A correlation between the speaker function of the autonomous vehicle 100 and the GPS function of the device 1000 may be preset. For example, when the autonomous vehicle 100 enters the geological position corresponding to the speed limit area, the correlation between the speaker function of the autonomous vehicle 100 and the GPS function of the device 1000 may be preset to allow the speaker included in the autonomous vehicle 100 to reproduce a warning sound notifying danger.

A preset setting may change according to a user input. That is, according to the user input, the speaker function of the autonomous vehicle 100 and the geo-fence function of the device 1000 may be selected to set their correlation (not shown). Also, the selected functions of the device 1000 and the autonomous vehicle 100 may be displayed on a certain region of the display of the device 1000 and/or the autonomous vehicle 100.

The correlation between the selected functions of the device 1000 and the autonomous vehicle 100 may be determined based on the user input. That is, when the autonomous vehicle 100 enters the geological position corresponding to the speed limit area, the content reproduced by the speaker included in the autonomous vehicle 100 may change based on the user input. As a specific example, when the device 1000 recognizes that the autonomous vehicle 100 enters the geological position corresponding to the speed limit area by using the GPS function, the autonomous vehicle 100 may allow the speaker of the autonomous vehicle 100 to reproduce content that is selected from among warning.mp3, destiny.mp3, and happiness.mp3 according to the user input.

FIGS. 17 and 18 show methods of determining the guidelines for associating the functions of the autonomous vehicle 100 with the functions of the device 1000 based on a user input. However, embodiments for determining the guidelines are not limited to the embodiments of FIGS. 17 and 18. All the functions of the autonomous vehicle 100 and the device 1000, which have been stated in the present embodiments, may be associated with each other according to the user input or the preset setting, and various modifications and adaptations regarding the association of the functions of the autonomous vehicle 100 with the functions of the device 1000, which are made by one of ordinary skill in the art, are also included in the present embodiments.

For example, the autonomous vehicle 100 may determine guidelines for associating the biometric information, the schedule information, the surrounding situation information, the weather information, or the like included in the device information 210 and/or the vehicle information 220 with the navigation device 5130, the drive system 5100 (e.g., an accelerator, a brake, a transmission, a steering device, etc.), the internal lighting device 5331 (e.g., indoor lighting, etc.), external lighting (e.g., beams 5333), the audio/video device (e.g., a speaker 5371), a temperature adjusting device (e.g., the air conditioner 5342, the heater 5341, the ventilator 5351, the window open/close device 5352, heat wires, etc.), the geo-fence, other peripheral devices (e.g., the wipers 5320, the turn signals 5334, the touch screen 5361, the sensor device 5200, etc.), or the like, based on the user input. However, the present disclosure is not limited thereto.

FIG. 19 shows a correlation between driving-related functions of the autonomous vehicle 100 and functions of the device 1000, according to an embodiment.

"X" indicated in the inside of the diagram of FIG. 19 may indicate a case where the correlation between the functions of the autonomous vehicle 100 and the functions of the device 1000 is preset, and "A" indicated in the inside of the diagram may indicate a case where the correlation between the functions of the autonomous vehicle 100 and the functions the device 1000 is set by the user.

The GPS function of the device 1000 and the navigation function of the autonomous vehicle 100 may be preset to be correlated. For example, the autonomous vehicle 100 may obtain current location information based on location information that is obtained from the GPS sensor of the device 1000 and may set a driving route to the destination based on the obtained current location information.

A voice recognition function of the device 1000 and a driving mode-related function of the autonomous vehicle 100 may be preset to be correlated. For example, the autonomous vehicle 100 may determine a driving mode according to user's voice information obtained from the voice recognition sensor of the device 1000.

A device function 17200 is a function 17210 that may be activated by the device 1000 and may include a pulse rate sensing function, a blood pressure sensing function, a respiration rate sensing function, a blood alcohol content sensing function, a GPS information obtaining function, a camera function, an inertial sensing function, an acceleration sensing function, a geomagnetic sensing function, a temperature sensing function, a humidity sensing function, a gyroscope sensing function, an air pressure sensing function, a proximity sensing function, an infrared sensing function, a microphone function, a vibration function, a display function, a speaker function, a voice recognition function, a voice communication function, a data communication function, a user schedule obtaining function, or the like. However, the device function 17200 is not limited thereto.

A vehicle function 17100 may include driving-related functions 17110. For example, the driving-related functions 17110 may include a brake function, an accelerator function, a steering function, an obstacle avoidance function, a navigation function, a driving mode-related function, an engine/motor function, a transmission function, a wheel function, a tire function, or the like. However, the vehicle function 17100 is not limited thereto.

Some of the vehicle function 17100 may be performed by some devices included in the autonomous vehicle 100. For example, the driving mode-related function may be performed by the drive system and/or the peripheral device.

FIG. 20 shows a correlation between a peripheral device function of the autonomous vehicle 100 and the functions of the device 1000, according to an embodiment.

The respiration rate sensing function of the device 1000 and a turn signal function of the autonomous vehicle 100 may be preset to be correlated. For example, the autonomous vehicle 100 may determine whether the user currently has a serious health problem based on the respiration rate information obtained from the respiration rate sensor of the device 1000 and when it is determined that the user currently has a serious health problem, the autonomous vehicle 100 may control the turn signals 5334 to turn on hazard beams.

The device function 17200 has been described with reference to FIG. 19.

The vehicle function 17100 may include a peripheral device function 18110. For example, the peripheral device function 18110 may include a navigation function, a geo-fence function, a light function, a wiper function, a speaker function, a turn signal function, an internal lighting function, an external lighting function, a communication function, a heater function (a kind of heating devices), an air-conditioner function (a kind of air conditioning devices), a touch screen function, a microphone function, or the like. However, the vehicle function 17100 is not limited thereto.

FIG. 21 shows a correlation between sensor-related functions of the autonomous vehicle 100 and the functions of the device 1000, according to an embodiment.

An acceleration function of the device 1000 and a camera function of the autonomous vehicle 100 may be preset to be correlated. For example, the acceleration sensor 5232 of the device 1000 senses rapid acceleration or rapid deceleration, a function of the camera 5220 of the autonomous vehicle 100 is activated such that the front and/or the rear of the autonomous vehicle 100 may be shot.

The speaker function of the device 1000 and the function of the GPS 5210 of the autonomous vehicle 100 may be preset by the user to be correlated. For example, the function of the speaker of the device 1000 is activated based on location information obtained from the GPS 5210 of the autonomous vehicle 100, and thus the speaker of the device 1000 may reproduce a warning alarm.

The device function 17200 has been described with reference to FIG. 19.

The vehicle function 17100 may include a sensor function 19110. For example, the sensor function 19110 may include a GPS sensor function, a camera function, an inertial sensor function, an acceleration sensor function, a geomagnetic sensor function, a temperature sensor function, a humidity sensor function, a gyroscope sensor function, an air pressure sensor function, a distance sensor function, an infrared sensor function, a tire inflation pressure sensor function, a speed sensor function, or the like. However, the vehicle function 17100 is not limited thereto.

FIG. 22 is a diagram showing an example of controlling the autonomous vehicle 100 based on biometric information, according to an embodiment.

The autonomous vehicle 100 may obtain the device information 210 from the device 1000. The device information 210 that is received by the autonomous vehicle 100 from the device 1000 may include biometric information.

When the received device information 210 includes the biometric information indicating emergencies of a device user, the autonomous vehicle 100 may activate the navigation function of the autonomous vehicle 100 and may add a stop to the driving route of the autonomous vehicle 100 based on the biometric information.

The autonomous vehicle 100 may receive blood pressure information of the user from the device 1000 and may determine that the user is in an emergency by analyzing the received blood pressure information. When the autonomous vehicle 100 determines that the user is in an emergency, the autonomous vehicle 100 may activate the navigation device and may add a hospital to a current driving route as a stop. As another example, when receiving the biometric information indicating the emergencies of the user, the autonomous vehicle 100 may activate the navigation function and may add the hospital to the current driving route as the stop.

When the device 1000 obtains biometric information (e.g., information regarding a blood pressure value equal to or greater than a reference value, information regarding a pulse rate equal to or greater than a reference value, etc.) that indicates the emergencies of the device user, the device 1000 may determine that the user is in an emergency and may transmit, to the autonomous vehicle 100, the information indicating the emergencies of the user. In this case, the device information 210 may include the information indicating the emergencies of the user. Also, in this case, the autonomous vehicle 100 may receive the device information 210 including the information indicating the emergencies of the user, from the device 1000. When receiving the device information 210 including the information indicating the emergencies of the user from the device 1000, the autonomous vehicle 100 may activate the navigation function and may add the hospital to the current driving route as the stop.

The hospital that is added to the current driving route as the stop may be determined by using a preset method.

For example, the autonomous vehicle 100 may add a hospital that is the closest to the current location among numerous hospitals that are determined to handle the emergency of the user. For example, when the user suffers from diabetes, the autonomous vehicle 100 may add, as a stop, a hospital that is the closest to the current location among hospitals that may give diabetes treatments.

However, if the autonomous vehicle 100 is not able to determine any hospital that may handle the emergency of the user, the autonomous vehicle 100 may add a hospital that is the closest to the current location among hospitals of certain sizes as a stop. Meanwhile, when the autonomous vehicle 100 and/or the device 1000 are unable to determine which disease caused the emergency of the user due to insufficient analysis ability, the autonomous vehicle 100 may add, as a stop, a hospital that is the closest to the current location among the hospitals at least larger than university hospitals.

When the hospital added as the stop is not within a certain distance, the autonomous vehicle 100 may activate an emergency call function while navigating. For example, the autonomous vehicle 100 may send a text message notifying a location and a situation of the user to 911 or a preset number.

When the device information 210 obtained by the autonomous vehicle 100 from the device 1000 includes the biometric information of the user, the autonomous vehicle 100 may activate the navigation function of the autonomous vehicle 100 and may add, as a stop, a pharmacy to the driving route of the autonomous vehicle 100 based on the biometric information.

For example, when the autonomous vehicle 100 receives blood pressure information of the user from the device 1000 and determines that the user needs to take some medicine by analyzing the received blood pressure information, the autonomous vehicle 100 may active the navigation function and may add, as a stop, a pharmacy that has medicine corresponding to the biometric information to the current driving route.

When the device information 210 obtained by the autonomous vehicle 100 from the device 1000 includes the biometric information of the user, the autonomous vehicle 100 may activate the navigation function of the autonomous vehicle 100 and may add, as a stop, a rest area or a service area to the driving route of the autonomous vehicle 100 based on the biometric information.

For example, when the autonomous vehicle 100 receives fatigue information of the user from the device 1000 and determines that the user is tired by analyzing the received fatigue information, the autonomous vehicle 100 may activate the navigation function and may add, as a stop, any nearby rest area or service area to the driving route. For example, when the autonomous vehicle 100 receives eye-blinking information of the user to determine the fatigue of the user and recognizes fatigue equal to or greater than a critical value, the autonomous vehicle 100 may activate the navigation function and may add, as a stop, any nearby rest area or service area to the driving route.

As another example, when the autonomous vehicle 100 receives blood alcohol content information of the user from the device 1000 and determines that the user drank alcohol by analyzing the received blood alcohol content information, the autonomous vehicle 100 may activate the navigation function and may add the rest area or the service area that is close to the current location to the current driving route as a stop.

When the device information 210 obtained by the autonomous vehicle 100 from the device 1000 includes the biometric information, the autonomous vehicle 100 may activate the navigation function of the autonomous vehicle 100 and may add, as a stop, a restaurant to the driving route of the autonomous vehicle 100 based on the biometric information.

For example, the autonomous vehicle 100 receives blood sugar information of the user from the device 1000 and determines that the user is hungry by analyzing the received blood sugar information, the autonomous vehicle 100 may activate the navigation function and may add, as a stop, a restaurant that is close to the driving route to the current driving route.

When the autonomous vehicle 100 receives the blood sugar information of the user from the device 1000 and determines that the user is hungry by analyzing the received blood sugar information, the autonomous vehicle 100 may display, on a screen, an inquiry about whether to drop by a restaurant. Based on a user input for responding to the displayed inquiry, the autonomous vehicle 100 may activate the navigation function and may add, as a stop, a restaurant that is close to the current location, to the current driving route.

When the autonomous vehicle 100 receives the blood sugar information of the user from the device 1000 and determines that the user is hungry by analyzing the received blood sugar information, the autonomous vehicle 100 may obtain schedule information of the user. The autonomous vehicle 100 may consider the schedule information of the user and a time delay due to stopping by the restaurant and may determine whether to add the restaurant to the current driving route as the stop.

The autonomous vehicle 100 may obtain the vehicle information 220 and the device information 210. For example, the device information 210 received by the autonomous vehicle 100 from the device 1000 may include the biometric information, and the vehicle information 220 obtained by the autonomous vehicle 100 may include possible driving distance information.

When the received device information 210 includes the biometric information indicating the emergency of the device user, the autonomous vehicle 100 may activate the navigation function of the autonomous vehicle 100 and may add a stop to the driving route of the autonomous vehicle 100 based on the biometric information by taking the vehicle information 220 into account.

The autonomous vehicle 100 may receive the blood pressure information of the user from the device 1000 and may determine that the user is in an emergency by analyzing the received blood pressure information. When the autonomous vehicle 100 determines that the user is in an emergency, the autonomous vehicle 100 may add a hospital to the current driving route as a stop by activating the navigation function. When receiving the biometric information indicating the emergency of the user from the device 1000, the autonomous vehicle 100 may activate the navigation function and may add a hospital to the current driving route as a stop.

The hospital added to the driving route as the stop may be determined by using a preset method.

In particular, the autonomous vehicle 100 may add, as a stop, a hospital that is the closest to the current location among hospitals that are determined to solve the emergency of the user and within the possible driving distance. For example, when the user is in an emergency because of diabetes, the autonomous vehicle 100 may add, as a stop, a hospital that may give diabetes treatments, is within the possible driving distance, and is the largest among hospitals located within a certain distance from the current location.

As another example, when the autonomous vehicle 100 is unable to find any hospital that may solve the emergency, the autonomous vehicle 100 may add, as a stop, a hospital that is the closest from the current location among hospitals that are within the possible driving distance and of certain sizes. For example, the autonomous vehicle 100 and/or the device 1000 are unable to determine which disease caused the emergency of the user due to insufficient analysis ability, the autonomous vehicle 100 may add, as a stop, a hospital that is the closest from the current location among hospitals that are at least larger than university hospitals within the current possible driving distance.

As another example, when there is no hospital within the current possible driving distance, the autonomous vehicle 100 may turn on emergency beams and may stop at the closest permitted location. In addition, when there is no hospital within the current possible driving distance, the autonomous vehicle 100 may activate the emergency call function. For example, the autonomous vehicle 100 may send a text message notifying the location and the situation of the user to 911 or the preset number.

When the device information 210 obtained by the autonomous vehicle 100 from the device includes the biometric information, the autonomous vehicle 100 may activate the navigation function of the autonomous vehicle 100 and may add, as a stop, a pharmacy to the driving route of the autonomous vehicle 100 based on the biometric information and the vehicle information 220.

For example, when the autonomous vehicle 100 receives the blood pressure information of the user from the device 1000 and determines that the user needs to take some medicine by analyzing the received blood pressure information, the autonomous vehicle 100 may activate the navigation function and may add, as a stop, a pharmacy that has medicine corresponding to the biometric information and is within the possible driving distance.

When the device information 210 obtained by the autonomous vehicle 100 from the device 1000 includes the biometric information, the autonomous vehicle 100 may activate the navigation function and may add, as a stop, a rest area or service area that is within the possible driving distance to the driving route of the autonomous vehicle 100. When the rest area or the service area is not within the possible driving distance from the current location, the autonomous vehicle 100 may turn on the emergency beams and may stop at the closest permitted location.

When the autonomous vehicle 100 receives the fatigue information of the user from the device 1000 and determines that the user is tired by analyzing the received fatigue information, the autonomous vehicle 100 may activate the navigation function and may add, as a stop, the rest area or the service area located within the possible driving distance to the current driving route. For example, when the autonomous vehicle 100 receives the eye-blinking information and determines a fatigue degree of the user and the fatigue degree is equal to or greater than a critical value, the autonomous vehicle 100 may activate the navigation function and may add, as a stop, a rest area or a service area that is located within the possible driving distance to the current driving route.

When the autonomous vehicle 100 receives the blood alcohol content information of the user from the device 1000 and determines that the user is drunk by analyzing the received blood alcohol content information, the autonomous vehicle 100 may activate the navigation function and may add, as a stop, a rest area or a service area that is located within the possible driving distance to the current driving route.

When the device information 210 obtained from the device 1000 includes the biometric information of the user, the autonomous vehicle 100 may activate the navigation function and may add, as a stop, a restaurant located within the possible driving distance to the current driving route.

For example, when the autonomous vehicle 100 receives the blood sugar information of the user from the device 1000 and determines that the user is hungry by analyzing the received blood sugar information, the autonomous vehicle 100 may activate the navigation function and may add, as a stop, a restaurant close to the driving route and located within the possible driving distance.

As another example, when the autonomous vehicle 100 receives the blood sugar information of the user from the device 1000 and determines that the user is hungry by analyzing the received blood sugar information, the autonomous vehicle 100 may display an inquiry about whether to add a restaurant as a stop. Based on a user input for responding to the displayed inquiry, the autonomous vehicle 100 may activate the navigation function and may add, as a stop, a restaurant close to the driving route and located within the possible driving distance to the current driving route.

As another example, when the autonomous vehicle 100 receives the blood sugar information of the user from the device 1000 and determines that the user is hungry by analyzing the received blood sugar information, the autonomous vehicle 100 may obtain the schedule information of the user. The autonomous vehicle 100 may determine whether to add, as a stop, a restaurant located within the possible driving distance to the current driving route by taking into account the schedule information of the user and a time delay due to stopping by the restaurant.

Figure 23:
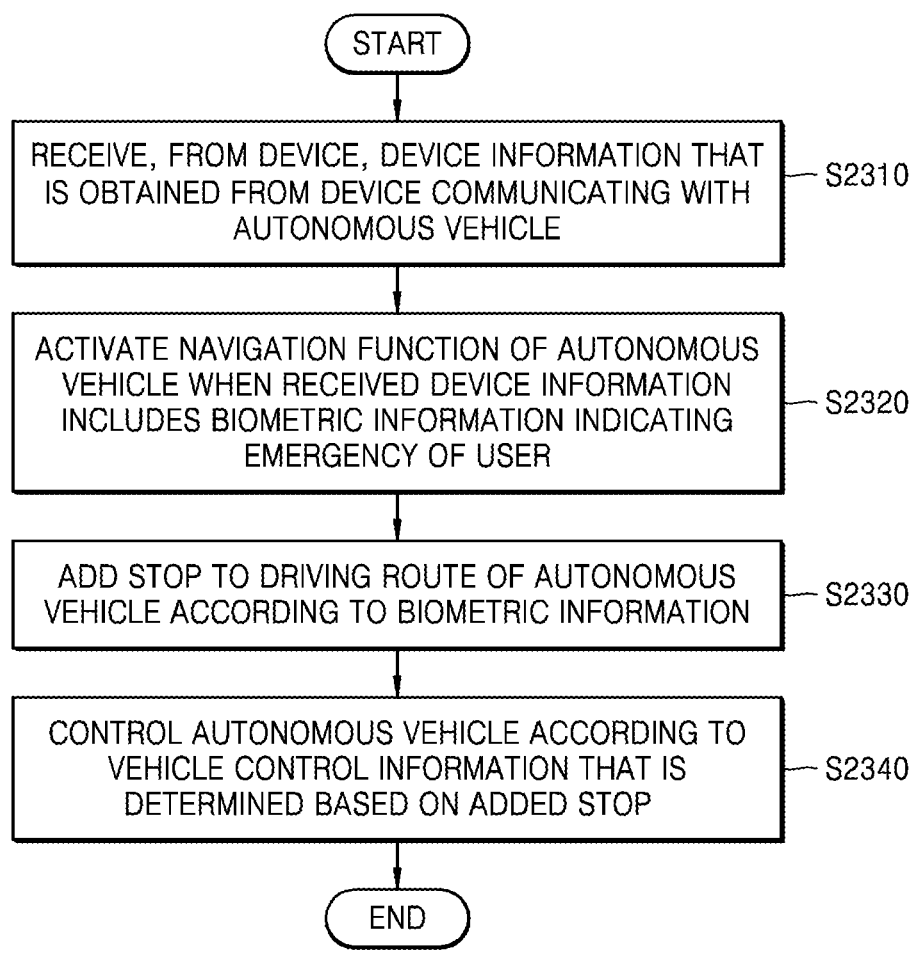
FIG. 23 is a flowchart of a method of controlling an autonomous vehicle based on biometric information, according to an embodiment.

FIG. 23 is a flowchart of a method of controlling the autonomous vehicle 100 based on the biometric information, according to an embodiment.

In operation S2310, the autonomous vehicle 100 may receive, from the device 1000, the device information 210 obtained from the device 1000 communicating with the autonomous vehicle 100. For example, the autonomous vehicle 100 may receive, from the device 1000, the device information 210 including the biometric information indicating the emergency of the device user.

In operation S2320, when the device information 210 received in operation S2310 includes the biometric information indicating the emergency of the device user, the autonomous vehicle 100 may activate the navigation function of the autonomous vehicle 100.

In operation S2330, the autonomous vehicle 100 adds a stop to a driving route of the autonomous vehicle 100 based on the biometric information.

For example, when the autonomous vehicle 100 receives the biometric information indicating the emergency of the device user, the autonomous vehicle 100 may activate the navigation function of the autonomous vehicle 100 and may add a hospital as a stop to the driving route of the autonomous vehicle 100.

In operation S2340, the autonomous vehicle 100 is controlled based on the vehicle control information determined based on the added stop.

For example, the autonomous vehicle 100 may obtain the vehicle control information used to control the autonomous vehicle 100 to navigate along a driving route that is renewed according to a function of the navigation device 5130. The autonomous vehicle 100 may be controlled based on the vehicle control information. For example, the autonomous vehicle 100 may autonomously navigate along the renewed driving route.

Figure 24:
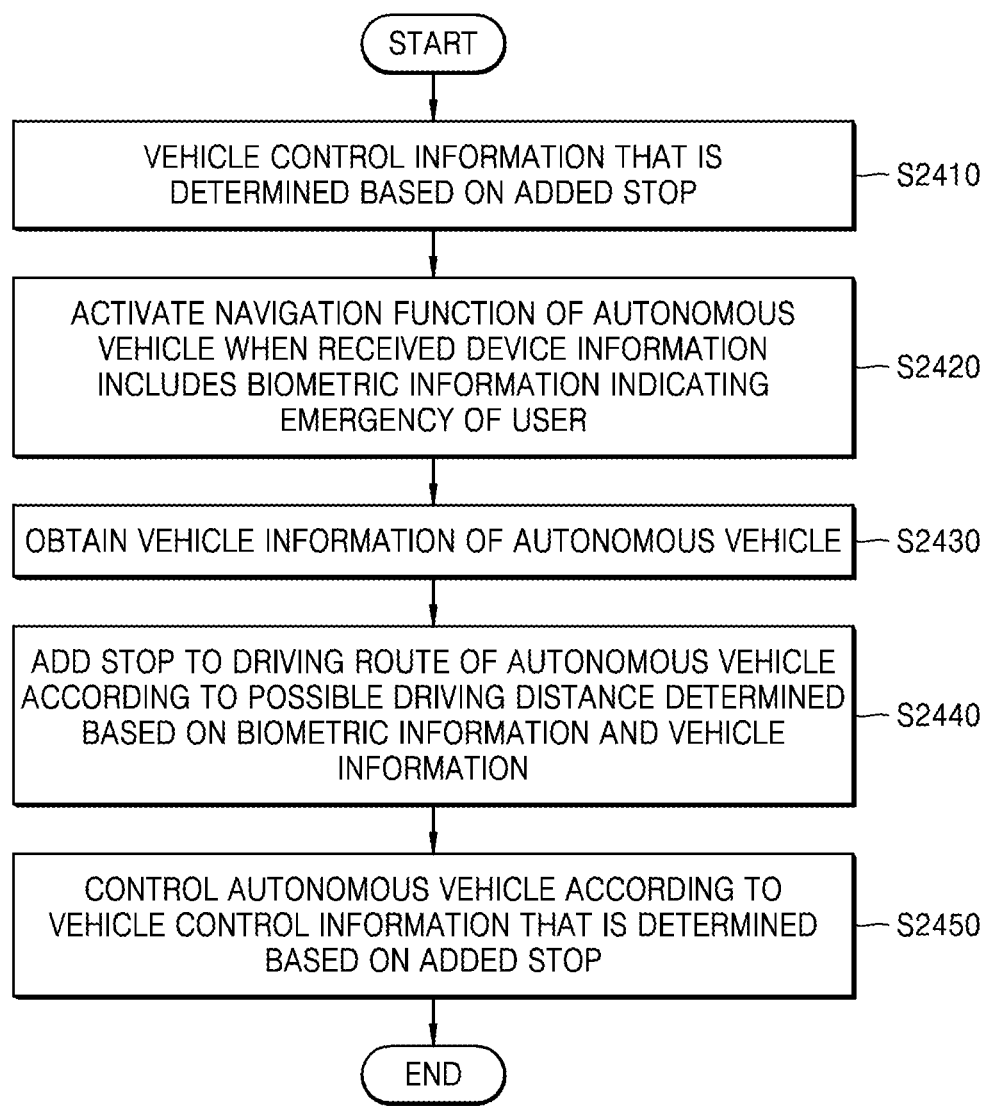
FIG. 24 is a flowchart of a method of controlling an autonomous vehicle based on biometric information and vehicle information, according to an embodiment.

FIG. 24 is a flowchart of a method of controlling the autonomous vehicle 100 based on the biometric information and the vehicle information 220, according to an embodiment.

Operation S2410 corresponds to operation S2310, and detailed description thereof will be omitted for convenience.

In operation S2420, the autonomous vehicle 100 activates the navigation function of the autonomous vehicle 100 when the received device information 210 includes the biometric information indicating the emergency of the device user.

In operation S2430, the autonomous vehicle 100 obtains the vehicle information 220 of the autonomous vehicle 100. For example, the vehicle information 220 obtained by the autonomous vehicle 100 may include possible driving distance information.

In operation S2440, the autonomous vehicle 100 adds a stop to the driving route of the autonomous vehicle 100 according to the possible driving distance that is determined based on the biometric information and the vehicle information 220. For example, when receiving the biometric information indicating the emergency of the device user, the autonomous vehicle 100 may activate the navigation function of the autonomous vehicle 100 and may add a hospital, which is within the possible driving distance, to the driving route of the autonomous vehicle 100.

In operation S2450, the autonomous vehicle 100 controls the autonomous vehicle 100 based on the vehicle control information that is determined based on the added stop.

The autonomous vehicle 100 may obtain the vehicle control information used to control the autonomous vehicle 100 to navigate along the driving route that is renewed according to the function of the navigation device 5130. The autonomous vehicle 100 may be controlled based on the obtained vehicle control information. In this case, the autonomous vehicle 100 may autonomously navigate along the renewed driving route.

Figure 25:
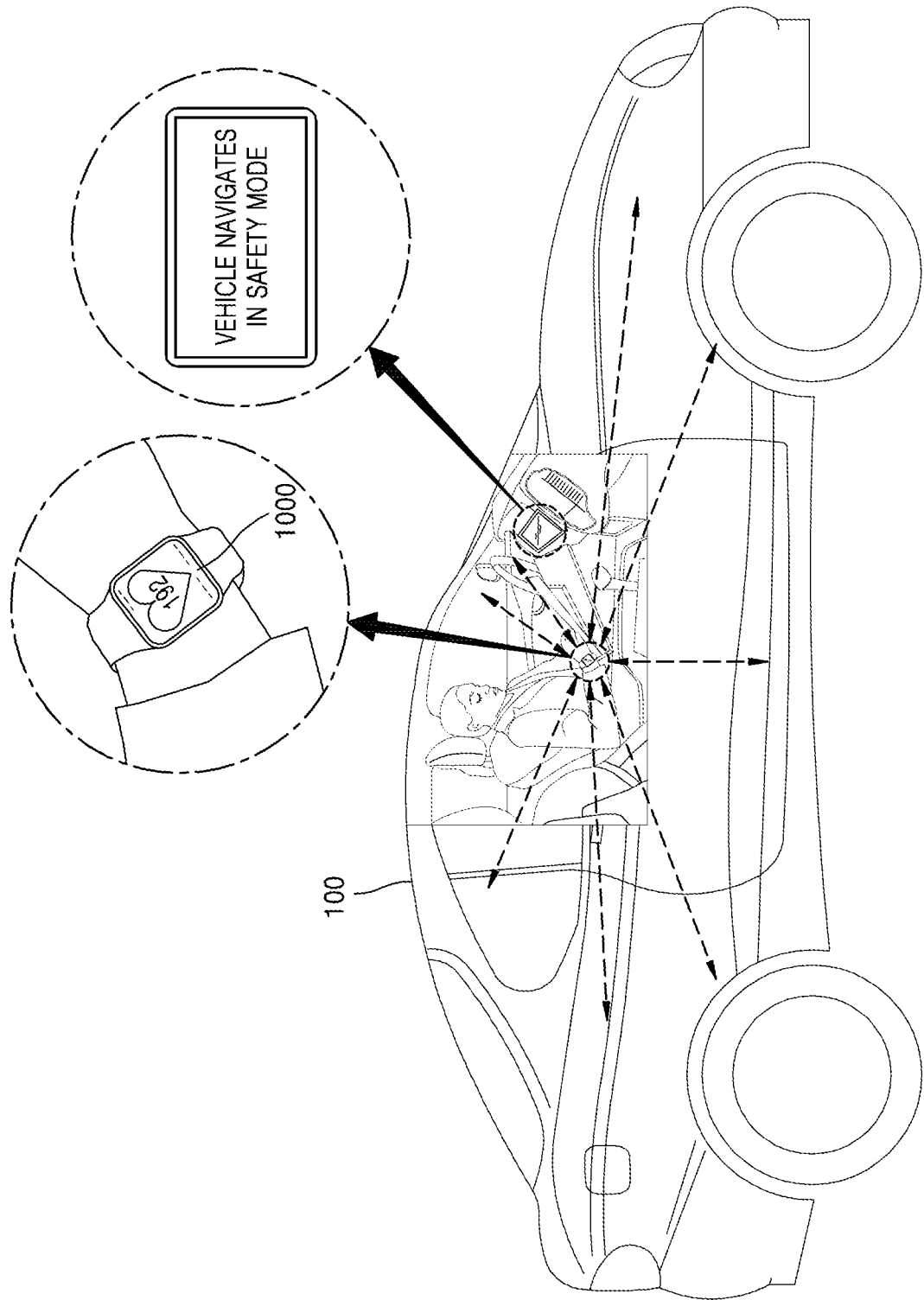
FIG. 25 is a diagram showing an example of controlling an autonomous vehicle based on biometric information indicating physical and mental states of a user, according to an embodiment.

FIG. 25 is a diagram showing an example of controlling the autonomous vehicle 100 based on biometric information indicating physical and mental states of the user, according to an embodiment. The autonomous vehicle 100 may determine a driving mode of the autonomous vehicle 100 based on the biometric information indicating the physical and mental states of the user. The autonomous vehicle 100 may control at least one peripheral device included in the autonomous vehicle 100, based on the biometric information indicating the physical and mental states of the user.

The physical and mental states may include a physical state and/or a mental state of the user. For example, the physical and mental states may include a fatigue degree, a nervousness degree, a health state, an excitation degree, a pulse rate, a body temperature of the user, how much the user feels hot, or the like.

The autonomous vehicle 100 may obtain the device information 210 from the device 1000. The device information 210 received by the autonomous vehicle 100 from the device 1000 may include the biometric information indicating the physical and mental states of the user.

When the received device information 210 includes the biometric information indicating the physical and mental states of the device user, the autonomous vehicle 100 may control the drive system and/or the peripheral device of the autonomous vehicle 100 and may determine the driving mode of the autonomous vehicle 100 based on the biometric information.

For example, the autonomous vehicle 100 may receive pulse rate information of the user from the device 1000 and may determine whether the user needs to be relaxed by analyzing the received information. When the autonomous vehicle 100 determines that the user needs to be relaxed, the autonomous vehicle 100 may control the drive system to navigate in a safety mode. When the autonomous vehicle 100 receives, from the device 1000, the biometric information indicating that the user needs to be relaxed, the autonomous vehicle 100 may control the drive system to navigate in the safety mode. The safety mode may be a mode in which acceleration and deceleration frequencies are low and maximum speed is low.

According to another embodiment, the autonomous vehicle 100 may receive eye-blinking information or posture information of the user and may determine whether the user is sleeping by analyzing the received eye-blinking information or posture information. When the autonomous vehicle 100 determines that the user is sleeping, the autonomous vehicle 100 may control the drive system to navigate in a sleep mode. When the autonomous vehicle 100 receives, from the device 1000, biometric information indicating that the user is sleeping, the autonomous vehicle 100 may operate the peripheral device or the drive system to navigate in the sleep mode. The sleep mode may be a mode in which indoor illuminance is low, the acceleration and deceleration frequencies are low, and vibrations of the autonomous vehicle 100 decrease. As another example, when the autonomous vehicle 100 receives, from the device 1000, the biometric information indicating that the user is sleeping, the autonomous vehicle 100 may control the internal lighting device of the autonomous vehicle 100 to maintain the indoor illuminance to be lower than or equal to a certain level. As another example, when the autonomous vehicle 100 receives, from the device 1000, the biometric information indicating that the user is sleeping, the autonomous vehicle 100 may control the air conditioning/heating device of the autonomous vehicle 100 to maintain the indoor temperature within a certain temperature range.

As another example, when the autonomous vehicle 100 receives, from the device 1000, the biometric information indicating the emergency of the user, the autonomous vehicle 100 may control the drive system to navigate in an emergency mode. The emergency mode may be a mode protecting passengers and optimized to arrive at a hospital, etc. For example, when navigating in the emergency mode, the autonomous vehicle 100 may set a permissible level of acceleration, deceleration, and maximum speed to be greater than in a standard mode. As another example, when the autonomous vehicle 100 receives, from the device 1000, the biometric information indicating the emergency of the user, the autonomous vehicle 100 may control turn signals to be repeatedly on and off (e.g., hazard beams).

As another example, when the autonomous vehicle 100 receives, from the device 1000, biometric information indicating that the user is active, the autonomous vehicle 100 may control the drive system to navigate in a sports mode. The sports mode may be a mode in which the acceleration and deceleration frequencies are high, and maximum driving speed is high. As another example, when the autonomous vehicle 100 receives, from the device 1000, the biometric information indicating that the user is active, the autonomous vehicle 100 may control the audio device to set a volume of the audio device to be equal to or greater than a certain level.

As another example, when the autonomous vehicle 100 receives, from the device 1000, biometric information indicating that the user is nervous, the autonomous vehicle 100 may control the drive system to navigate in the safety mode. As another example, when the autonomous vehicle 100 receives, from the device 1000, the biometric information indicating that the user is nervous, the autonomous vehicle 100 may control the audio device and may reproduce audio content that is retrieved by using a preset method. For example, the autonomous vehicle 100 may control the audio device and may reproduce music that helps the user be relaxed.

Also, the driving modes described with reference to FIG. 25 are examples of the present disclosure and are not limited thereto.

Figure 26:
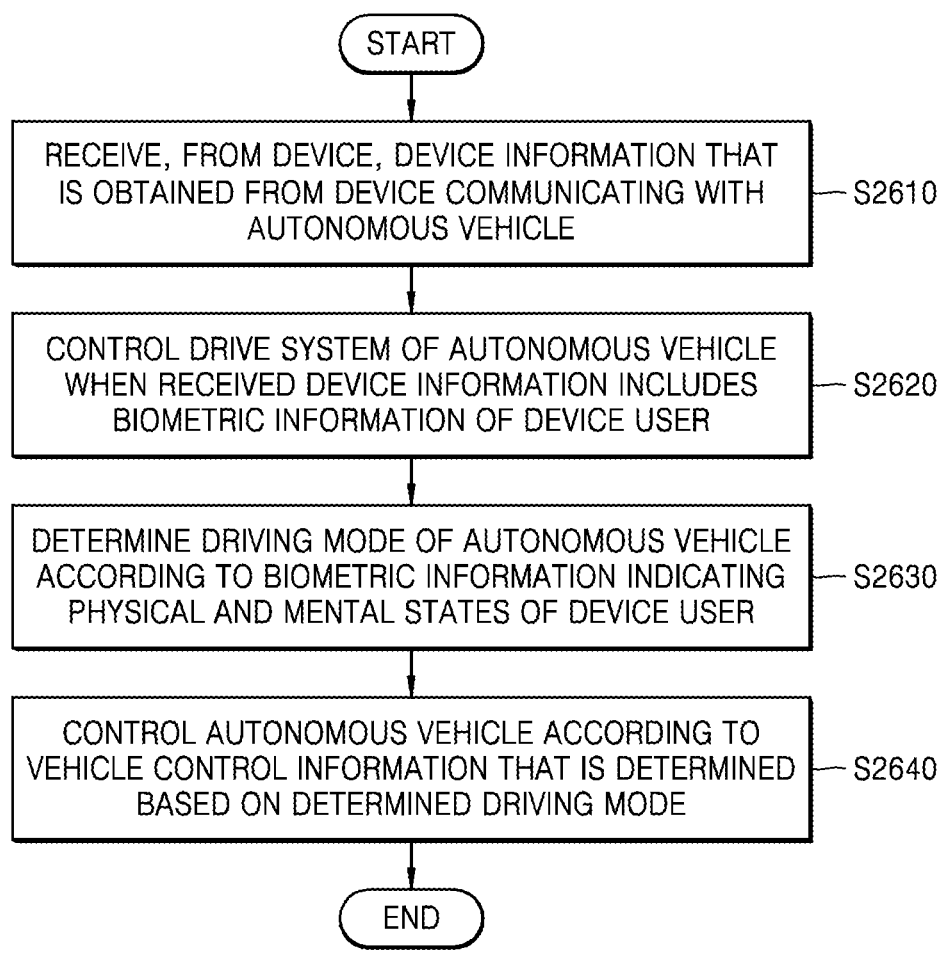
FIG. 26 is a flowchart of a method of controlling an autonomous vehicle based on biometric information indicating physical and mental states of a user, according to an embodiment.

FIG. 26 is a flowchart of a method of controlling the autonomous vehicle 100 based on the biometric information indicating the physical and mental states of the user, according to an embodiment.

In operation S2610, the autonomous vehicle 100 may receive, from the device 1000, the device information 210 obtained from the device 1000 communicating with the autonomous vehicle 100. For example, the autonomous vehicle 100 may receive, from the device 1000, the device information 210 including the biometric information indicating the physical and mental states of the user.

In operation S2620, the autonomous vehicle 100 controls the drive system of the autonomous vehicle 100 when the received device information 210 includes the biometric information of the device user. The drive system may include the brake 5111, the accelerator 5112, the steering system (e.g., the steering 5113), the engine/motor 5160, the transmission 5170, or the like. However, the present disclosure is not limited thereto.

In operation S2630, the autonomous vehicle 100 determines a driving mode of the autonomous vehicle 100 based on the biometric information indicating the physical and mental states of the device user. For example, when receiving the biometric information indicating the emergency of the user from the device 1000, the autonomous vehicle 100 may control the drive system and may navigate in an emergency mode.

As another example, the autonomous vehicle 100 may navigate in the driving mode that is determined by using a driving system function of the autonomous vehicle 100. For example, the autonomous vehicle 100 may activate the accelerator function in accordance with the device information 210 and may navigate in the driving mode that is determined by controlling maximum acceleration and maximum speed.

In operation S2640, the autonomous vehicle 100 may be controlled based on the vehicle control information that is determined based on the determined driving mode.

For example, the autonomous vehicle 100 may obtain the vehicle control information used to control the autonomous vehicle 100. The autonomous vehicle 100 may be controlled based on the obtained vehicle control information. The autonomous vehicle 100 may autonomously navigate according to the determined driving mode.

Figure 27:
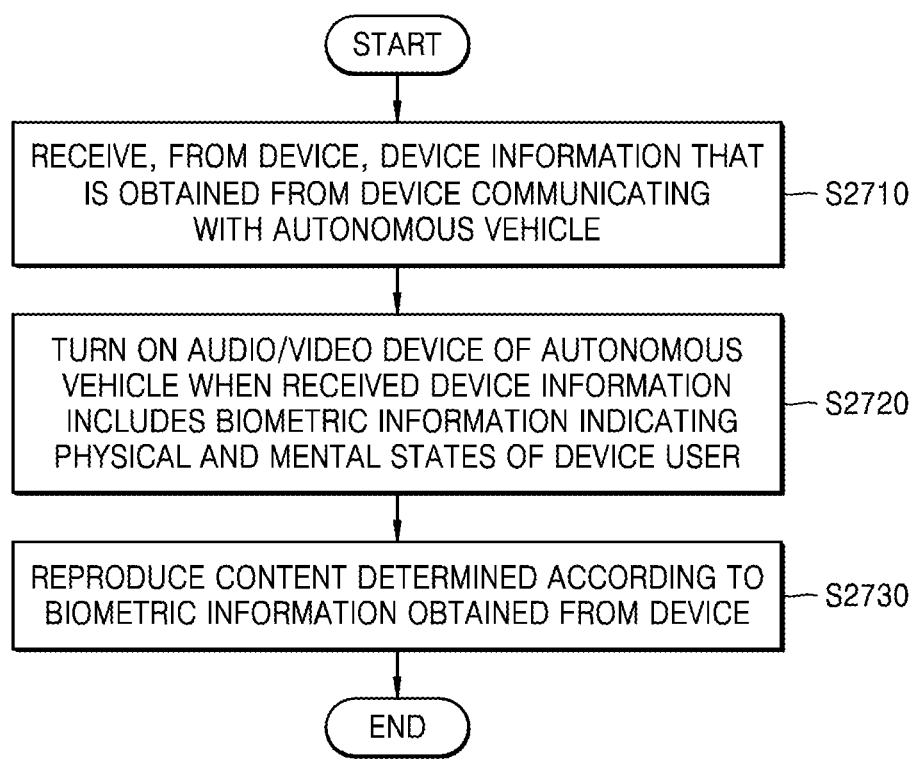
FIG. 27 is a flowchart of a method of controlling audio and video devices of an autonomous vehicle based on biometric information indicating physical and mental states of a user, according to an embodiment.

FIG. 27 is a flowchart of a method of controlling an audio/video device of the autonomous vehicle 100 based on the biometric information indicating the physical and mental states of the user, according to an embodiment. FIG. 27 shows an embodiment of the audio/video device. However, the present disclosure is not limited thereto. The method of FIG. 27 may be used to control a peripheral device other than the audio/video device.

Operation S2710 corresponds to operation S2610 described above, and thus detailed descriptions thereof will be omitted.

In operation S2720, when the device information received in operation S2710 includes the biometric information indicating the physical and mental states of the device user, the autonomous vehicle 100 executes the audio/video device of the autonomous vehicle 100. The audio/video device may denote an audio device and/or a video device.

Also, the audio/video device in the present embodiment is an example of a peripheral device included in the autonomous vehicle 100 and is not limited to. For example, when the device information 210 received in operation S2710 includes the biometric information of the device user, the autonomous vehicle 100 may control the geo-fence function, the light function, the wiper function, the speaker function, the turn signal function, the internal lighting function, the external lighting function, the air conditioning/heating function, the communication function, or the like based on the received biometric information.

In operation S2730, the autonomous vehicle 100 reproduces the content determined based on the biometric information obtained in operation S2720.

The content may include audio content and/or video content. The audio content may include music, a sound effect, a telephone call, a voice notification, or the like.

A case where the autonomous vehicle 100 determines that the user is tired based on the biometric information indicating the physical and mental states of the user will be described. When the autonomous vehicle 100 navigates autonomously, the autonomous vehicle 100 may execute the audio/video device and may reproduce quiet music or a music video to make the device user be relaxed while driving. When the autonomous vehicle 100 is manually driven, the autonomous vehicle 100 may execute the audio/video device and may reproduce active music or a music video that makes the device user be awaken.

Figure 28:
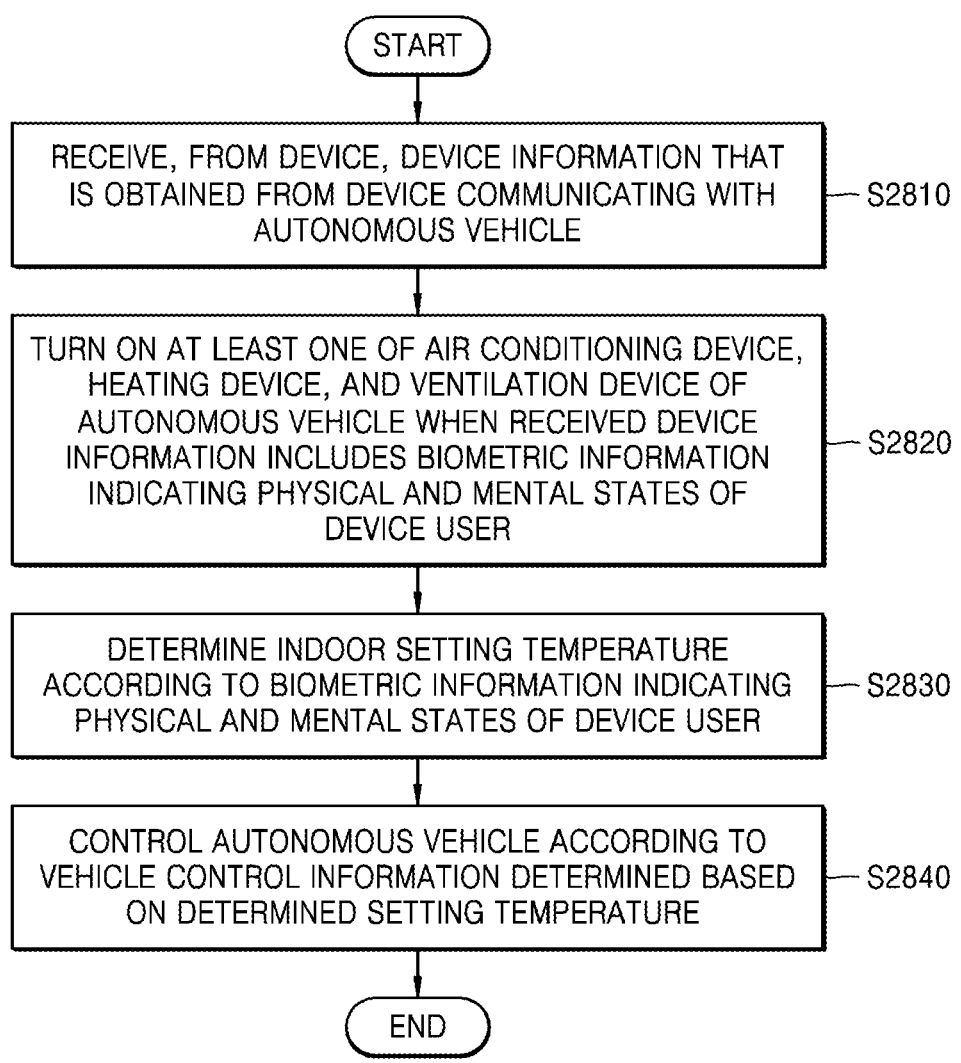
FIG. 28 is a flowchart of a method of controlling a peripheral device of an autonomous vehicle based on biometric information indicating physical and mental states of a user, according to an embodiment.

FIG. 28 is a flowchart of a method of controlling a peripheral device of the autonomous vehicle 100 based on the biometric information indicating the physical and mental states of the user, according to an embodiment.

In operation S2810, the autonomous vehicle 100 may receive, from the device 1000, the device information 210 obtained from the device 1000 communicating with the autonomous vehicle 100. For example, the autonomous vehicle 100 may receive, from the device 1000, the device information 210 including the biometric information indicating the physical and mental states of the user. The biometric information, which is received by the autonomous vehicle 100 and indicates the physical and mental states of the user, may indicate that the user feels hot.

In operation S2820, when the received device information 210 includes the biometric information indicating the physical and mental states of the device user, the autonomous vehicle 100 executes the air conditioning device, the heating device, the ventilation device, or the like of the autonomous vehicle 100. The air conditioning device may include an air conditioner, the heating device may include a heater or heating wires, and the ventilation device may include windows or a ventilator.

In operation S2830, the autonomous vehicle 100 determines an indoor setting temperature of the autonomous vehicle 100 based on the biometric information indicating the physical and mental states of the user. For example, when the device information 210 includes the biometric information indicating that the user feels hot, the autonomous vehicle 100 may set the setting temperature to be lower than a current temperature or a standard temperature.

In operation S2840, the autonomous vehicle 100 may be controlled based on the vehicle control information determined based on the determined setting temperature.

The autonomous vehicle 100 may obtain, based on the indoor setting temperature, the vehicle control information used to maintain the indoor temperature within a certain range. Based on the obtained vehicle control information, the autonomous vehicle 100 may be controlled. For example, the autonomous vehicle 100 may control the air conditioning device, the heating device, the ventilation device, or the like in accordance with the setting temperature. As another example, when the device information 210 includes biometric information indicating that the user feels cold, the autonomous vehicle 100 may control the windows, the heater, the heating wires, or the like to close the windows, turn on the heaters, or turn on the heating wires.

The vehicle information 220 may also be used to control the autonomous vehicle 100. For example, when the device information 210 includes the biometric information indicating that the user feels hot, the autonomous vehicle 100 may control the windows to be opened when an outside temperature is low and the air is fresh and may control the windows to be closed or the air conditioner to be turned on when the outside temperature is high and the air is unclear.

Figure 29:
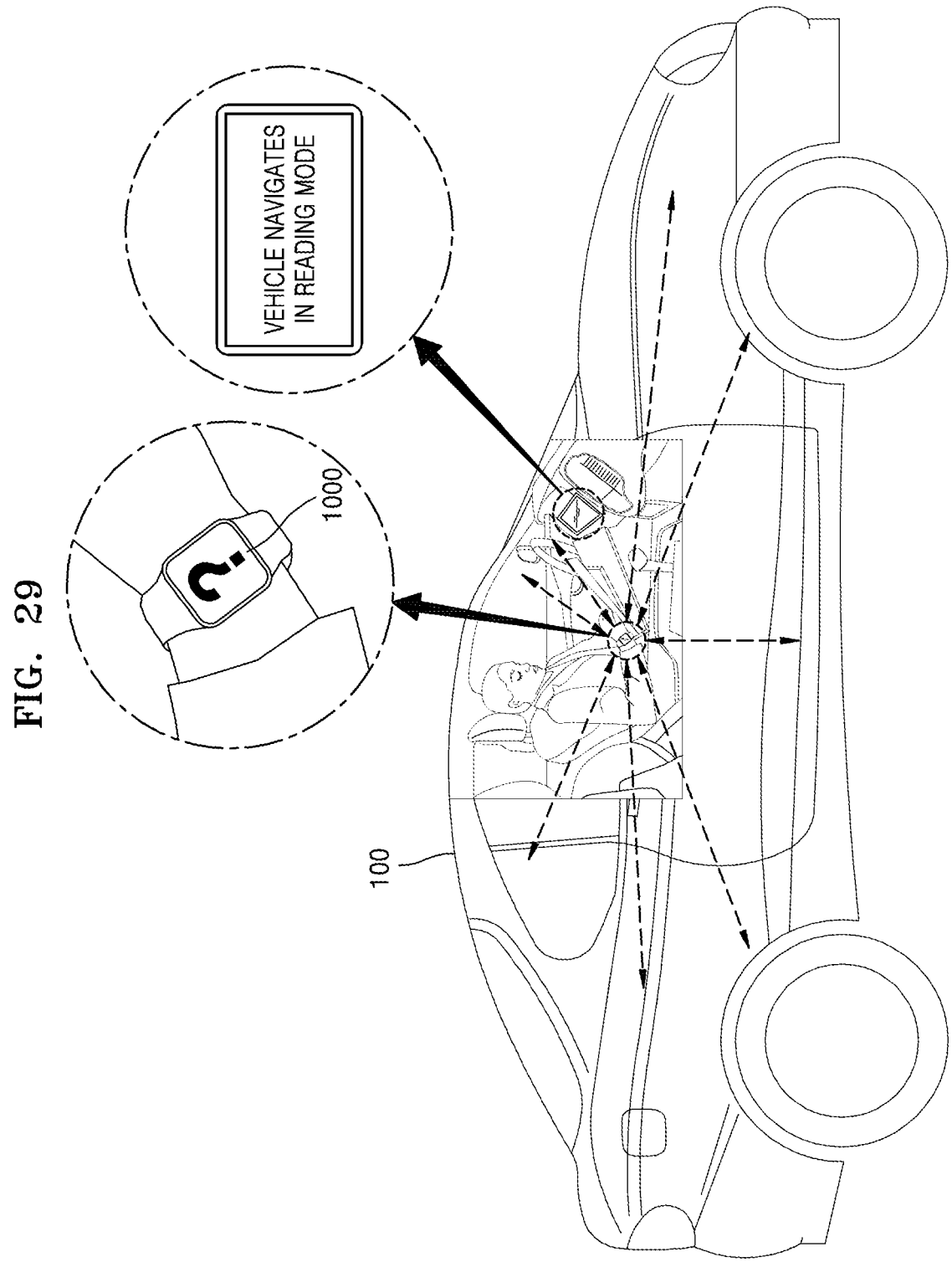
FIG. 29 is a diagram showing an example of controlling an autonomous vehicle based on biometric information indicating actions of a user, according to an embodiment.

FIG. 29 is a diagram showing an example of controlling the autonomous vehicle 100 based on biometric information indicating actions of the user, according to an embodiment. For example, the autonomous vehicle 100 may determine a driving mode of the autonomous vehicle 100 based on the biometric information indicating the actions of the user. As another example, the autonomous vehicle 100 may control at least one peripheral device included in the autonomous vehicle 100, based on the biometric information indicating the actions of the user.

The autonomous vehicle 100 may obtain the device information 210 from the device 1000. The device information 210 received by the autonomous vehicle 100 from the device 1000 may include the biometric information indicating the actions of the user.

When the received device information 210 includes the biometric information indicating the actions of the user, the autonomous vehicle 100 may control the drive system and/or the peripheral device and may determine the driving mode of the autonomous vehicle 100 based on the biometric information.

When receiving gesture information of the user from the device 1000, the autonomous vehicle 100 may navigate in the driving mode corresponding to the received gesture information. When the autonomous vehicle 100 according to another embodiment receives the gesture information of the user from the device 1000, the autonomous vehicle 100 may control a peripheral device corresponding to the received gesture information.

According to an embodiment, when receiving biometric information indicating a reading posture of the user from the device 1000, the autonomous vehicle 100 may control the drive system and may navigate in a reading mode. In the reading mode, the inside of the autonomous vehicle 100 is bright, an acceleration and deceleration frequency is low, and noise within the autonomous vehicle 100 is reduced. As another example, when receiving the biometric information indicating the reading posture of the user from the device 1000, the autonomous vehicle 100 may control the internal lighting device and may maintain brightness within the autonomous vehicle 100 to be equal to or greater than a certain criteria.

According to another embodiment, when receiving, from the device 1000, biometric information indicating that the user has folded his or her arms, the autonomous vehicle 100 may control the drive system and may navigate in a safety mode. The driving mode activating when the user has folded his or her arms may be a driving mode other than the safety mode. As another example, when receiving, from the device 1000, the biometric information indicating that the user has folded his or her arms, the autonomous vehicle 100 may control the audio device and may reproduce preset audio content.

According to another embodiment, when receiving, from the device 1000, biometric information indicating the user has clapped once, the autonomous vehicle 100 may control the drive system and may navigate in an eco-friendly mode. The driving mode activating when the user has clapped once may be a driving mode other than the safety mode. As another example, when receiving, from the device 1000, the biometric information indicating that the user has clapped once, the autonomous vehicle 100 may control the windows and may open the windows of the autonomous vehicle 100.

Figure 30:
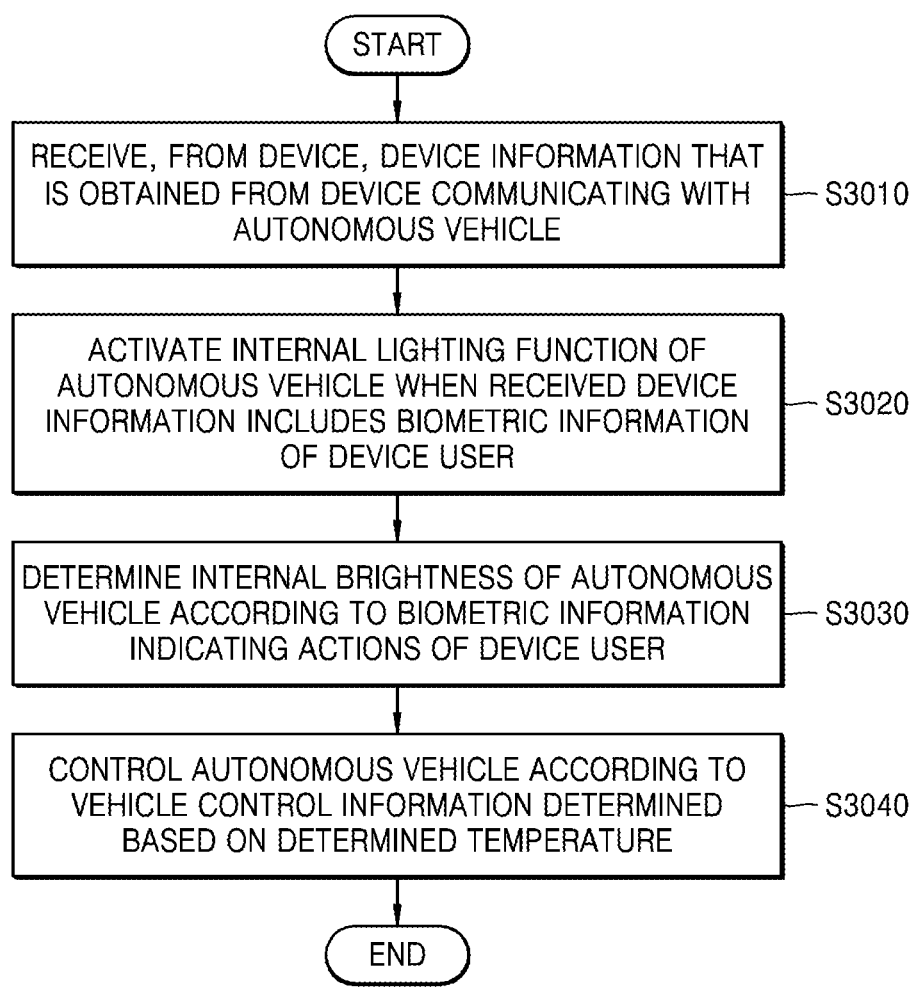
FIG. 30 is a flowchart of a method of controlling an autonomous vehicle based on biometric information indicating actions of a user, according to an embodiment.

FIG. 30 is a flowchart of a method of controlling the autonomous vehicle 100 based on the biometric information indicating the actions of the user, according to an embodiment.

In operation S3010, the autonomous vehicle 100 may receive, from the device 1000, the device information 210 obtained from the device 1000 communicating with the autonomous vehicle 100. For example, the autonomous vehicle 100 may receive, from the device 1000, the device information 210 including the biometric information indicating the actions of the user.

In operation S3020, when the device information 210 received in operation S3010 includes the biometric information indicating the actions of the device user, the autonomous vehicle 100 activates the internal lighting function of the autonomous vehicle 100.

In operation S3030, the autonomous vehicle 100 determines internal brightness of the autonomous vehicle 100 based on the biometric information indicating the actions of the device user.

In operation S3040, the autonomous vehicle 100 is controlled based on the vehicle control information determined based on the determined internal brightness.

The autonomous vehicle 100 may obtain the vehicle control information regarding the internal lighting which is used to control the internal brightness of the autonomous vehicle 100 based on the determined internal brightness. The autonomous vehicle 100 may be controlled based on the obtained vehicle control information. In this case, the autonomous vehicle 100 may maintain the internal brightness of the autonomous vehicle 100 to the determined internal brightness.

Figure 31:
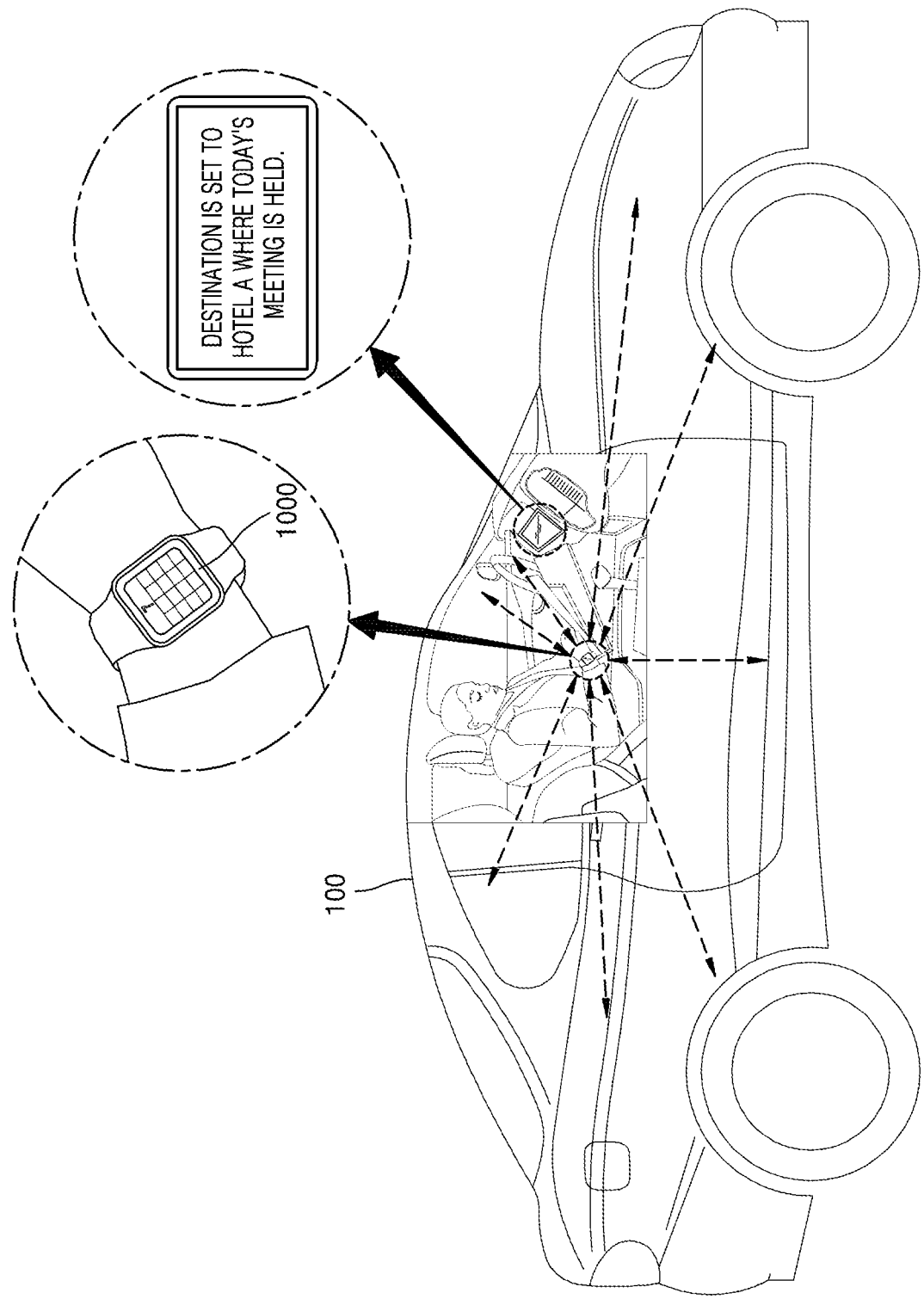
FIG. 31 is a diagram showing an example of controlling an autonomous vehicle based on schedule information, according to an embodiment.

FIG. 31 is a diagram showing an example of controlling the autonomous vehicle 100 based on schedule information, according to an embodiment.

The autonomous vehicle 100 may obtain the device information 210 from the device 1000. The device information 210 received by the autonomous vehicle 100 from the device 1000 may include the schedule information.

When the received device information 210 includes the schedule information of the device user, the autonomous vehicle 100 may activate the navigation function of the autonomous vehicle 100 and may set a driving route corresponding to a location of the schedule information or may add a stop corresponding to the location of the schedule information.

When the autonomous vehicle 100 receives, from the device 1000, schedule appointment location information of the user that corresponds to a current time before navigating, the autonomous vehicle 100 may set the driving route on which the schedule appointment location is the destination, by activating the navigation function.

When the autonomous vehicle 100 receives the schedule appointment location information of the user that corresponds to the current time from the device 1000 while navigating, the autonomous vehicle 100 may set the driving route on which the received schedule appointment location is a stop, by activating the navigation function.

When the received device information 210 includes the schedule information of the device user, the autonomous vehicle 100 may control the drive system of the autonomous vehicle 100 and may determine a driving mode corresponding to a time and/or a location of the schedule information.

For example, when the schedule appointment location is far from the current location and a schedule appointment time is tight from the current time, the autonomous vehicle 100 may determine the driving mode to be a speed mode. As another example, when the schedule appointment location is close to the current location and the schedule appointment time is not tight from the current time, the autonomous vehicle 100 may determine the driving mode to be the safety mode.

When the received device information 210 includes the schedule information of the device user, the autonomous vehicle 100 may activate the accelerator function of the autonomous vehicle 100 and may set the average driving speed corresponding to the time of the schedule information. The set average driving speed may be average speed that is set in the driving mode corresponding to the time of the schedule information. The autonomous vehicle 100 may determine the average driving speed according to a distance from the current location to the schedule appointment location and a time from the current time to the schedule appointment time.

When the received device information 210 includes the schedule information of the device user, the autonomous vehicle 100 may activate the accelerator function and/or the brake function of the autonomous vehicle 100 and may set maximum acceleration and/or average acceleration corresponding to the time of the schedule information. The autonomous vehicle 100 may determine the maximum acceleration and/or the average acceleration according to the distance from the current location to the schedule appointment location and the time from the current time to the schedule appointment time.

Figure 32:
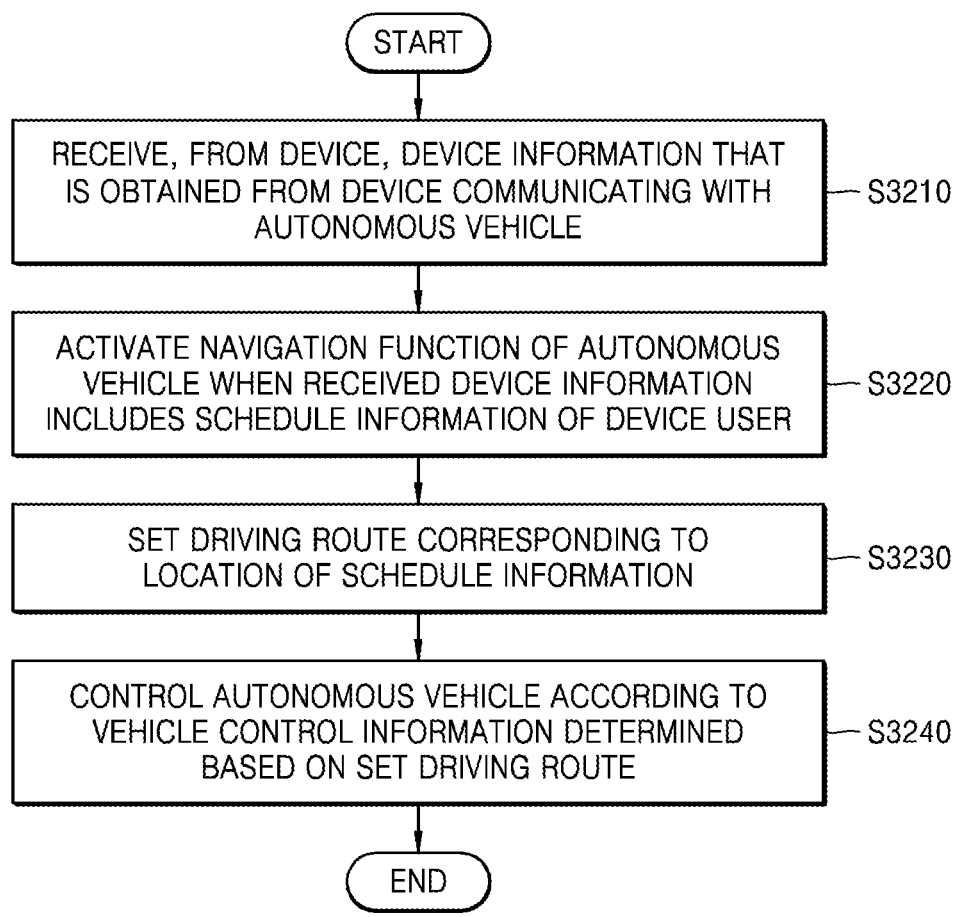
FIG. 32 is a flowchart of a method of controlling a driving route of an autonomous vehicle based on schedule information, according to an embodiment.

FIG. 32 is a flowchart of a method of controlling a driving route of the autonomous vehicle 100 based on the schedule information, according to an embodiment.

In operation S3210, the autonomous vehicle 100 may receive, from the device 1000, the device information 210 obtained from the device 1000 communicating with the autonomous vehicle 100. For example, the autonomous vehicle 100 may receive, from the device 1000, the device information 210 including the schedule information of the device user.

In operation S3220, the device information 210 received in operation S3210 includes the schedule information of the device user, the autonomous vehicle 100 may activate the navigation function of the autonomous vehicle 100.

In operation S3230, the autonomous vehicle 100 sets the driving route corresponding to the location of the schedule information.

For example, when receiving schedule appointment location information indicating that a destination corresponding to the current time is XX tower, the autonomous vehicle 100 may activate the navigation function of the autonomous vehicle 100 and may determine a driving route on which the destination is the XX tower.

In operation S3240, the autonomous vehicle 100 is controlled based on the vehicle control information that is determined based on the set driving route.

The autonomous vehicle 100 may obtain the vehicle control information used to control the autonomous vehicle 100 to navigate along the driving route that is determined according to the navigation function. The autonomous vehicle 100 may be controlled based on the obtained vehicle control information. In this case, the autonomous vehicle 100 may autonomously navigate along the determined driving route.

Figure 33:
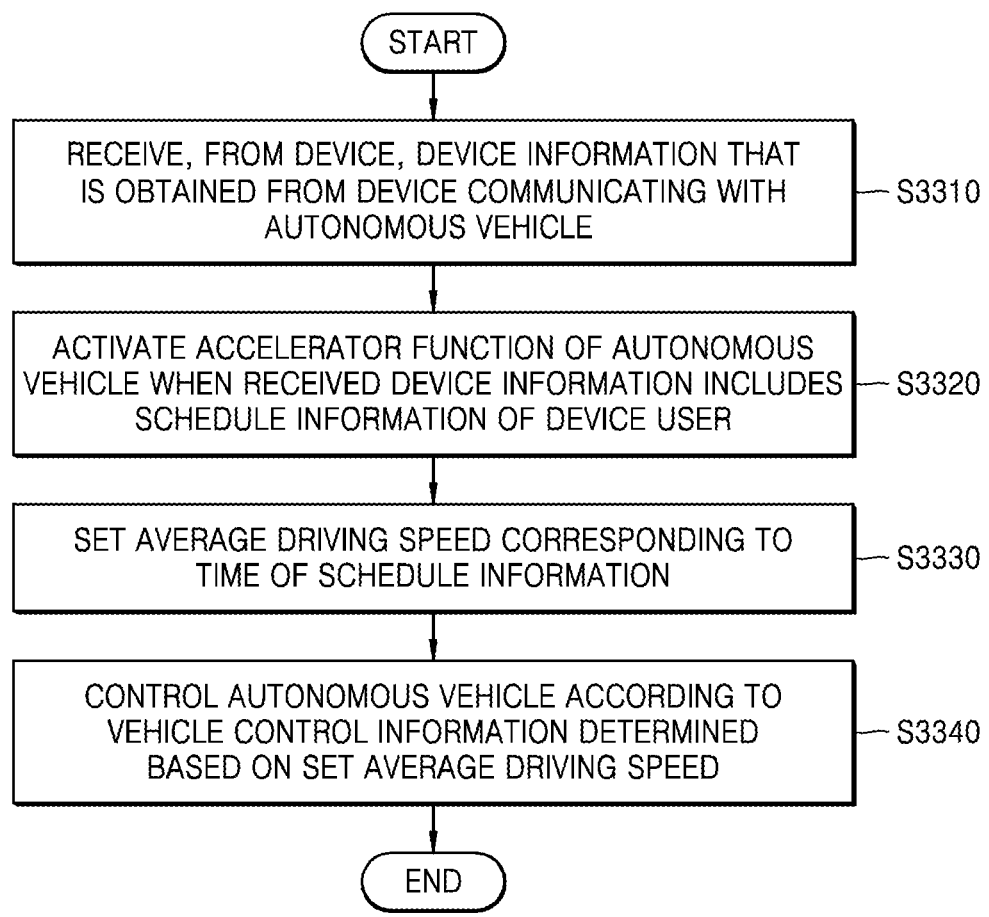
FIG. 33 is a flowchart of a method of controlling driving speed of an autonomous vehicle based on schedule information, according to an embodiment.

FIG. 33 is a flowchart of a method of controlling driving speed of the autonomous vehicle 100 based on the schedule information, according to an embodiment.

Operation S3310 corresponds to operation S3210 described above, and thus detailed descriptions thereof will be omitted.

In operation S3320, when the device information received in operation S3310 includes the schedule information of the device user, the autonomous vehicle 100 activates the accelerator function of the autonomous vehicle 100.

In operation S3330, the autonomous vehicle 100 sets the average driving speed corresponding to the time of the schedule information.

In operation S3340, the autonomous vehicle 100 is controlled based on the vehicle control information determined based on the set average driving speed.

Figure 34:
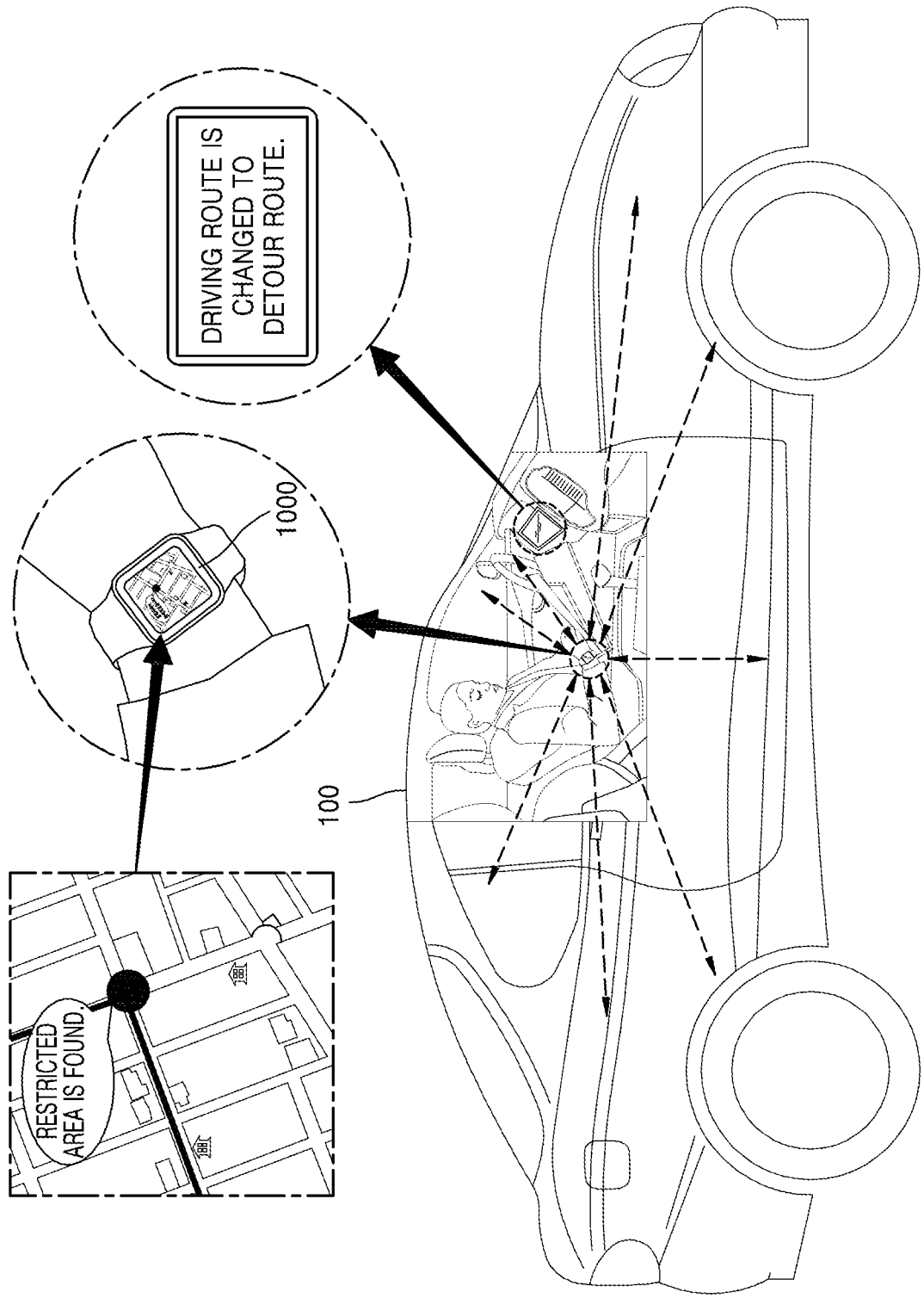
FIG. 34 is a diagram showing an example of controlling a navigation function of an autonomous vehicle based on driving environment information, according to an embodiment.

FIG. 34 is a diagram showing an example of controlling the navigation function of the autonomous vehicle 100 based on driving environment information, according to an embodiment.

In the present specification, the driving environment information may include information indicating an external situation regarding driving of the vehicle.

For example, the driving environment information may include local information corresponding to the current location of the device user. The local information may include road situation information that is information indicating a road situation corresponding to the current location and/or regional information that is information regarding a region corresponding to the current location. The road situation information may include road state information, traffic situation information, traffic accident information, road work information, nearby building information, nearby facility information, surrounding view information, or the like.

As another example, the driving environment information may indicate whether detouring is required, according to a situation in a surrounding environment. The detouring may be determined based on the local information.

As another example, the driving environment information may indicate availability of autonomous driving according to the situation in the surrounding information. The availability of the autonomous driving may be determined according to the local information.

The autonomous vehicle 100 may obtain the device information 210 from the device 1000. The device information 210 received by the autonomous vehicle 100 from the device 1000 may include the driving environment information.

When receiving, from the device 1000, the driving environment information before navigating, the autonomous vehicle 100 may set a driving route by activating the navigation function and reflecting the received driving environment information and activating the navigation function.

When receiving, from the device 1000, the driving environment information while navigating, the autonomous vehicle 100 may renew the driving route by activating the navigation function and reflecting the received driving environment information.

For example, when the received device information 210 includes driving environment information indicating that detouring is required, the autonomous vehicle 100 may control the navigation function of the autonomous vehicle 100 based on the driving environment information and may change the driving route of the autonomous vehicle 100 to a detour route. For example, when the autonomous vehicle 100 receives, from the device 1000, driving environment information indicating that the driving route includes a restricted area, the autonomous vehicle 100 may control the navigation function of the autonomous vehicle 100 based on the driving environment information and may change the driving route of the autonomous vehicle 100 to the detour route. The driving environment information indicating that the detouring is required may include information indicating that there is a problem on the driving route. For example, the driving environment information indicating that the detouring is required may include information indicating that a condition of a road on the driving route is bad, information indicating a traffic accident has occurred on the driving route, information indicating that there is a road work, information indicating a traffic jam, information indicating that there is a low-speed area (e.g., a school zone), information indicating that there is a uncomfortable driving area (e.g., a sharp curve, etc.), or the like.

Figure 35:
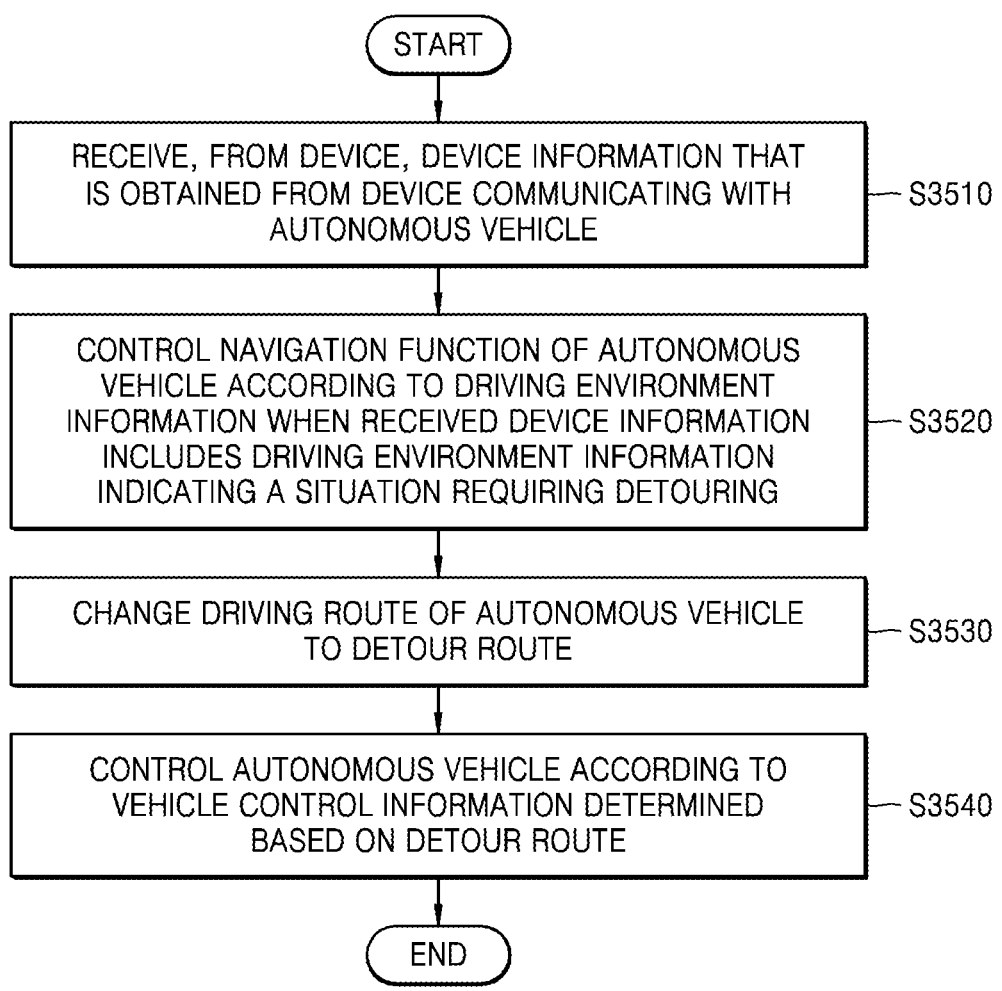
FIG. 35 is a flowchart of a method of controlling a navigation function of an autonomous vehicle based on driving environment information, according to an embodiment.

FIG. 35 is a flowchart of a method of controlling the navigation function of the autonomous vehicle 100 based on the driving environment information, according to an embodiment.

In operation S3510, the autonomous vehicle 100 may receive, from the device 1000, the device information 210 obtained from the device 1000 communicating with the autonomous vehicle 100. For example, the autonomous vehicle 100 may receive, from the device 1000, the device information 210 including the driving environment information. The driving environment information may indicate whether detouring is required.

In operation S3520, when the device information 210 received in operation S3510 includes the driving environment information indicating that the detouring is required, the autonomous vehicle 100 controls the navigation function of the autonomous vehicle 100 based on the driving environment information.

In operation S3530, the autonomous vehicle 100 changes the driving route of the autonomous vehicle 100 to the detour route.

In operation S3540, the autonomous vehicle 100 is controlled based on the vehicle control information determined based on the changed detour route.

Figure 36:
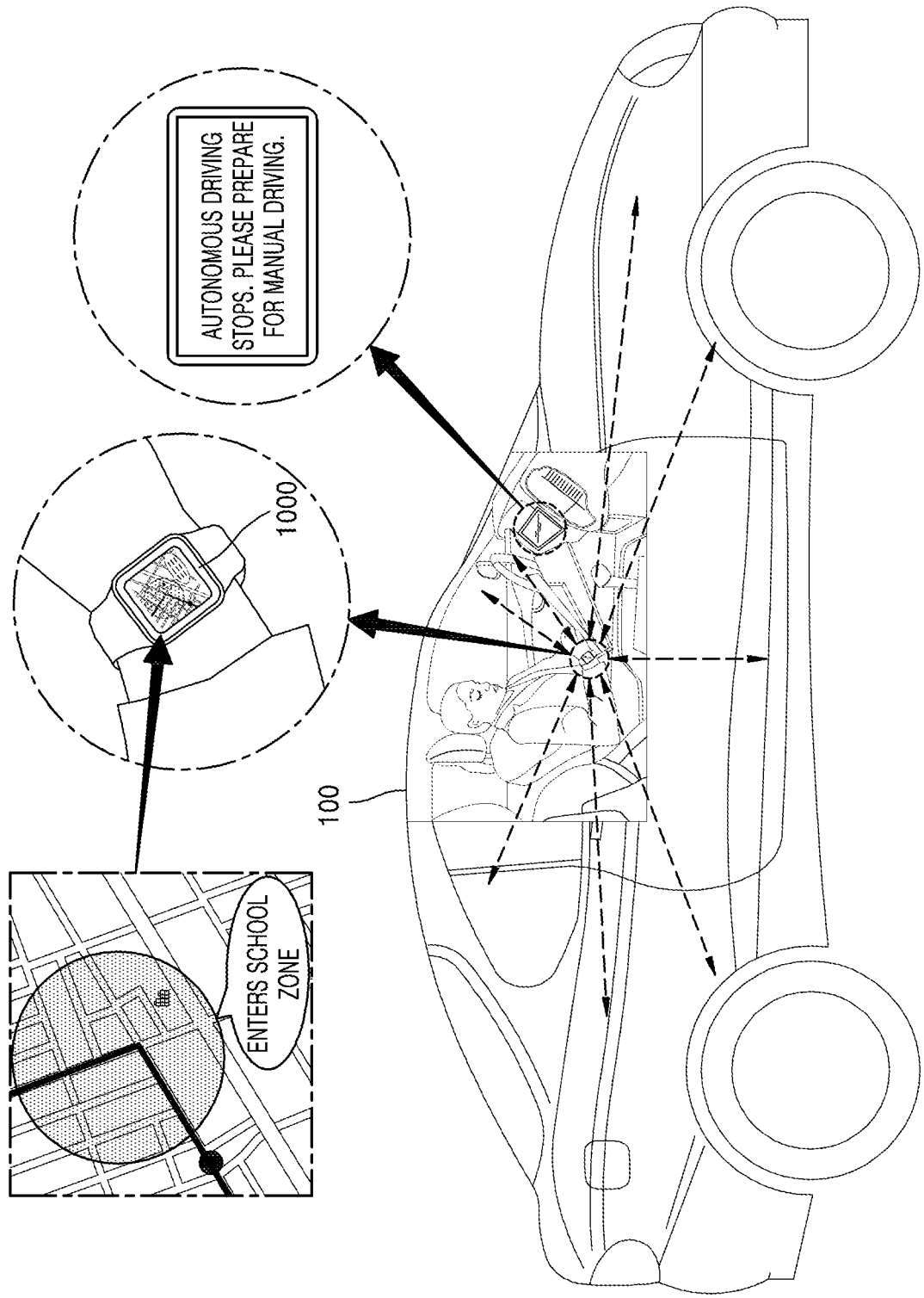
FIG. 36 is a diagram showing an example of controlling an autonomous driving function of an autonomous vehicle based on driving environment information, according to an embodiment.

FIG. 36 is a diagram showing an example of controlling an autonomous driving function of the autonomous vehicle 100 based on the driving environment information, according to an embodiment.

The autonomous vehicle 100 may obtain the device information 210 from the device 1000. The device information 210 received from the device 1000 by the autonomous vehicle 100 may include the driving environment information. The device information 210 received by the autonomous vehicle 100 from the device 1000 may include driving environment information indicating that autonomous driving is impossible.

When the autonomous vehicle 100 receives the driving environment information from the device 1000 while autonomously navigating, the autonomous vehicle 100 may control the autonomous driving function and may stop the autonomous driving function by reflecting the received driving environment information.

For example, when the received device information 210 includes the driving environment information indicating that the autonomous driving is impossible, the autonomous vehicle 100 may stop autonomous driving by controlling the autonomous driving function of the autonomous vehicle 100 based on the driving environment information. For example, when the autonomous vehicle 100 receives, from the device 1000, driving environment information indicating that there is a caution area on the driving route, the autonomous vehicle 100 may control the autonomous driving function of the autonomous vehicle 100 based on the driving environment information and may stop the autonomous driving function of the autonomous vehicle 100. The driving environment information indicating that the autonomous driving is impossible may include information indicating an area where manual driving is required. For example, the driving environment information indicating that the autonomous driving is impossible may include information indicating that low-speed driving is required because a road on the driving route is icy, information indicating that manual driving is required to deal with an unexpected situation as a traffic accident occurs on the driving route, information indicating that there is a road work in progress, information indicating a traffic jam, information indicating that there is a low-speed area (e.g., a school zone, etc.), information indicating that there is an area (e.g., an area having no map information) where autonomous driving is impossible, or the like.

Figure 37:
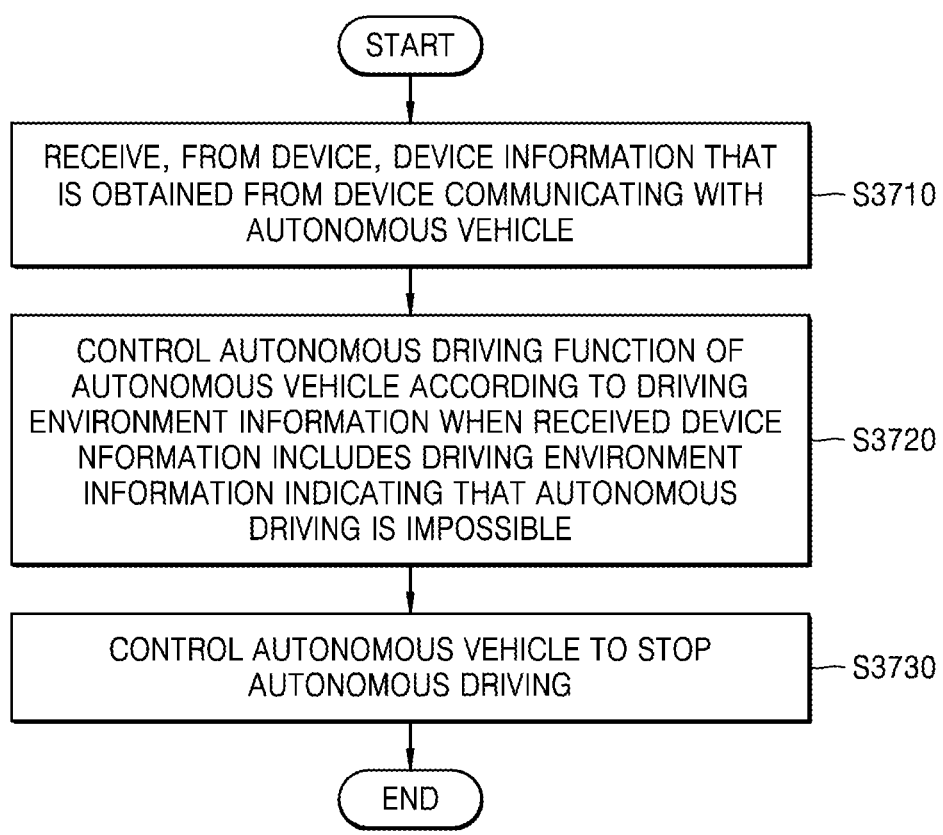
FIG. 37 is a flowchart of a method of controlling an autonomous driving function of an autonomous vehicle based on driving environment information, according to an embodiment.

FIG. 37 is a flowchart of a method of controlling the autonomous driving function of the autonomous vehicle 100 based on the driving environment information, according to an embodiment.

In operation S3710, the autonomous vehicle 100 may receive, from the device 1000, the device information 210 obtained from the device 1000 communicating with the autonomous vehicle 100. For example, the autonomous vehicle 100 may receive, from the device 1000, the device information 210 including the driving environment information. The driving environment information may indicate that the autonomous driving is impossible.

In operation S3720, when the device information 210 received in operation S3710 includes the driving environment information indicating that the autonomous driving is impossible, the autonomous vehicle 100 controls the autonomous driving function of the autonomous vehicle 100 based on the driving environment information. The autonomous vehicle 100 may stop the autonomous driving by controlling the autonomous driving function. For example, when the user is able to drive the autonomous vehicle 100 based on the biometric information included in the device information 210, the autonomous vehicle 100 may stop the autonomous driving function by controlling the same.

In operation S3730, the autonomous vehicle 100 is controlled to stop the autonomous driving. The autonomous vehicle 100 may display a message saying that manual driving starts. When the autonomous driving function stops, the autonomous vehicle 100 may navigate based on manual manipulation of the user.

Figure 38:
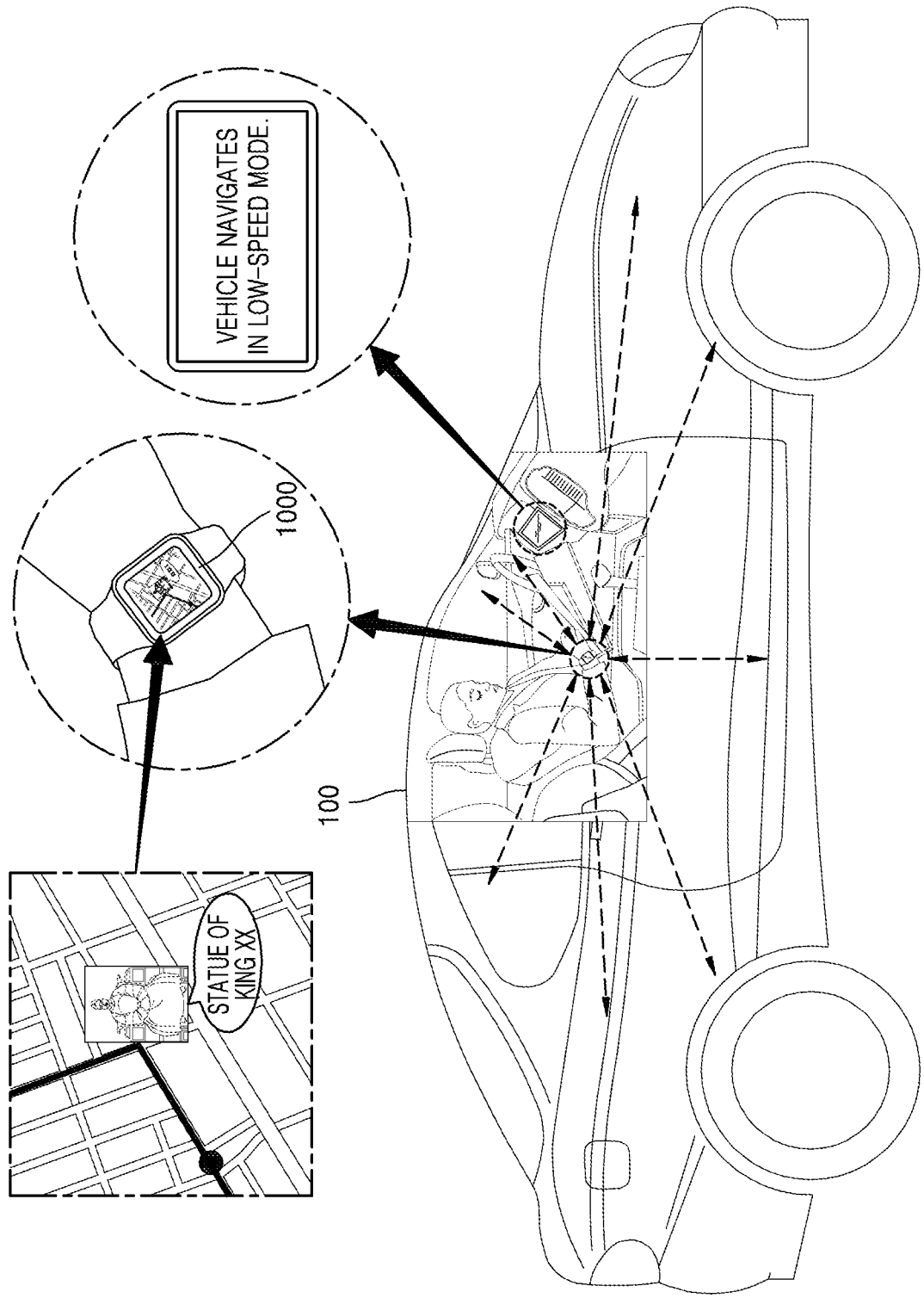
FIG. 38 is a diagram showing an example of controlling an autonomous vehicle based on driving environment information indicating local information, according to an embodiment.

FIG. 38 is a diagram showing an example of controlling the autonomous vehicle 100 based on the driving environment information indicating the local information, according to an embodiment.

The autonomous vehicle 100 may obtain the device information 210 from the device 1000. The device information 210 received from the device 1000 by the autonomous vehicle 100 may include the driving environment information. The driving environment information received by the autonomous vehicle 100 from the device 1000 may include local information.

When the received device information 210 includes the driving environment information indicating the local information corresponding to a current location of the device user, the autonomous vehicle 100 may execute the drive system of the autonomous vehicle 100 and may determine the driving mode of the autonomous vehicle 100 based on the driving environment information.

For example, when the autonomous vehicle 100 receives driving environment information indicating that a current neighboring area is a school zone, the autonomous vehicle 100 may execute the drive system of the autonomous vehicle 100 and may determine the driving mode of the autonomous vehicle 100 to a low-speed mode.

As another example, when the autonomous vehicle 100 receives driving environment information indicating that a current neighboring area is a construction area, the autonomous vehicle 100 may execute the drive system of the autonomous vehicle 100 and may determine the driving mode of the autonomous vehicle 100 to the safety mode.

As another example, when the autonomous vehicle 100 receives driving environment information indicating that a road that the autonomous vehicle 100 is currently navigating is an icy road, the autonomous vehicle 100 may execute the drive system of the autonomous vehicle 100 and may determine the driving mode of the autonomous vehicle 100 to an antiskid mode.

As another example, when the autonomous vehicle 100 receives driving environment information indicating that a current neighboring area is a tourist attraction, the autonomous vehicle 100 may execute the drive system of the autonomous vehicle 100 and may determine the driving mode of the autonomous vehicle 100 to be a low-speed mode.

When the received device information 210 includes the local information, the autonomous vehicle 100 may activate the accelerator function and may set the average driving speed corresponding to the local information. The set average driving speed may be average speed set in a driving mode corresponding to the local information. The autonomous vehicle 100 may determine the average driving speed according to characteristics of an area where the local information is obtained. For example, when there is a famous building or tower 500 meters ahead, the average driving speed may be set to be lower than average standard speed.

When the received device information 210 includes the local information, the autonomous vehicle 100 may activate the accelerator function and/or the brake function of the autonomous vehicle 100 and may set the maximum acceleration and/or the average acceleration corresponding to the local information. For example, when receiving local information indicating that a road on the driving route is slippery, the autonomous vehicle 100 may be controlled to navigate at maximum acceleration and/or average acceleration lower than standard acceleration.

Figure 39:
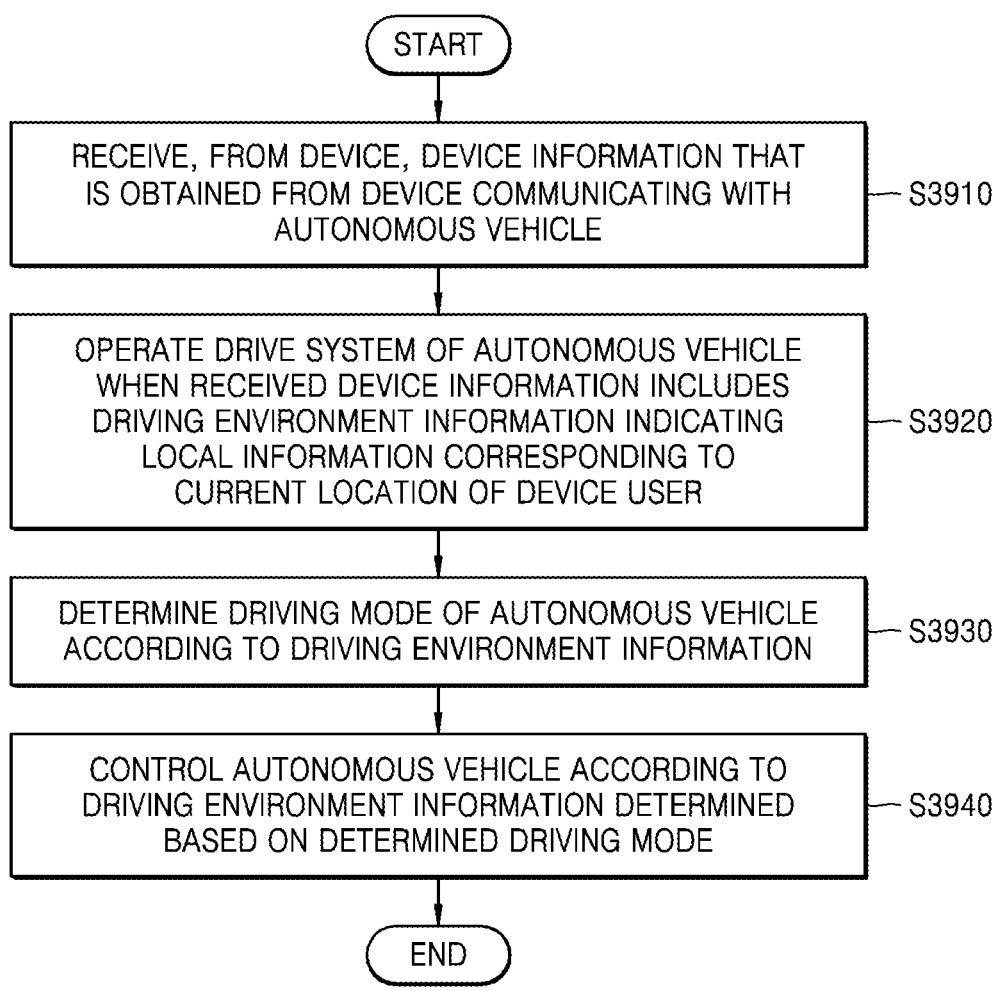
FIG. 39 is a flowchart of a method of controlling an autonomous vehicle based on driving environment information indicating local information, according to an embodiment.

FIG. 39 is a flowchart of a method of controlling the autonomous vehicle 100 based on the driving environment information indicating the local information, according to an embodiment.

In operation S3910, the autonomous vehicle 100 may receive, from the device 1000, the device information 210 obtained from the device 1000 communicating with the autonomous vehicle 100. For example, the autonomous vehicle 100 may receive, from the device 1000, the device information 210 including the driving environment information. The driving environment information may include local information corresponding to a current location of the device user.

In operation S3920, when the device information 210 received in operation S3910 includes the driving environment information indicating the local information corresponding to the current location of the device user, the autonomous vehicle 100 may execute the drive system of the autonomous vehicle 100.

In operation S3930, the autonomous vehicle 100 determines the driving mode of the autonomous vehicle 100 based on the driving environment information.

In operation S3940, the autonomous vehicle 100 is controlled based on the vehicle control information determined based on the driving mode determined in operation S3930.

Figure 40:
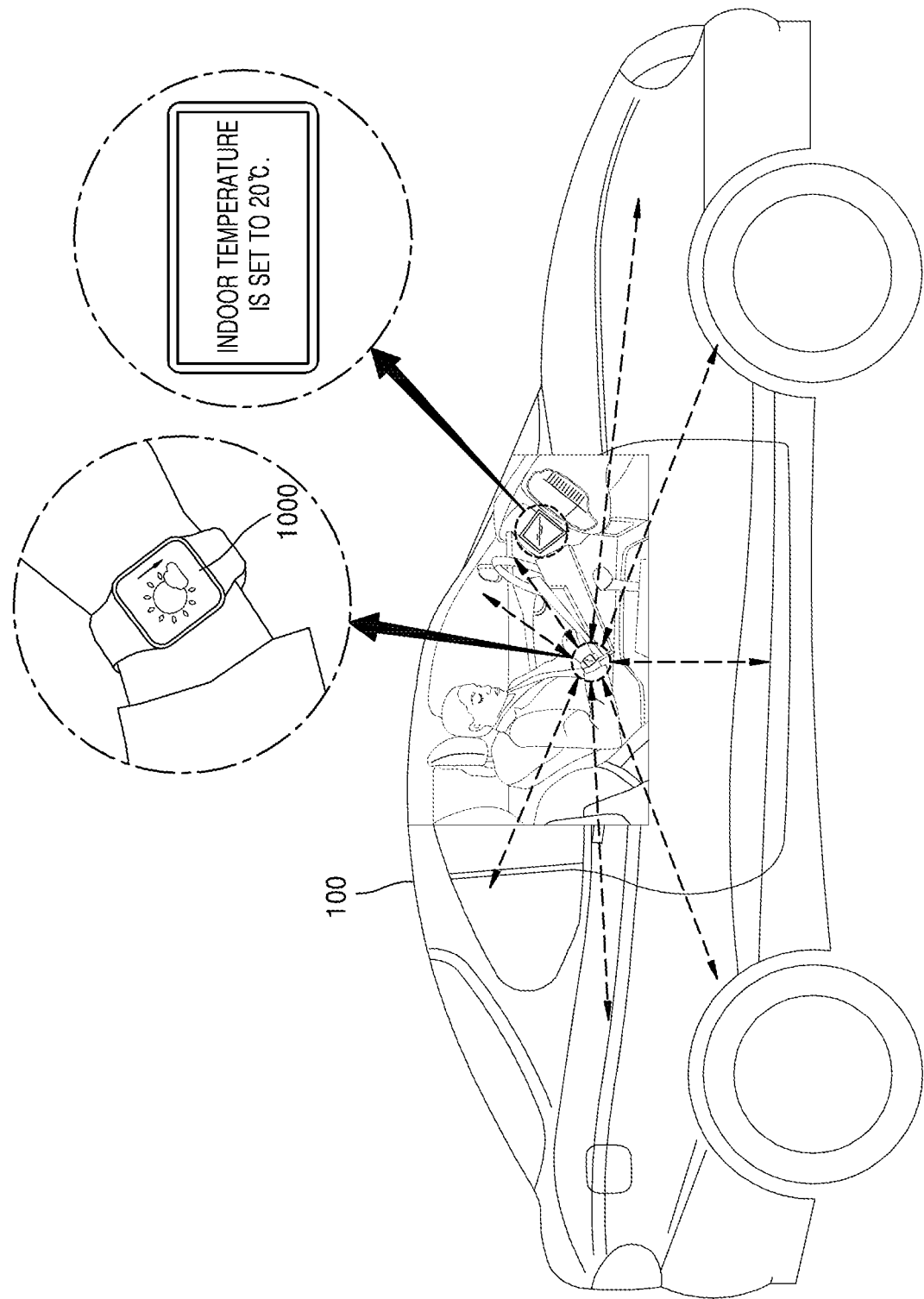
FIG. 40 is a diagram showing an example of controlling an autonomous vehicle based on weather information, according to an embodiment.

FIG. 40 is a diagram showing an example of controlling the autonomous vehicle 100 based on weather information, according to an embodiment.

The autonomous vehicle 100 may obtain the device information 210 from the device 1000. The device information 210 received by the autonomous vehicle 100 from the device 1000 may include the weather information.

When the received device information 210 includes the weather information, the autonomous vehicle 100 may activate a temperature adjusting function of the autonomous vehicle 100 and may determine an indoor setting temperature of the autonomous vehicle 100 based on the weather information. The temperature adjusting function may be performed by the air conditioning device, the heating device, a dehumidification device, the ventilation device (e.g., a ventilator, windows, etc.), or the like.

For example, when the autonomous vehicle 100 receives, form the device 1000, weather information indicating that the weather in the current area is fine, the autonomous vehicle 100 may determine a temperature lower than a current indoor temperature as a setting temperature. When the weather information includes the information indicating that the weather is fine and the air is clean and the setting temperature is lower than the current indoor temperature, the autonomous vehicle 100 may control a window device to open the windows.

As another example, when the autonomous vehicle 100 receives, from the device 1000, weather information indicating that the weather in the current area is cold and rainy, the autonomous vehicle 100 may determine the setting temperature to be higher than the current indoor temperature of the autonomous vehicle 100. When the weather information includes information indicating that it is cold and rainy and the setting temperature is higher than the current indoor temperature, the autonomous vehicle 100 may be controlled to close the windows, activate the dehumidification function, and activate the heater function.

However, the present disclosure is not limited to the above-described embodiment. The autonomous vehicle 100 may turn on the air conditioning device, the heating device, the dehumidification device, the ventilation device (e.g., the ventilator, the windows, etc.), or the like in accordance with the weather information (e.g., a temperature, a humidity, whether is it rainy or snowing, concentration of fine dusts, an air pollution degree, etc.), etc. For example, the autonomous vehicle 100 may renew an indoor setting temperature according to the weather information.

Figure 41:
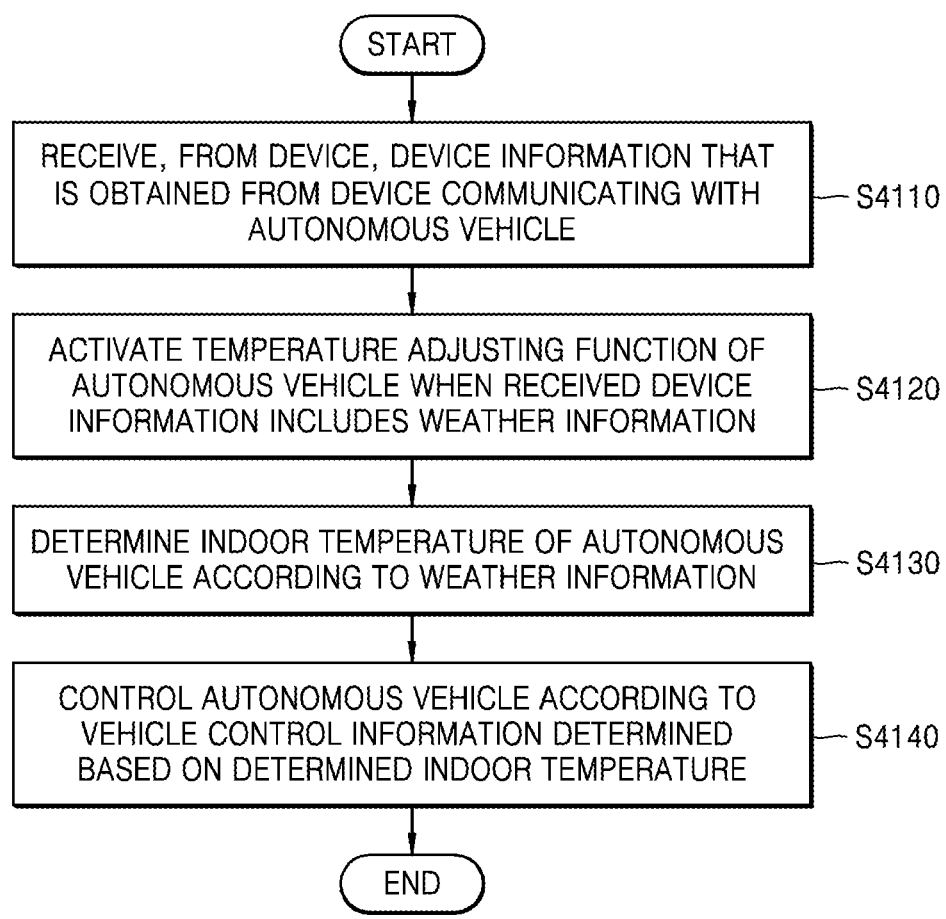
FIG. 41 is a flowchart of a method of controlling an autonomous vehicle based on weather information, according to an embodiment.

FIG. 41 is a flowchart of a method of controlling the autonomous vehicle 100 based on the weather information, according to an embodiment.

In operation S4110, the autonomous vehicle 100 may receive, from the device 1000, the device information 210 obtained from the device 1000 communicating with the autonomous vehicle 100. For example, the autonomous vehicle 100 may receive, from the device 1000, the device information 210 including the weather information.

In operation S4120, when the device information received in operation S2310 includes the weather information, the autonomous vehicle 100 may activate the temperature adjusting function of the autonomous vehicle 100.

In operation S4130, the autonomous vehicle 100 determines the indoor setting temperature of the autonomous vehicle 100 based on the weather information.

In operation S4140, the autonomous vehicle 100 is controlled based on the vehicle control information determined based on the setting temperature determined in operation S3230.

Figure 42:
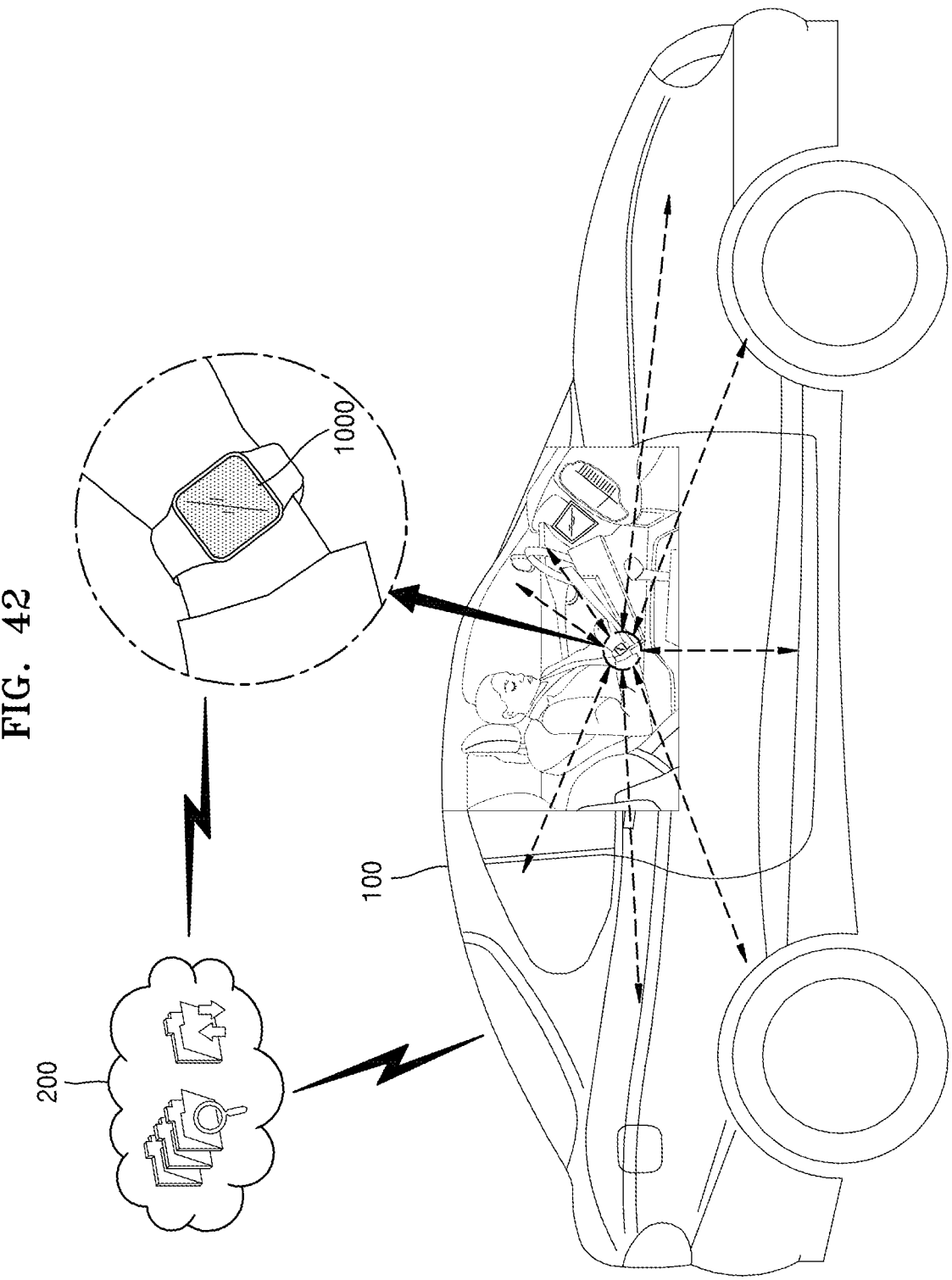
FIG. 42 is a diagram showing an example of controlling an autonomous vehicle based on information obtained from a server, according to an embodiment.

FIG. 42 is a diagram showing an example of controlling the autonomous vehicle 100 based on information obtained from the server 200, according to an embodiment.

The server 200 may communicate with the device 1000 and/or the autonomous vehicle 100.

The autonomous vehicle 100 may obtain the device information 210 from the device 1000. The device information 210 received by the autonomous vehicle 100 from the device 1000 may include the information received by the device 1000 from the server 200.

The autonomous vehicle 100 may obtain server information from the server 200. For example, the server information received by the autonomous vehicle 100 from the server 200 may include information uploaded by the user of the device 1000 to the server 200 by using the device 1000. The server information received by the autonomous vehicle 100 from the server 200 may include information that is previously stored in the server 200. For example, the server information may include the schedule information, the surrounding situation information, the weather information, or the like.

The autonomous vehicle 100 may obtain the vehicle control information based on the server information received from the server 200 and/or the device information 210 that is received from the device 1000.

For example, the autonomous vehicle 100 may obtain the vehicle control information used to set the driving route of the autonomous vehicle 100 based on the schedule information of the user that is included in the server information and the biometric information of the user that is included in the device information 210.

As another example, the autonomous vehicle 100 may obtain the vehicle control information used to determine the driving mode and/or the driving route of the autonomous vehicle 100 based on the driving environment information included in the server information and the biometric information of the user that is included in the device information 210.

Figure 43:
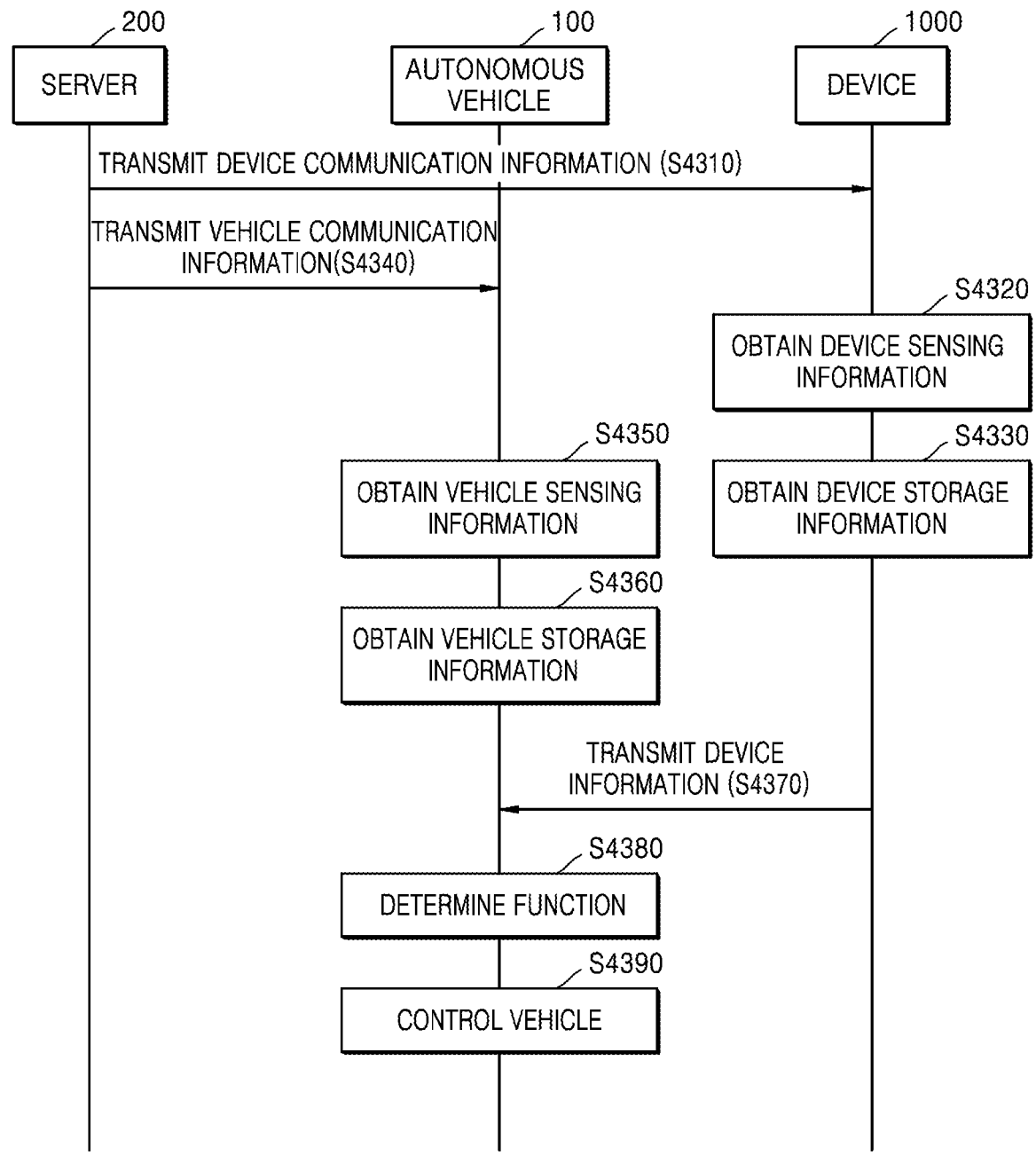
FIG. 43 is a flowchart of a method of controlling an autonomous vehicle based on information obtained from a server, according to an embodiment.

FIG. 43 is a flowchart of a method of controlling the autonomous vehicle 100 based on the information obtained from the server 200, according to an embodiment.

In operation S4310, the device 1000 receives, from the server 200, the device communication information 231.

In operation S4320, the device 1000 obtains the device sensing information 241.

In operation S4330, the device 1000 obtains the device storage information 251.

In operation S4340, the autonomous vehicle 100 receives, from the server 200, the vehicle communication information 232.

In operation S4350, the autonomous vehicle 100 obtains the vehicle sensing information 242.

In operation S4360, the autonomous vehicle 100 obtains the vehicle storage information 252.

In operation S4370, the autonomous vehicle 100 receives, from the device 1000, the device information 210 that is obtained by using at least one of the device communication information 231, the device sensing information 241, the device storage information 251, and the device generation information.

In operation S4380, the autonomous vehicle 100 may determine at least one of functions that may be activated in the autonomous vehicle 100, and in operation S4390, the autonomous vehicle 100 may control the at least one function determined in operation S4380.

The autonomous vehicle 100 may obtain the vehicle information 220 by using at least one of the vehicle communication information 232, the vehicle sensing information 242, the vehicle storage information 252, and the vehicle generation information. The autonomous vehicle 100 may determine at least one of functions that may be activated in the autonomous vehicle 100 by using the vehicle information 220 and/or the device information 210. Also, the autonomous vehicle 100 may control the function that is determined according to the vehicle information 220 and/or the device information 210.

For example, the autonomous vehicle 100 may control the navigation device 5130, the drive system (e.g., the accelerator, the brake, the transmission, the steering system, etc.), the internal lighting (e.g., an indoor light), the external lighting (e.g., a light), the audio/video device (e.g., the speaker), the temperature adjusting device (e.g., the air conditioner, the heater, the ventilator, the windows, the heating wires), the geo-fence, other peripheral devices (e.g., the wiper, the turn signals, the touch screen), the sensors, or the like. However, the present disclosure is not limited thereto.

Also, all of the above-described embodiments may be embodied based on the server information.

Figure 44:
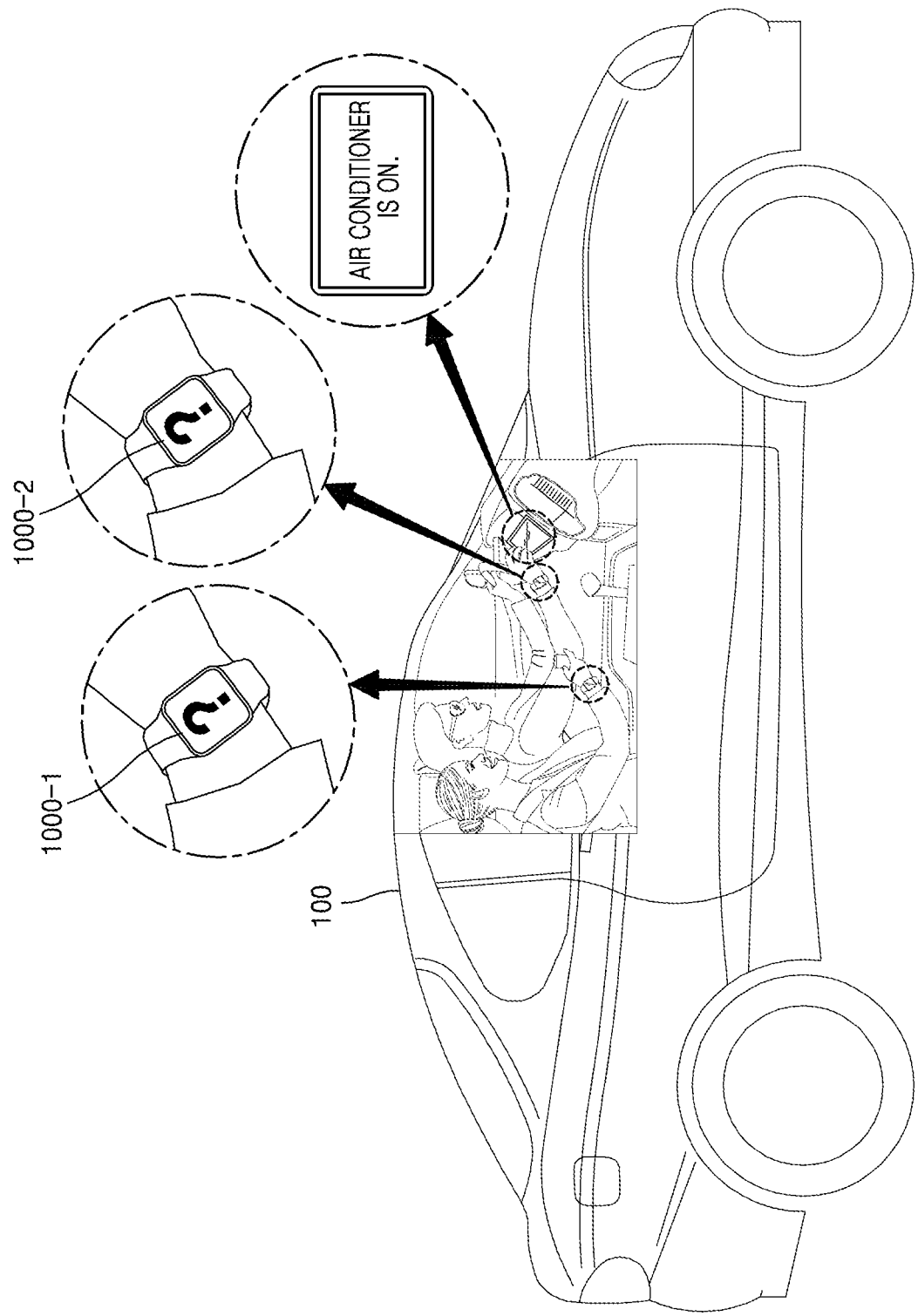
FIG. 44 is a diagram showing an example of controlling an autonomous vehicle based on information obtained from devices, according to an embodiment.

FIG. 44 is a diagram showing an example of controlling the autonomous vehicle 100 based on information obtained from devices 1000-1 and 1000-2, according to an embodiment.

The autonomous vehicle 100 may obtain the information from the devices 1000-1 and 1000-2. For example, the autonomous vehicle 100 may receive first device information 210 from the first device 1000-1 and may receive second device information 210 from the second device 1000-2.

The autonomous vehicle 100 may obtain the vehicle control information by using the information from the devices 1000-1 and 1000-2. The first device information and/or the second device information may be used as the device information 210 described with reference to FIGS. 1 to 43.

The autonomous vehicle 100 may assign different priorities to the first device information and the second device information.

For example, the autonomous vehicle 100 may assign different priorities according to seating positions of passengers. For example, the highest priority may be assigned to information obtained from the device 1000-2 of a passenger seating on a driver seat.

As another example, the autonomous vehicle 100 may assign different priorities according to unique identification numbers respectively assigned to devices. For example, when the autonomous vehicle 100 is set to assign the highest priority to the unique identification number of the first device 1000-1, the autonomous vehicle 100 may set the priority of the first device information to be higher than the priority of the second device information.

As another example, the autonomous vehicle 100 may assign different priorities according to log-in information of each device. For example, when the autonomous vehicle 100 is set to assign the highest priority to the log-in information of the first device 1000-1, the autonomous vehicle 100 may set the priority of the first device information to be higher than the priority of the second device information.

When the autonomous vehicle 100 obtains the information from the devices 1000-1 and 1000-2, the autonomous vehicle 100 may generate the vehicle control information based on information having a higher priority. For example, when biometric information of the first device information includes information indicating that the user feels hot, biometric information of the second device information includes information indicating that the user feels cold, and the priority of the first device information is higher than the priority of the second device information, the autonomous vehicle 100 may generate vehicle control information used to operate the air conditioner. Also, the autonomous vehicle 100 may operate the air conditioner based on the generated vehicle control information.

Figure 45:
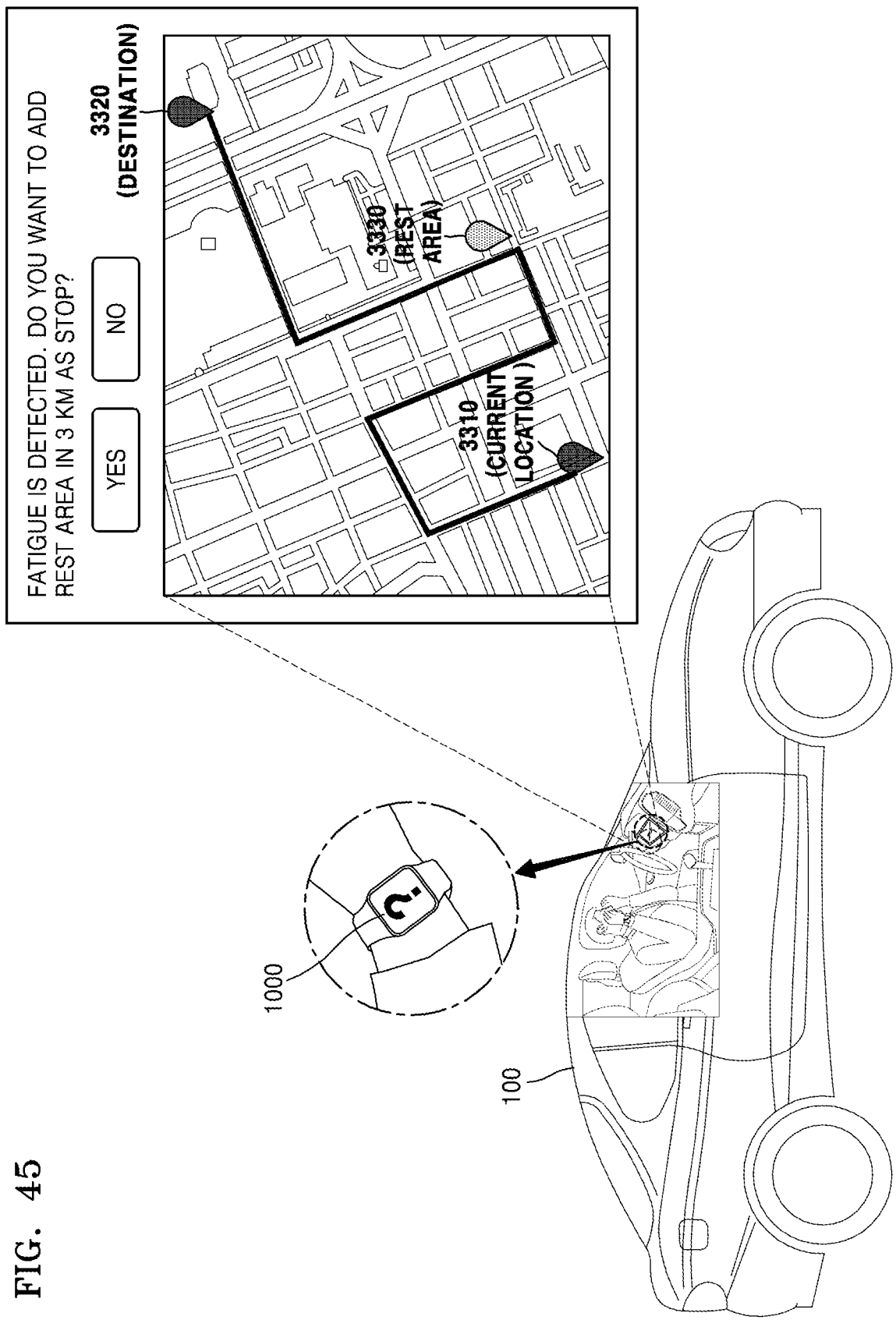
FIG. 45 is a diagram showing an example of controlling an autonomous vehicle by displaying an inquiry, according to an embodiment.

FIG. 45 is a diagram showing an example of controlling the autonomous vehicle 100 by displaying an inquiry, according to an embodiment.

The autonomous vehicle 100 may obtain, from the device 1000, the device information 210 and may determine one of functions of the autonomous vehicle 100, which is to be controlled, based on the obtained device information 210. Also, the autonomous vehicle 100 may generate the vehicle control information used to control the function determined based on the obtained device information 210.

The autonomous vehicle 100 according to another embodiment may obtain the device information 210 from the device 1000 and may determine one of functions of the autonomous vehicle 100, which is to be controlled, based on the obtained device information 210 and the vehicle information 220. Also, the autonomous vehicle 100 may generate the vehicle control information used to control the function determined based on the obtained device information 210 and the vehicle information 220.

The autonomous vehicle 100 may display an inquiry on the display included in the autonomous vehicle 100 before controlling the function determined based on the generated vehicle control information.

For example, when the autonomous vehicle 100 receives, from the device 1000, the device information 210 including the biometric information indicating that a fatigue degree of the user is high, the autonomous vehicle 100 may display an inquiry about whether to add, as a stop, a rest area 3330 to the driving route from a current location 3310 to a destination 3320.

As another example, when the autonomous vehicle 100 receives, from the device 1000, the device information 210 including the driving environment information indicating that the autonomous vehicle 100 enters a school zone, the autonomous vehicle 100 may display an inquiry about whether to change the driving mode to the low-speed mode.

As another example, when the autonomous vehicle 100 includes the vehicle information 220 including information indicating that the tire inflation pressure is less than or equal to a certain criteria, the autonomous vehicle 100 may display an inquiry about whether to add a nearby repair shop as a stop.

However, the present disclosure is not limited thereto. Before controlling the autonomous vehicle 100 based on the control information, the inquiry may be displayed in all of the above-described embodiments.

Figure 46:
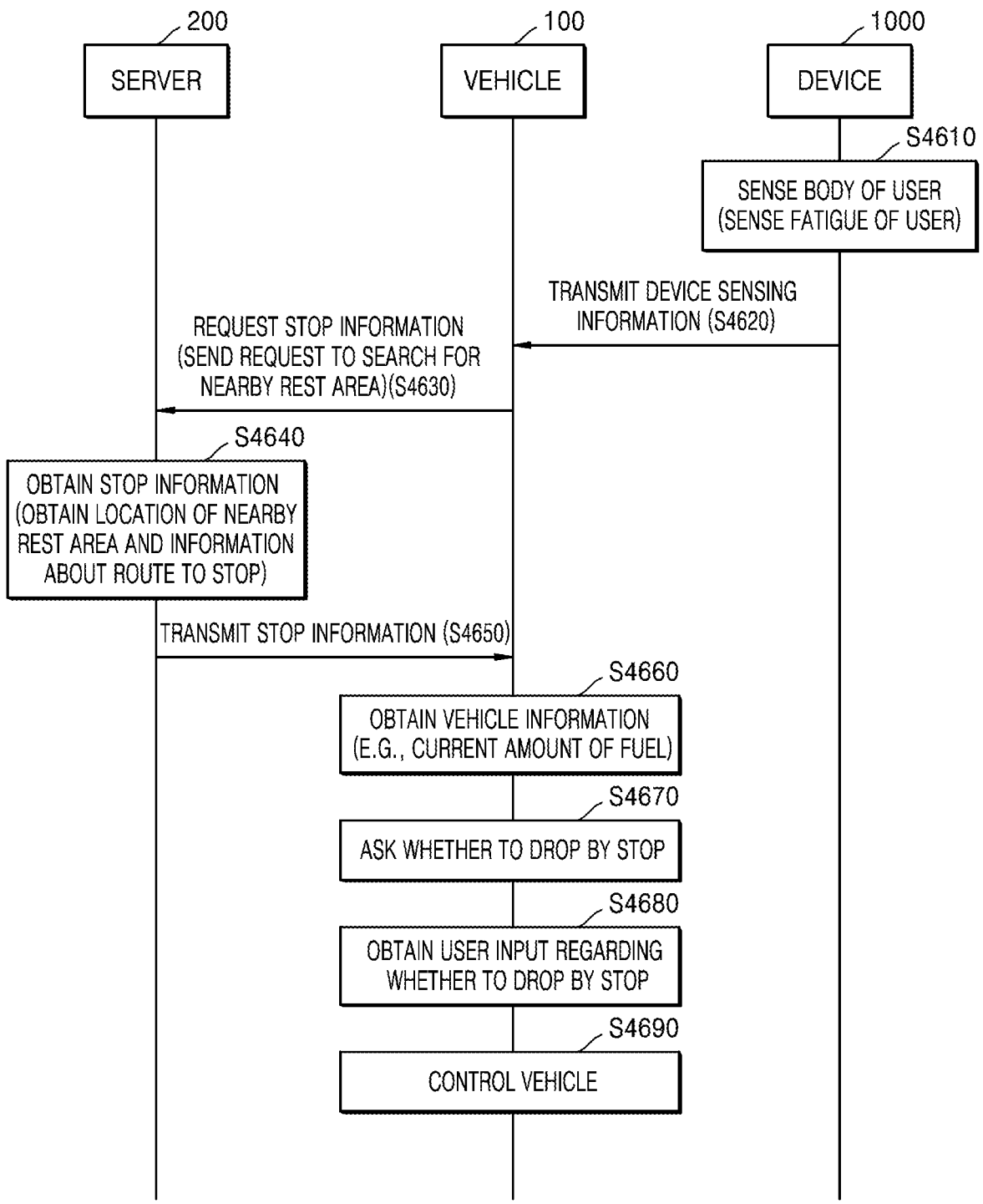
FIG. 46 is a flowchart of a method of controlling an autonomous vehicle by displaying an inquiry, according to an embodiment.

FIG. 46 is a flowchart of a method of controlling the autonomous vehicle 100 by displaying an inquiry, according to an embodiment.

In operation S4610, the device 1000 obtains biometric information by using the sensors included in the device 1000.

In operation S4620, the autonomous vehicle 100 receives the device sensing information 241 from the device 1000. The received device sensing information 241 may include information indicating a high fatigue degree.

In operation S4630, the autonomous vehicle 100 may request information regarding a rest area to the server 200.

In operation S4640, the server 200 may obtain information regarding locations of rest areas close to a current location of the autonomous vehicle 100 and route information to the rest areas.

In operation S4650, the autonomous vehicle 100 receives information regarding the rest areas from the server 200. The information regarding the rest areas may include the information regarding the locations of the rest areas close to the current location of the autonomous vehicle 100 and the route information to the rest areas.

In operation S4660, the autonomous vehicle 100 obtains the vehicle information 220. For example, the autonomous vehicle 100 may obtain information regarding a remaining amount of fuel. The vehicle information 220 may include the information regarding the rest areas that is obtained in operation S4650. The information regarding the rest areas may be included in the vehicle communication information 232. Also, the autonomous vehicle 100 may determine whether it is possible to navigate to the rest area based on the remaining amount of fuel.

In operation S4670, the autonomous vehicle 100 may determine one of functions of the autonomous vehicle 100, which is to be controlled, based on the device sensing information 241 obtained in operation S4620 and the vehicle information 220 obtained in operation S4660. Also, the autonomous vehicle 100 may generate the vehicle control information used to control the determined function based on the obtained device information 210. Also, the autonomous vehicle 100 may display, on the display of the autonomous vehicle 100, an inquiry about whether to perform an operation of controlling the determined function before the determined function is controlled based on the generated control information.

For example, when the autonomous vehicle 100 receives, from the device 1000, the device information 210 including the biometric information indicating that the fatigue degree of the user is high, and when the vehicle information 220 includes information indicating that a sufficient amount of fuel remains, the autonomous vehicle 100 may display an inquiry about whether to add the rest area as a stop.

In operation S4680, the autonomous vehicle 100 may receive a user response to the inquiry displayed in operation S4670. For example, the autonomous vehicle 100 may receive a touch input made on a button corresponding to "Yes" among two buttons respectively corresponding to "Yes" and "No".

In operation S4690, the autonomous vehicle 100 may be controlled based on the control information generated in operation S4670, in response to the user input received in operation S4680. For example, when the autonomous vehicle 100 displays an inquiry about whether to add the rest area to the stop and then receives the user input corresponding to "Yes", the autonomous vehicle 100 may add the rest area to the driving route as the stop.

Figure 47:
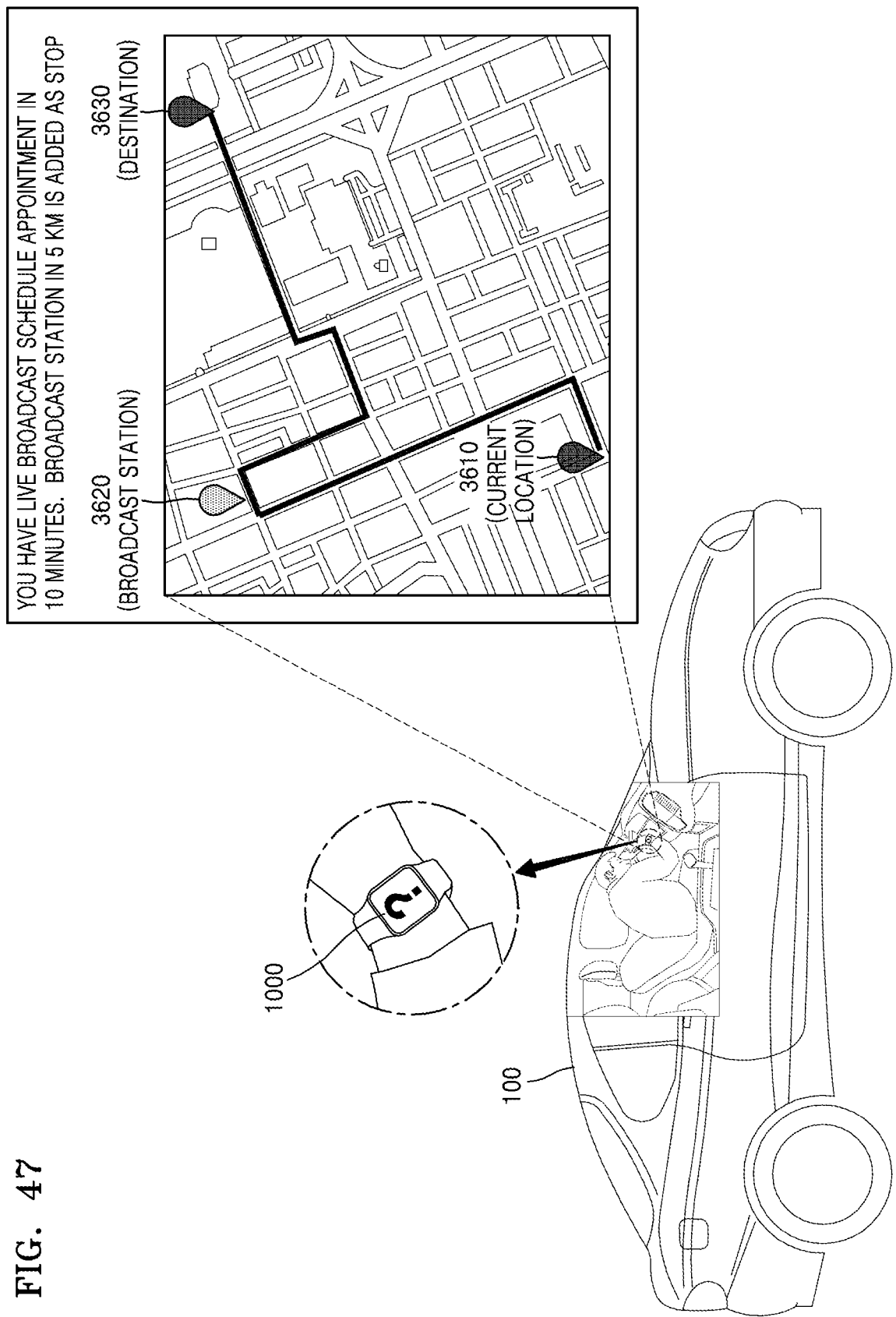
FIG. 47 is a diagram showing an example of adding a stop to a driving route of an autonomous vehicle without displaying an inquiry, according to an embodiment.

FIG. 47 is a diagram showing an example of adding a stop to a driving route of the autonomous vehicle 100 without displaying an inquiry, according to an embodiment.

The autonomous vehicle 100 may obtain the device information 210 from the device 100 and may determine one of functions of the autonomous vehicle 100, which is to be controlled, based on the obtained device information 210. Also, the autonomous vehicle 100 may generate the vehicle control information used to control the function determined based on the obtained device information 210.

Also, the autonomous vehicle 100 may obtain the device information 210 from the device 100 and may determine one of functions of the autonomous vehicle 100, which is to be controlled, based on the obtained device information 210 and the vehicle information 220. Also, the autonomous vehicle 100 may generate the vehicle control information used to control the function determined based on the obtained device information 210 and the vehicle information 220.

The autonomous vehicle 100 may not perform an operation of displaying an inquiry on the display of the autonomous vehicle 100 before controlling the function determined based on the generated control information.

For example, when the autonomous vehicle 100 receives, from the device 1000, the device information 210 including live broadcast schedule information having a high priority and the biometric information indicating that the user is sleeping, the autonomous vehicle 100 may not perform an operation of displaying an inquiry about whether to add a broadcast station 3620 as a stop to a driving route from a current location 3610 to a destination 3630 and may add the broadcast station as the stop.

As another example, when the autonomous vehicle 100 receives, from the device 1000, the device information 210 including the biometric information indicating that the user is sleeping and obtains the vehicle information 220 including information indicating that a remaining amount of fuel is less than or equal to a certain criteria, the autonomous vehicle 100 may not perform an operation of displaying an inquiry about whether to add a gas station as a stop and may add a gas station as a stop.

As another example, when the autonomous vehicle 100 receives, from the device 1000, the device information 210 including the biometric information indicating that the user is sleeping and obtains the vehicle information 220 including information indicating that tire inflation pressure is less than or equal to a certain criteria, the autonomous vehicle 100 may not perform an operation of displaying an inquiry about whether to add a repair shop as a stop and may add a repair shop as a stop.

As another example, when the autonomous vehicle 100 receives, from the device 1000, the device information 210 including the biometric information indicating that the user is in an emergency, the autonomous vehicle 100 may not perform an operation of displaying an inquiry about whether to add a hospital as a stop and may add a hospital as a stop.

Cases where an operation of displaying an inquiry is not performed may be preset. For example, the operation of displaying an inquiry may not be performed when there is a schedule appointment having the highest priority, for example, a live broadcast schedule appointment, when a possible driving distance is less than or equal to a certain distance (e.g., lack of fuel, problems in a vehicle, etc.), when the user is in an emergency, or the like. The autonomous vehicle 100 may renew the settings according to a user input.

However, the present disclosure is not limited to the present embodiment. With regard to all of the above-described embodiments, the operation of displaying an inquiry before controlling the autonomous vehicle 100 based on the control information may not be performed in preset cases.

Figure 48:
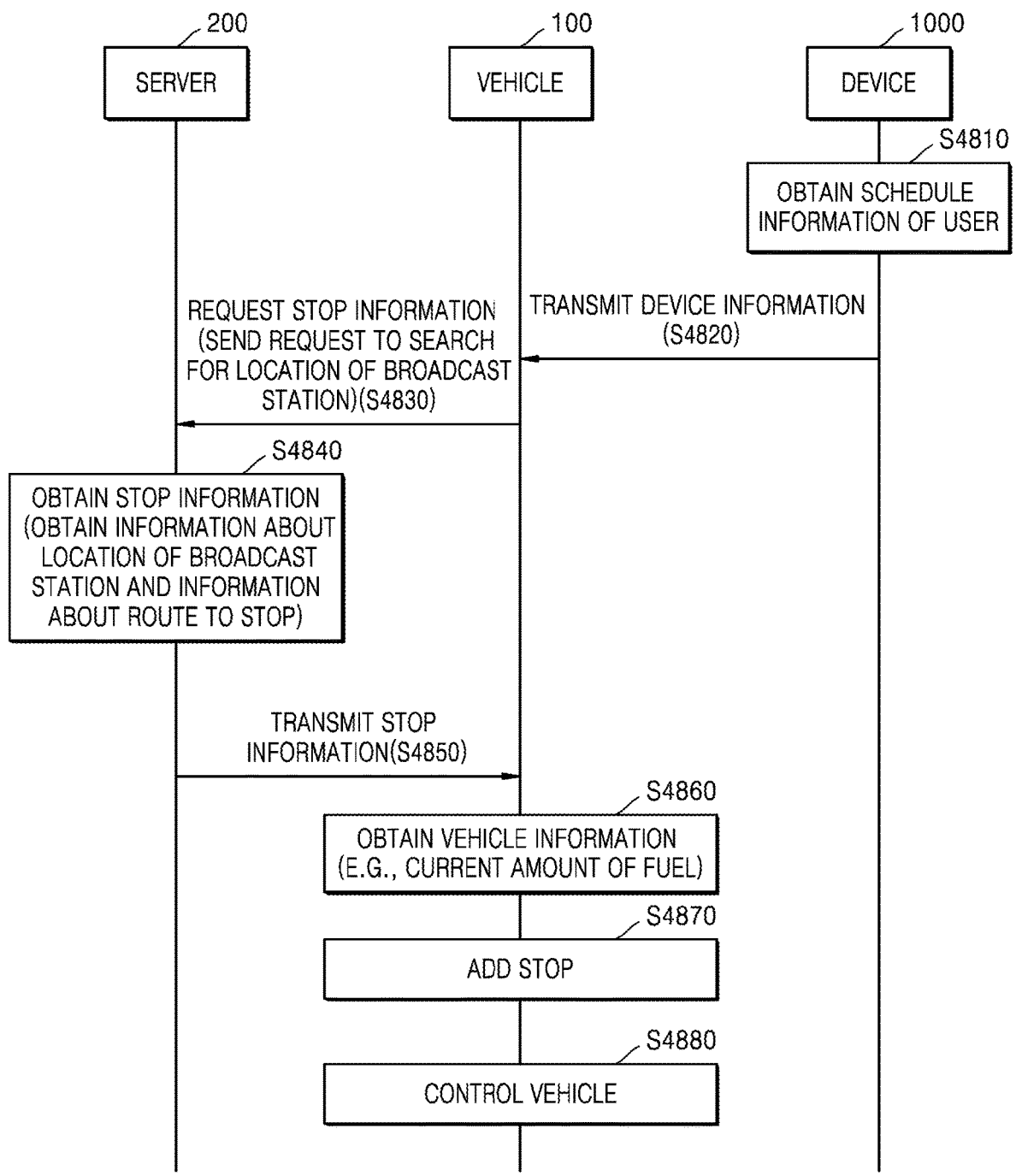
FIG. 48 is a flowchart of a method of adding a stop to a driving route of an autonomous vehicle without displaying an inquiry, according to an embodiment.

FIG. 48 is a flowchart of a method of adding a stop to a driving route of the autonomous vehicle 100 without displaying an inquiry, according to an embodiment.

In operation S4810, the device 1000 obtains the schedule information of the user from the storage medium of the device 1000 or the server 200.

In operation S4820, the autonomous vehicle 100 receives the device information 210 from the device 1000. The received device information 210 may include live broadcast schedule information.

In operation S4830, the autonomous vehicle 100 may send, to the server 200, a request for information about a broadcast station that is a location of a live broadcast schedule appointment.

In operation S4840, the server 200 may obtain information about a location of the broadcast station and information about a driving route from a current location of the autonomous vehicle 100 to the broadcast station.

In operation S4850, the autonomous vehicle 100 receives information regarding the broadcast station from the server 200. The information regarding the broadcast station may include the information about the location of the broadcast station and the information about the driving route from the current location of the autonomous vehicle 100 to the broadcast station.

In operation S4860, the autonomous vehicle 100 obtains the vehicle information 220. The autonomous vehicle 100 may obtain information about a remaining amount of fuel. The vehicle information 220 may include the information regarding the broadcast station obtained in operation S4850. The information regarding the broadcast station may be included in the vehicle communication information 232.

Also, the autonomous vehicle 100 may determine whether it is possible to navigate based on the remaining amount of fuel.

In operation S4870, the autonomous vehicle 100 may determine one of functions of the autonomous vehicle 100, which is to be controlled, based on the device information obtained in operation S4820 and the vehicle information 220 obtained in operation S4860. Also, the autonomous vehicle 100 may generate the vehicle control information used to control the function determined based on the obtained device information 210.

For example, when the autonomous vehicle 100 receives, from the device 1000, the device information 210 including the live broadcast schedule appointment information having the high priority and the biometric information indicating that the user is sleeping, and when the vehicle information 220 includes the information indicating that a sufficient amount of fuel remains, the autonomous vehicle 100 may not perform an operation of displaying an inquiry about whether to add the broadcast station as the stop and may generate the vehicle control information used to add the broadcast station as the stop.

In operation S4880, the autonomous vehicle 100 may be controlled based on the control information generated in operation S4870. Based on the control information generated in operation S4870, the autonomous vehicle 100 may not perform an operation of displaying an inquiry about whether to add the broadcast station as the stop and may add the broadcast station as the stop.

Figure 49:
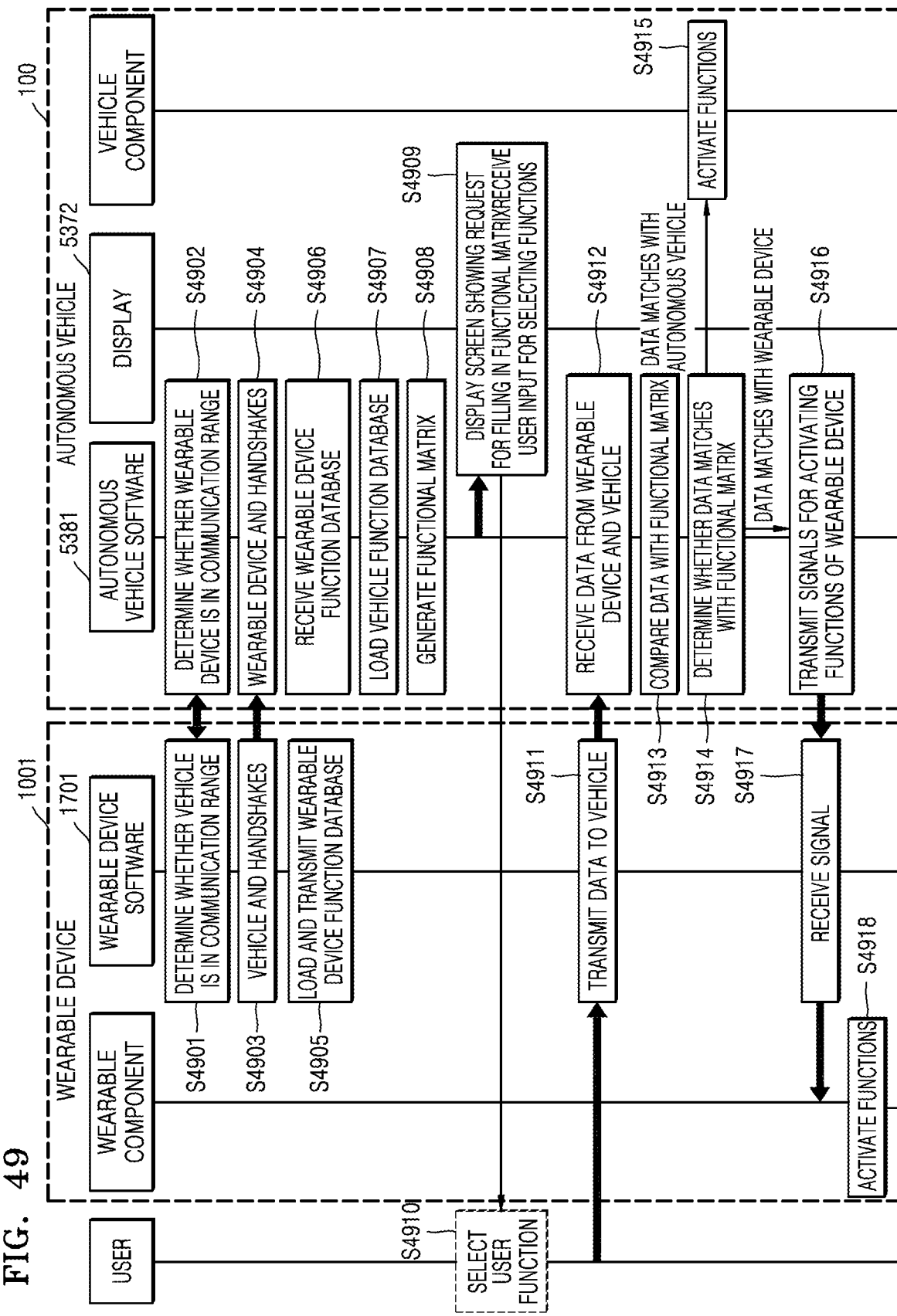
FIG. 49 is a flowchart of a method of controlling an autonomous vehicle by using a wearable device that communicates with the autonomous vehicle, according to an embodiment.

FIGS. 49 and 50 show a method of controlling the autonomous vehicle 100 communicating with the wearable device 1001 when the device 1000 is the wearable device 1001, and the autonomous vehicle 100 controlled based on the device information 210.

FIG. 49 is a flowchart of a method of controlling the autonomous vehicle 100 by using the wearable device 1001 that communicates with the autonomous vehicle 100, according to an embodiment.

In operation S4901, the wearable device 1001 may determine whether the autonomous vehicle 100 and the wearable device 1001 are within a communication range by using the wearable device software 1701.

In operation S4902, the autonomous vehicle 100 may determine whether the wearable device 1001 is in the communication range by using the autonomous vehicle software 5381.

In operation S4903, the wearable device 1001 may perform handshaking with the autonomous vehicle 100 by using the wearable device software 1701.

In operation S4904, the autonomous vehicle 100 may perform handshaking with the wearable device 1001 by using the autonomous vehicle software 5381.

In operation S4905, the wearable device 1001 may load the wearable device function database 1702 by using the wearable device software 1701 and may transmit the loaded wearable device function database 1702 to the autonomous vehicle 100.

In operation S4906, the autonomous vehicle 100 may receive, from the wearable device 1001, the wearable device function database 1702 by using the autonomous vehicle software 5381.

In operation S4907, the autonomous vehicle 100 may load the autonomous vehicle function database 5382 by using the autonomous vehicle software 5381.

In operation S4908, the autonomous vehicle 100 generates a functional matrix by using the autonomous vehicle software 5381.

In operation S4909, the autonomous vehicle 100 may display, on the display 5372, a request for a user input regarding a method of associating the functions of the autonomous vehicle 100 with the functions of the wearable device 1001.

When there is a user selection in operation S4910, the wearable device 1001 transmits, to the autonomous vehicle 100, information regarding the user input by using the wearable device software 1701 in operation S4911.

In operation S4912, the autonomous vehicle 100 receives, from the wearable device 1001, the information regarding the user input by using the autonomous vehicle software 5381.

In operation S4913, the autonomous vehicle 100 compares the information regarding the user input with the functional matrix by using the autonomous vehicle software 5381.

In operation S4914, the autonomous vehicle 100 determines whether the information regarding the user input matches with the functional matrix by using the autonomous vehicle software 5381. The autonomous vehicle 100 may determine whether any function matches with the information regarding the user input based on the device information 210 and the vehicle information 220.

When the user input indicates association of an air conditioning/heating function of the autonomous vehicle 100 with a body temperature measurement function of the wearable device 1001, the autonomous vehicle 100 may determine whether to activate the air conditioning/heating function based on body temperature information obtained from the wearable device 1001. For example, when a body temperature has a value equal to or greater than a certain value, the air conditioning/heating function may match with the body temperature measurement function in order to turn on the air conditioner.

In operation S4915, when the function matched in operation S4914 is a function of the autonomous vehicle 100, the autonomous vehicle 100 activates the function of the autonomous vehicle 100.

In operation S4916, when the function matched in operation S4914 is a function of the autonomous vehicle 100, the autonomous vehicle 100 transmits, to the wearable device 1001, signals for activating the matched function of the wearable device 1001 by using the autonomous vehicle software 5381.

In operation S4917, the wearable device 1001 receives the signals transmitted by the autonomous vehicle 100 in operation S4916, by using the wearable device software 1701.

In operation S4918, the wearable device 1001 activates the matched function of the wearable device 1001 by using the wearable device software 1701.

FIG. 50 is a flowchart of a method of controlling the autonomous vehicle 100 by using the wearable device 1001 that communicates with the autonomous vehicle 100 via pairing, according to an embodiment.

In operation S5010, the wearable device 1001 including the communication unit 1500, the sensing unit 1400, the output unit 1200, the processor 1300, the power supply 810, the memory 1700, etc. is provided. The memory 1700 may include the wearable device software 1701 and the wearable device function database 1702.

In operation S5020, the autonomous vehicle 100 including the communication device 110, the sensor device 5200, the drive system 5100, the peripheral device 5300, the processor 120, the power supply 5400, the memory 5500, etc. is provided. The memory 5500 may include the autonomous vehicle software 5381 and the autonomous vehicle function database 5382.

In operation S5030, the wearable device 1001 permits a user input for setting the wearable device 1001. The wearable device 1001 may determine the settings of a wearable operation system based on the user input.

In operation S5040, the wearable device 1001 and/or the autonomous vehicle 100 perform pairing between the wearable device 1001 and the autonomous vehicle 100.

In operation S5050, the wearable device 1001 and/or the autonomous vehicle 100 associate the functions of the wearable device 1001 and the functions of the autonomous vehicle 100. For example, the functions of the wearable device 1001 may be associated with the functions of the autonomous vehicle 100 according to a preset method.

In operation S5060, the wearable device 1001 and/or the autonomous vehicle 100 display a screen showing a request for setting the association of the functions of the wearable device 1001 with the functions of the autonomous vehicle 100.

In operation S5070, the wearable device 1001 and/or the autonomous vehicle 100 receive a user input corresponding to the request displayed in operation S5060.

In operation S5080, the wearable device 1001 receives data regarding associated functions from the autonomous vehicle 100 or the autonomous vehicle 100 receives data regarding associated functions from the wearable device 1001.

In operation S5090, the wearable device 1001 and/or the autonomous vehicle 100 activate the associated functions based on the data received in operation S5080.

The device described herein may comprise a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributive manner. This media can be read by the computer, stored in the memory, and executed by the processor.

The present disclosure may be described in terms of functional block components and various processing steps. Such functional blocks may be realized by any number of hardware and/or software components configured to perform the specified functions. For example, the present disclosure may employ various integrated circuit (IC) components, e.g., memory elements, processing elements, logic elements, look-up tables, and the like, which may carry out a variety of functions under the control of one or more microprocessors or other control devices. Similarly, where the elements of the present disclosure are implemented using software programming or software elements, the disclosure may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the present disclosure could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of the disclosure and are not intended to otherwise limit the scope of the disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the terms "a" and "an" and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The present disclosure is not limited to the described order of the steps. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to one of ordinary skill in the art without departing from the spirit and scope of the present disclosure.

The invention claimed is:

1. An autonomous vehicle comprising:
    a communication device configured to receive device information obtained from a device configured to communicate with the autonomous vehicle, from the device, wherein the device information comprises biometric information; and
    a processor configured to, based on guidelines for associating the biometric information obtained from the device with vehicle control information used to control at least one function of the autonomous vehicle, determine the vehicle control information corresponding to the biometric information and control the autonomous vehicle based on the vehicle control information,
    wherein the biometric information is a blood-related information of a user of the autonomous vehicle, and the at least one function is a function performed while maintaining a state of autonomously driving of the autonomous vehicle.

2. The autonomous vehicle of claim 1, wherein the at least one function comprises a navigation function of the autonomous vehicle.

3. The autonomous vehicle of claim 1, wherein the at least one function comprises an accelerator function of the autonomous vehicle.

4. The autonomous vehicle of claim 1, wherein the at least one function comprises a navigation function of the autonomous vehicle.

5. The autonomous vehicle of claim 1, wherein the at least one function comprises to control a drive system of the autonomous vehicle.

6. The autonomous vehicle of claim 1, wherein the at least one function comprises to control an internal brightness function of the autonomous vehicle.

7. The autonomous vehicle of claim 1, wherein the at least one function comprises to control at least one of an air conditioning device, a heating device, and a ventilation device of the autonomous vehicle.

8. The autonomous vehicle of claim 1, wherein the at least one function comprises to control an audio/video device of the autonomous vehicle.

9. The autonomous vehicle of claim 1, wherein the at least one function comprises to control a navigation function of the autonomous vehicle based on driving environment information in order to change a driving route of the autonomous vehicle to a detour route.

10. The autonomous vehicle of claim 1, wherein the at least one function comprises to activate a drive system of the autonomous vehicle in order to determine a driving mode of the autonomous vehicle based on driving environment information.

11. The autonomous vehicle of claim 1, wherein the at least one function comprises to activate a temperature adjusting function of the autonomous vehicle.

12. The autonomous vehicle of claim 1, wherein the communication device is configured to send a communication request to the device within a certain range from the autonomous vehicle and receive the biometric information in response to the communication request.

13. A method of controlling an autonomous vehicle, the method comprising:

receiving device information obtained from a device configured to communicate with the autonomous vehicle, from the device, wherein the device information comprises biometric information;

based on guidelines for associating the device information obtained from the device with vehicle control information used to control at least one function of the autonomous vehicle, determining the vehicle control information corresponding to the biometric information; and controlling the autonomous vehicle based on the vehicle control information, wherein the biometric information is a blood-related information of a user of the autonomous vehicle, and the at least one function is a function performed while maintaining a state of autonomously driving of the autonomous vehicle.

14. A non-transitory computer-readable recording medium having recorded thereon a program which, when executed by a computer, performs a method of controlling an autonomous vehicle, the method comprising:

receiving device information obtained from a device configured to communicate with the autonomous vehicle, from the device, wherein the device information comprises biometric information;

based on guidelines for associating the device information obtained from the device with vehicle control information used to control at least one function of the autonomous vehicle, determining the vehicle control information corresponding to the biometric information; and controlling the autonomous vehicle based on the vehicle control information, wherein the biometric information is a blood-related information of a user of the autonomous vehicle, and the at least one function is a function performed while maintaining a state of autonomously driving of the autonomous vehicle.

* * * * *